US007249031B2

(12) United States Patent
Close et al.

(10) Patent No.: US 7,249,031 B2
(45) Date of Patent: *Jul. 24, 2007

(54) SELECTIVE MERCHANDISE PRICE OPTIMIZATION

(75) Inventors: John Close, San Francisco, CA (US); Phil Delurgio, Walnut Creek, CA (US); Michael Neal, San Francisco, CA (US)

(73) Assignee: Demandtec Inc., San Carlos, CA (US)

( * ) Notice: Subject to any disclaimer, the term of this patent is extended or adjusted under 35 U.S.C. 154(b) by 1002 days.

This patent is subject to a terminal disclaimer.

(21) Appl. No.: 09/994,465

(22) Filed: Nov. 26, 2001

(65) Prior Publication Data

US 2006/0195345 A1    Aug. 31, 2006

Related U.S. Application Data

(63) Continuation-in-part of application No. 09/849,616, filed on May 4, 2001.

(51) Int. Cl.
*G06Q 99/00* (2006.01)
*G06F 17/30* (2006.01)
*G06F 17/00* (2006.01)
*G06G 7/00* (2006.01)

(52) U.S. Cl. .............................. 705/1; 705/10; 705/400
(58) Field of Classification Search ................ 705/400, 705/1, 10
See application file for complete search history.

(56) References Cited

U.S. PATENT DOCUMENTS 3,017,610 A    1/1962 Auerbach et al.

(Continued)

FOREIGN PATENT DOCUMENTS

WO    WO9746950    12/1997

(Continued)

OTHER PUBLICATIONS

Montgomery: "The Impact of Micro-Marketing on Pricing Strategies", 1994 The University of Chicago, vol. 55/12-A of Dissertation Abstracts International, p. 3922 (Abstract Only).

(Continued)

*Primary Examiner*—John W. Hayes
*Assistant Examiner*—Fadey S. Jabr
(74) *Attorney, Agent, or Firm*—Richard K. Huffman; Kang S. Lim; James W. Huffman

(57) ABSTRACT

An interface that enables a user to determine optimum prices of products for sale. The interface includes a scenario/results processor through which the user prescribes an optimization scenario, and through which optimum prices are presented to the user. The optimum prices are determined by execution of the optimization scenario, where the optimum prices are determined based upon estimated product demand and calculated activity based costs. The scenario/results processor has an input/output processor and a scenario controller. The input/output processor acquires data corresponding to the optimization scenario from the user, and distributes optimization results to the user. The scenario controller is coupled to the input/output processor. The scenario controller controls acquisition of the data and the distribution of the optimization results in accordance with a price optimization procedure. The price optimization procedure is configured to relax constraints of lower priority conflicting rules to render the optimization scenario feasible.

24 Claims, 107 Drawing Sheets

U.S. PATENT DOCUMENTS

| | | |
|---|---|---|
| 4,744,026 A | 5/1988 | Vanderbei |
| 5,063,506 A | 11/1991 | Brockwell et al. |
| 5,117,354 A | 5/1992 | Long et al. |
| 5,189,606 A | 2/1993 | Burns |
| 5,212,791 A | 5/1993 | Damian et al. |
| 5,249,120 A | 9/1993 | Foley |
| 5,299,115 A | 3/1994 | Fields et al. |
| 5,377,095 A | 12/1994 | Maeda et al. |
| 5,459,656 A | 10/1995 | Fields et al. |
| 5,521,813 A | 5/1996 | Fox et al. |
| 5,615,109 A | 3/1997 | Eder |
| 5,694,551 A | 12/1997 | Doyle et al. |
| 5,712,985 A | 1/1998 | Lee et al. |
| 5,732,401 A | 3/1998 | Conway |
| 5,765,143 A | 6/1998 | Sheldon et al. |
| 5,790,643 A | 8/1998 | Gordon et al. |
| 5,799,286 A | 8/1998 | Morgan et al. |
| 5,822,736 A | 10/1998 | Hartman et al. |
| 5,873,069 A | 2/1999 | Reuhl et al. |
| 5,878,400 A | 3/1999 | Carter, III |
| 5,918,209 A | 6/1999 | Campbell et al. |
| 5,933,813 A | 8/1999 | Teicher et al. |
| 5,987,425 A | 11/1999 | Hartman et al. |
| 6,009,407 A | 12/1999 | Garg |
| 6,029,139 A | 2/2000 | Cunningham et al. |
| 6,032,123 A | 2/2000 | Jameson |
| 6,032,125 A | 2/2000 | Ando |
| 6,044,357 A | 3/2000 | Garg |
| 6,052,686 A | 4/2000 | Fernandez et al. |
| 6,078,893 A | 6/2000 | Ouimet et al. |
| 6,094,641 A | 7/2000 | Ouimet et al. |
| 6,125,355 A | 9/2000 | Bekaert et al. |
| 6,134,534 A | 10/2000 | Walker et al. |
| 6,173,345 B1 | 1/2001 | Stevens |
| 6,202,070 B1 | 3/2001 | Nguyen et al. |
| 6,205,431 B1 | 3/2001 | Willemain et al. |
| 6,219,649 B1 | 4/2001 | Jameson |
| 6,308,162 B1 * | 10/2001 | Ouimet et al. ............. 705/7 |
| 6,321,207 B1 | 11/2001 | Ye |
| 6,341,268 B2 | 1/2002 | Walker et al. |
| 6,341,269 B1 | 1/2002 | Dulaney et al. |
| 6,397,193 B1 | 5/2002 | Walker et al. |
| 6,405,175 B1 | 6/2002 | Ng |
| 6,456,986 B1 | 9/2002 | Boardman et al. |
| 6,546,387 B1 | 4/2003 | Triggs |
| 6,553,352 B2 | 4/2003 | Delurgio et al. |
| 6,567,824 B2 | 5/2003 | Fox |
| 6,684,193 B1 | 1/2004 | Chavez et al. |
| 6,697,824 B1 | 2/2004 | Bowman-Amuah |
| 6,725,208 B1 | 4/2004 | Hartman et al. |
| 6,731,998 B2 * | 5/2004 | Walser et al. ............. 700/99 |
| 6,735,572 B2 | 5/2004 | Landesmann |
| 6,745,184 B1 | 6/2004 | Choi et al. |
| 6,826,538 B1 * | 11/2004 | Kalyan et al. ............. 705/7 |
| 6,910,017 B1 | 6/2005 | Woo et al. |
| 6,934,931 B2 * | 8/2005 | Plumer et al. ............. 717/104 |
| 6,965,867 B1 | 11/2005 | Jameson |
| 6,988,076 B2 * | 1/2006 | Ouimet ............. 705/7 |
| 7,058,617 B1 * | 6/2006 | Hartman et al. ............. 706/16 |
| 2002/0023001 A1 | 2/2002 | McFarlin et al. |
| 2002/0042739 A1 | 4/2002 | Srinivasan et al. |
| 2002/0107819 A1 | 8/2002 | Ouimet |
| 2002/0116348 A1 * | 8/2002 | Phillips et al. ............. 705/400 |
| 2002/0123930 A1 | 9/2002 | Boyd et al. |
| 2002/0165834 A1 | 11/2002 | Delurgio et al. |
| 2002/0198794 A1 | 12/2002 | Williams et al. |
| 2003/0110072 A1 | 6/2003 | Delurgio et al. |
| 2003/0177103 A1 | 9/2003 | Ivanov et al. |
| 2006/0224534 A1 * | 10/2006 | Hartman et al. ............. 706/15 |

FOREIGN PATENT DOCUMENTS

| | | |
|---|---|---|
| WO | WO 98/53415 | 11/1998 |
| WO | WO0070519 | 11/2000 |
| WO | WO0070556 | 11/2000 |

OTHER PUBLICATIONS

Busch: "Cost modeling as a technical management tool", Reasearch-Technology Management, Nov./Dec. 1994, vol. 37, No. 6, pp. 50-56.

"Pacificorp IRP: Renewables Costs Must Drop 65% to be Competitive with Gas".

"PCT International Search Report", Application No. PCT/US02/36710, mailed Jul. 21, 2003.

Yoeman, John Cornelius Jr., "The Optimal Offering Price for Underwritten Securities", 1993, vol. 55/01-A of Dissertation Abstracts International, p. 4743 (Abstract Only).

"PCT International Search Report", Application No. PCT/US02/14977, mailed May 5, 2003.

Dyer, Robert F. et al., "Case Studies in Marketing Decisions Using Expert Choice," Decision Support Software, 1988, pp. 2-7, 73-108.

"PCT International Search Report", Application No. PCT/US03/30488, mailed Jan. 28, 2004.

Bruce G.S. Hardie et al., "Attribute-based Market Share Models: Methodological Development and Managerial Applications", University of Pennsylvania, Working Paper 98-009, pp. 1-48, 1998.

Rossi, Delorgio, & Kantor; "Making Sense of Scanner Data;" Harvard Business Review, Reprint F00205, 2000.

"Pacificorp IRP: Renewables Costs Must Drop 65% to be Competitive with Gas," dated Dec. 8, 1995.

Robert J. Dolan, "How Do You Know When the Price is Right?", Harvard Business Review, Sep.-Oct. 1995, p. 4-11.

Alan L. Montgomery and Peter R. Rossi, "Estimating Price Elasticities with Theory-Based Priors," Journal of Marketing Research vol. XXXVI, Nov. 1999 (pp. 413-423).

Boatwright, Peter et al., "Account-Level Modeling for Trade Promotion: An Application of a Constrained Parameter Hierarchical Model," Journal of the American Statistical Association, vol. 94, No. 448, Dec. 1999 (pp. 1063-1073).

Alan L. Montgomery, "Creating Micro-Marketing Pricing Strategies Using Supermarket Scanner Data," Marketing Science, vol. 16, No. 4, 1997 (pp. 315-337).

Robert C. Blattberg and Edward I. George, "Shrinkage Estimation of Price and Promotional Elasticities: Seemingly Unrelated Equations," Journal of the American Statistical Association, vol. 86, No. 414, Jun. 1991 (pp. 304-315).

Arnold Zellner, "On Assessing Prior Distribution sand Bayesian Regression Analysis With G-Prior Distributions," Elsevier Science Publishers, 1986 (pp. 233-243).

A.F.M. Smith, "A General Bayesian Linear Model," University of Oxford, Apr. 1972.

D.V. Lindley and A.F.M. Smith, "Bayes Estimates for the Linear Model," University College, Dec. 1971.

George C. Tiao and Arnold Zellner, "On the Bayesian Estimation of Multivariate Regression," University of Wisconsin, Jan. 1964.

Arnold Zellner, "An Efficient Method of Estimating Seemingly Unrelated Regressions and Tests for Aggregation Bias," University of Wisconsin, Jun. 1962.

"Merriam Webster's Collegiate Dictionary", 10th edition, p. 585, Merriam-Webster Incorporated, 1999.

Hernandez, Mauricio A., and Salvatore J. Stolfo, "Real-world Data is Dirty: Data Cleansing and the Merge/Purge Problem", Data Mining and Knowledge Discovery, vol. 2, Issue 1, Jan. 1998.

Scherage, Dan, "You Do the Math," Chain Store Age, v76, n7, Jul. 2000.

"Gymboree Enhances Price Management," Retail Systems Alert, vol. 13, No. 6, Jun. 2000.

Binkley, James K.; Connor, John M., "Grocery Market Pricing and the New Competitive Environment." Journal of Retailing, v74, n2, Summer 1998.

Rossi et al. "Making Sense of Scanner Data." *Harvard Business Review*. Reprint F00205. 2000.

Bucklin et al. "Brand Choice, Purchase Incidence, and Segmentation: An Integrated Modeling Approach." *Journal of Marketing Research*. May 1992, pp. 201-205. vol. XXIX.

Smith et al. "Bayesian Semiparametric Regressions: An Exposition and Application to Print Advertising." Jan. 3, 1997. Australian Graduate School of Management, University of New South Wales, Sydney 2052, Australia.

Blattberg et al. "Manage Marketing by the Customer Equity." *Harvard Business Review*. Jul.-Aug. 1996. pp. 136-144.

Christen et al. "Using Market-Level Data to Understand the Effectiveness of Promotional Activities." Dec. 22, 1995.

Ross Link "Are Aggregate Scanner Data Models Biased?" *Journal of Advertising Research*. Sep./Oct. 1995. pp. RC8-RC12, ARF.

Russell et al. "Understanding Brand Competition Using Micro and Macro Scanner Data." *Journal of Marketing Research*. vol. XXXI (May 1994). pp. 289-303.

John Philip Jones. "The Double Jeopardy of Sales Promotions." *Harvard Business Review*. Sep.-Oct. 1999. pp. 145-152.

Buzzell et al. "The Costly Bargain of Trade Promotion." *Harvard Business Review*. Reprint 90201. Mar.-Apr. 1990. pp. 1-9.

Curry et al. "BVAR as a Category Management Tool: An Illustration and Comparison with Alternative Techniques." *Journal of Forecasting*. vol. 14, ISS No. 3 (1995). pp. 181-199.

Hoch et al. "Store Brands and Category Management." The Wharton School, University of Pennsylvania. Mar. 1998. pp. 1-38.

Hardie et al. "Attribute-based Market Share Models: Methodological Development and Managerial Applications." The Wharton School, University of Pennsylvania. Working Paper 98-009, pp. 1-48. 1998.

Alan Mercer. "Non-Linear Price Effects." *Journal of the Market Research Society*. Dated July 1, 1996. p. 227.

Rockney G. Walters. "Assessing the Impact of Retail Price Promotions on Product Substitution, Complementary Purchase and Interstore Sales Displacement." *Journal of Marketing*. vol. 55, Apr. 1991. pp. 17-28.

Blattberg et al. "How Promotions Work." *Marketing Science*. vol. 14, No. 3, Part 2 of 2. 1995. pp. G122-G132.

Guadagni et al. "A Logit Model of Brand Choice Calibrated on Scanner Data." *Marketing Science*. vol. 2, No. 3, Summer 1983. pp. 203-238.

Cooper et al. "Standardizing Variables in Multiplicative Choice Models." *Journal of Consumer Research*. vol. 10. Jun. 1983. pp. 96-108.

Bridges et al. "A High-Tech Product Market Share Model with Customer Expectations." *Marketing Science*. vol. 14, No. 1, Winter 1995. pp. 61-81.

Batsell et al. "A New Class of Market Share Models." *Marketing Science*. vol. 4, No. 3, Summer 1985. pp. 177-198.

Jagmohan S. Raju. "The Effect of Price Promotions on Variability in Product Category Sales." *Marketing Science*. vol. 11, No. 3. Summer 1992. pp. 207-220.

Robert J. Dolan. "How Do You Know When the Price is Right?" *Harvard Business Review*. Sep.-Oct. 1995. pp. 5-11.

Fusun Gonul. "Modeling Multiple Sources of Heterogeneity in Multinomial Logit Models: Methodological and Managerial Issues." *Marketing Science*. vol. 12, No. 3. Summer 1993. pp. 213-229.

Schindler et al. "Increased Consumer Sales Response through Use of 99-Ending Prices." *Journal of Retailing*. Jun. 1, 1996. p. 187.

Mulhern et al. "The Relationship Between Retail Price Promotions and Regular Price Purchases." *Journal of Marketing*. vol. 59, Oct. 1995. pp. 83-90.

Deighton et al. "The Effects of Advertising on Brand Switching and Repeat Purchasing." *Journal of Marketing Research*. vol. XXXI, Feb. 1994. pp. 28-43.

Sunil Gupta. "Reflections on 'Impact of Sales Promotions on When, What and How Much to Buy.'" *Journal of Marketing Research*. vol. XXX. Nov. 1993. pp. 522-524.

Richard A. Briesch. "Does It Matter How Price Promotions Are Operationalized?" *Marketing Letters*. 8:2 (1997). pp. 167-181.

Kim et al. "Modeling the Distribution of Price Sensitivity and Implications for Optimal Retail Pricing." *Journal of Business & Economic Statistics*. Jul. 1995. vol. 13, No. 3.

Dillon et al. "A Segment-level Model of Category Volume and Brand Choice." *Marketing Science*. vol. 15, No. 1, 1996. pp. 38-59.

Hoch et al. "Determinants of Store-Level Price Elasticity." *Journal of Marketing Research*. vol. XXXII (Feb. 1995). pp. 17-29.

Abraham et al. "An Implemented System for Improving Promotion Productivity Using Store Scanner Data." *Marketing Science*. vol. 12, No. 3, Summer. 1993.

Fader et al. "Modeling Consumer Choice Among SKUs." *Journal of Marketing Research*. vol. XXXIII (Nov. 1996.) pp. 442-452.

"PCT International Search Report" Application No. PCT/US03/30488. Mailed Jan. 28, 2004.

"PCT International Search Report" Application No. PCT/US02/36710. Mailed Jul. 21, 2003.

"PCT International Search Report" Application No. PCT/US02/14977. Mailed May 5, 2003.

"Report of Novelty Search" by Patentec. Dated Jul. 25, 2001.

"Report of Novelty Search" by Patentec. Dated Feb. 9, 2001.

Boatwright et al. "Account-Level Modeling for Trade Promotion: An Application of a Constrained Parameter Hierarchical Model." *Journal of the American Statistical Assocation*. vol. 94, No. 448. Dec. 1999. pp. 1063-1073.

Montgomery et al. "Estimating Price Elasticities with Theory-Based Priors." *Journal of Marketing Research*. vol. XXXVI. Nov. 1999. pp. 413-423.

*Merriam Webster's Collegiate Dictionary*. 10th Edition. p. 585. Merriam-Webster Incorporated. 1999.

Hernandez et al. "Real-World Data is Dirty: Data Cleansing and the Merge/Purge Problem." *Data Mining and Knowledge Discovery*. vol. 2. Issue 1. Jan. 1998.

Alan L. Montgomery. "Creating Micro-Marketing Pricing Strategies Using Supermarket Scanner Data." *Marketing Science*. vol. 16, No. 4, 1997. pp. 315-337.

John Cornelius Yoeman Jr. "The Optimal Offering Price for Underwritten Securities." 1993. vol. 55/01-A of *Dissertation Abstracts International*. p. 4743 (Abstract Only).

Blattberg et al. "Shrinkage Estimation of Price and Promotional Elasticites: Seemingly Unrelated Equations." *Journal of the American Statistical Association*. vol. 86, No. 414. Jun. 1991. pp. 304-315.

Dyer et al. "Case Studies in Marketing Decisions Using Expert Choice." Decision Support Software. 1988. pp. 2-7, 73-108.

Arnold Zellner. "On Assessing Prior Distributions and Bayesian Regression Analysis with G-Prior Distributions." Elsevier Science Publishers. 1986. pp. 233-243.

A.F.M. Smith. "A General Bayesian Linear Model." University of Oxford. Apr. 1972.

Lindley et al. "Bayes Estimates for the Linear Model." University College. Dec. 1971.

Tiao et al. "On the Bayesian Estimation of Multivariate Regression." University of Wisconsin. Jan. 1964.

Arnold Zellner. "An Efficient Method of Estimating Seemingly Unrelated Regressions and Tests for Aggregation Bias." University of Wisconsin. Jun. 1962.

Cerf et al. "A Protocol for Packet Network Intercommunication." IEEE Transactions on Communications COM-22. May 1974. pp. 637-648.

T Berners-Lee. "Hypertext Markup Language 2.0 Working Papers." Nov. 1995. pp. 1-3.

D Flanagan. "JavaScript: The Definitive Guide, 3rd Edition." published by O'Reilly in Jun. 1998. ISBN: 1-56592-392-8. Section 14.8.

JD Little. "Brandaid: A Marketing-Mix Model, Part 1: Structure." Operations Research. vol. 23, No. 4. Jul.-Aug. 1975. pp. 628-655.

M. Abraham. "Promoter: An Automated Promotion Evaluation System." Marketing Science. 1987. pp. 101-123.

"Report of Novelty Search" by Patentec, dated Feb. 9, 2001.

"Report of Novelty Search" by Patentec, dated Jul. 25, 2001.

Stephen J. Hoch et al., "Store Brands and Category Management", The Wharton School, University of Pennsylvania, Mar. 1998, pp. 1-38.

Bruce G.S. Hardie et al., "Attribute-based Market Share Models: Methodological Development and Managerial Applications", University of Pennsylvania, Working Paper 98-009, pp. 1-48.

Alan Mercer, "Non-linear Price Effects", Journal of the Market Research Society, dated Jul. 1, 1996, p. 227.

Rockney G. Walters, "Assessing the Impact of Retail Price Promotions on Product Substitution, Complementary Purchase, and Interstore Sales Displacement", Journal of Marketing, vol. 55, Apr. 1991, pp. 17-28.

Robert C. Blattberg et al., "How Promotions Work", Marketing Science, vol. 14, No. 3, Part 2 of 2, 1995, pp. G122-G132.

Peter M. Guadagni et al., "A Logit Model of Brand Choice Calibrated on Scanner Data", Marketing Science, vol. 2, No. 3, Summer 1983, pp. 203-238.

Lee G. Cooper et al., "Standardizing Variables in Multiplicative Choice Models", Journal of Consumer Research, vol. 10, Jun. 1983, pp. 96-108.

Eileen Bridges et al., "A High-Tech Product Market Share Model With Customer Expectations" Marketing Science, vol. 14, No. 1, Winter 1995, pp. 61-81.

Richard R. Batsell, et al., "A New Class of Market Share Models", Marketing Science, vol. 4, No. 3, Summer 1985, pp. 177-198.

Jagmohan S. Raju, "The Effect of Price Promotions on Variability in Product Category Sales", Marketing Science, vol. 11, No. 3, Summer 1992, pp. 207-220.

Robert J. Dolan, "How Do You Know When the Price is Right?", Harvard Business Review, Sep.-Oct. 1995, pp. 5-11.

Fusun Gonul, "Modeling Multiple Sources of Heterogeneity in Multinomial Logit Models: Methodological and Managerial Issues", Marketing Science, vol. 12, No. 3, Summer 19932, pp. 213-229.

Robert M. Schindler et al., "Increased Consumer Sales Response through Use of 99-Ending Prices", Journal of Retailing, Jun. 1, 1996, p. 187.

Francis J. Mulhern et al., "The Relationship between Retail Price Promotions and Regular Price Purchases", Journal of Marketing, vol. 59, Oct. 1995, pp. 83-90.

John Deighton et al., "The Effects of Advertising on Brand Switching and Repeat Purchasing", Journal of Marketing Research, vol. XXXI, Feb. 1994, pp. 28-43.

Sunil Gupta, "Reflections on 'Impact of Sales Promotions on When, What, and How Much to Buy'", Journal of Marketing Research, vol. XXX, Nov. 1993, pp. 522-524.

Richard A. Briesch, "Does it Matter How price Promotions Are Operationalized?", Marketing Letters 8:2 (1997), pp. 167-181.

Byung-Do Kim et al., "Modeling the Distribution of Price Sensitivity and Implications for Optimal Retail Pricing", Journal of Business & Economic Statistics, Jul. 1995, vol. 13, No. 3.

William R. Dillon et al., "A Segment-level Model of Category Volume and Brand Choice", Marketing Science, vol. 15, No. 1, 1996, pp. 38-59.

Stephen J. Hoch at al., "Determinants of Store-Level Price Elasticity", Journal of Marketing Research, vol. XXXII (Feb. 1995), pp. 17-29.

Magid M. Abraham Et al., "An Implemented System for Improving Promotion Productivity Using Store Scanner Data", Marketing Science, vol. 12, No. 3, Summer 1993.

Peter S. Fader et al., "Modeling Consumer Choice among SKUs", Journal of marketing Research, vol. XXXII (Nov. 1996), pp. 442-452.

Rossi Delorgio, & Kantor; "Making Sense of Scanner Data;" Harvard Business Review, Reprint F00205.

Bucklin & Gupta, "Brand Choice, Purchase Incidence, and Segmentation: An Integrated Modeling Approach," Journal of Marketing Research, May 1992, pp. 201-215, vol. XXIX.

Smith, Mathur, & Kohn; Bayesian Semiparametric Regression: An Exposition and Application to Print Advertising;: Jan. 3, 1997; Australian Graduate School of Management, University of New South Wales, Sydnet 2025, Australia.

Blattberg and Deighton, "Manage Marketing by the Customer Equity," Harvard Business Review, Jul.-Aug. 1996, pp. 136-144.

Christen, Gupta, Porter, Staelin & Wittink; "Using Market-Level Data to Understand the Effectiveness of Promotional Activities;" Dec. 22, 1995.

Ross Link, "Are Aggregate Scanner Data Models Biased?," Journal of Advertising Research, Sep./Oct. 1995, pp. RC8-RC12, ARF.

Russell & Kamakura, "Understanding Brand Completion Using Micro and Macro Scanner Data," Journal of Marketing Research, vol. XXXI (May 1994), pp. 289-303.

John Philip Jones, "The Double Jeopardy of Sales Promotions," Harvard Business Review, Sep.-Oct. 1999, 145-152.

Buzzell, Quelch, & Salmon; "The Costly Bargain of Trade Promotion;" Harvard Business Review, Reprint 90201, Mar.-Apr. 1990, pp. 1-9.

Curry, Divakar, Mathur & Whiteman; "Bvar as a Category Management Tool: An Illustration and Comparison with Alternative Techniques;" Journal of Forecasting, vol. 14, Iss. No. 3 (1995), pp. 181-199.

"PCT International Search Report", Application No. PCT/US02/36710, mailed Jul. 21, 2003.

Yoeman, John Cornelius Jr., "The Optimal Offering Price for Underwritten Securities", 1993, vol. 55/01-A of Dissertation Abstracts International, p. 4743 (Abstract Only).

Barth, Brad, "Shopko Tests Automated Markdowns", WWD Oct. 4, 2000, pp. 1-3.

Cook, Martie, "Optimizing Space and Sales with Markdown Software", Office.com, May 31, 2000, p. 1.

"Essentus and Spotlight Solutions Partnership Delivers Precise Markdown Decisions", Business Wire, Apr. 17, 2000, 3 pages.

Melcer, Rachel, "Local Tech Firm Creates Retail Markdown Tool", Business Courier online, Mar. 24, 2000, pp. 1-4.

Technology Strategy Incorporated, www.grossprofit.com, Mar. 2, 2000, pp. 1-20.

Kadiyali et al., "Manufacturer-retailer Channel Interactions and Implications for Channel Power: An Investigation of Pricing in Local Market", Marketing Science, Spring 2000, V. 19, Issue 2.

Andrew B. Gelman et al., "Bayesian Data Analysis", pp. 439-455, Chapman & Hall/CRC, First Edition 1995, Reprinted 2000.

Hillier, Frederick S., et al., "Introduction to Operations Research", McGraw-Hill, Inc., 1995, Sixth Edition, pp. 1-14.

Francis X. Diebold. "The Past, Present, and Future of Macroeconomic Forecasting." Journal of Economic Perspectives (IJEP), vol. 12, No. 2, pp. 175-192, Spring 1998.

Smith et al. "A Discrete Optimization Model for Seasonal Merchandise Planning." *Journal of Retailing*. vol. 74, No. 2, p. 193 (29), Summer 1998.

Barth, Brad. "ShopKo Holds the Price Line." *Daily News Record*. p. 10. Oct. 4, 2000.

"Essentus and Spotlight Solutions Partnership Delivers Precise Markdown Decisions." *Business Wire*. p. 1444, Apr. 17, 2000.

"Manugistics Agrees to acquire Talus Solutions" *PR Newswire*. p. NA, Sep. 21, 2000.

"Goodyear Implements Trilogy's MultiChannel Pricing Solution as Its Enterprise-Wide E-Pricer Platform." *Business Wire*. p. 2286, Jun. 27, 2000.

"IMRglobal Signs New Product Implementation Agreement with Retek to Improve Retail Pricing and Markdown Process" *Business Wire*. p. 1590. Jun. 7, 2000.

"New Tools for Modeling Elasticity, Optimizing Prices and Collecting Live Pricing from the Web to debut as Retail Systems 2000 in Chicago." *Business Wire*. p. 1484, Apr. 18, 2000.

"KhiMetrics and Retek Form Marketing Alliance for Comprehensive Retail Pricing Solution." *PR Newswire*. p. NA, Feb. 19, 2001.

"KhiMetrics Helps Retailers Increase Margins with Two New Tools for Their Retail Revenue Management Application Suite." *PR Newswire*. Mar. 1, 2001.

* cited by examiner

Currently Defined Scenarios

Select a column and drag its header here to group (and sort) by that column

| Name | NetProfit | WhoCreated | StartDate | EndDate | ScenarioType | ScenarioRuns | Description |
|---|---|---|---|---|---|---|---|
| C/o infeasible groups | $41,965 | robert | 3/9/2001 | 4/9/2001 | Base | Optimized | ALL |
| Example Midtown Scenario | $25,760 | Rict | 3/28/2001 | 4/28/2001 | Base | Optimized | ALL |
| Infeasible groups | | robert | 3/9/2001 | 4/9/2001 | Base | Pending | ALL |
| C/o Clustered and ends in 9 | $99,501 | Suzy | 2/15/2001 | 3/15/2001 | Base | Optimized | ALL - North Atlanta Clust |
| Scenario created by John | | John | 2/19/2001 | 3/19/2001 | Base | | ALL |
| Scenario with Price Constraints | $112,262 | jcrowther | 2/28/2001 | 3/28/2001 | Base | Optimized | ALL |
| Max Profit with Reasonable Vol Constr | $189,205 | jcrowther | 2/16/2001 | 3/16/2001 | Base | Optimized | ALL - ALL |
| Profit with Minimum Volume Constraint | $114,017 | Demo | 3/22/2001 | 4/22/2001 | Base | Optimized | ALL |
| Scenario created by David | $231,259 | David | 2/14/2001 | 3/14/2001 | Base | Optimized | ALL |
| Scenario created by John | | John | 2/19/2001 | 3/19/2001 | Base | | ALL |
| Scenario created by Lori | $32,821 | Lori | 4/8/2001 | 5/8/2001 | Base | Optimized | ALL |
| Scenario created by John | $37,960 | John | 2/16/2001 | 3/16/2001 | Base | Optimized | ALL - ALL |
| Scenario created by jcrowther | $97,718 | jcrowther | 3/5/2001 | 4/5/2001 | Base | Optimized | ALL |
| Farm Fresh | $114,404 | jcrowther | 3/16/2001 | 4/16/2001 | Base | Optimized | ALL |
| NEW 3 | $221,025 | Suzy | 4/29/2001 | 5/27/2001 | Base | Optimized | ALL - ALL |
| Basic Scenario - no constraints | $20,420 | jcrowther | 2/16/2001 | 3/16/2001 | Base | Optimized | Bar Soap |
| N.Atlanta/brv | $19,501 | Rict | 4/9/2001 | 5/9/2001 | Base | Optimized | brv |
| Scenario created by UIDesign | | UIDesign | 3/19/2001 | 4/19/2001 | Base | Pending | Dial Bar Soap |
| Scenario created by UIDesign | | UIDesign | 3/19/2001 | 4/19/2001 | Base | | Dial Bar Soap |
| Scenario created by jclose | | jclose | 3/6/2001 | 4/6/2001 | Base | | Irish Spring Bar Soap |
| TEST SCENARIO | | Rict | 4/2/2001 | 5/2/2001 | Base | | Irish Spring Bar Soap |
| Scenario created by UIDesign | | UIDesign | 3/20/2001 | 4/20/2001 | Base | Pending | Irish Spring Bar Soap |
| Midtown Liquid | | Rict | 4/9/2001 | 5/9/2001 | Base | | Liquid Soap |
| Scenario created by PeterB | | PeterB | 2/1/2001 | 2/28/2001 | Base | | Liquid Soap |
| Max/Private label | | Bob | 2/26/2001 | 3/26/2001 | Base | | Private Label - ALL |
| C/o C/o C/o Scenario created by Bob | | Bob | 2/26/2001 | 3/30/2001 | Base | Pending | ALL - ALL |
| C/o C/o C/o Scenario created by Bob | $907,277 | Bob | 2/26/2001 | 3/30/2001 | Base | Optimized | Private Label - North Atla |
| Scenario created by Bob | $16,664 | Bob | 2/26/2001 | 3/30/2001 | Base | Optimized | ALL - ALL |
| C/o Scenario created by Bob | $4,451 | Bob | 2/26/2001 | 3/30/2001 | Base | Optimized | ALL - ALL |
| C/o C/o Scenario created by Bob | $21,208 | Bob | 2/26/2001 | 3/30/2001 | Base | Optimized | ALL - ALL |

FIG. 6

| Select a column and drag its header here to group (and sort) by that column | | Currently |
|---|---|---|
| Name | NetProfit | WhoCreated |
| C/o infeasible groups | $41,965 | robert |
| Example Midtown Scenario | $25,760 | Rick |
| Infeasible groups | | robert |
| C/o Clustered and ends in 9 | $99,501 | Suzy |
| Scenario created by John | | John |
| Scenario with Price Constraints | $112,262 | jcrowther |
| Max Profit with Reasonable Vol Constr | $189,205 | jcrowther |
| Profit with Minimum Volume Constraint | $114,017 | Demo |
| Scenario created by David | $231,259 | David |
| Scenario created by John | | John |
| Scenario created by Lori | $32,821 | Lori |
| Scenario created by John | $37,960 | John |
| Scenario created by jcrowther | $97,718 | jcrowther |
| Farm Fresh | $114,404 | jcrowther |

FIG. 6A

Defined Scenarios — 600

| StartDate | EndDate | ScenarioType | ScenarioRuns | Description |
|---|---|---|---|---|
| 3/9/2001 | 4/9/2001 | Base | Optimized | ALL |
| 3/28/2001 | 4/28/2001 | Base | Optimized | ALL |
| 3/9/2001 | 4/9/2001 | Base | Pending | ALL |
| 2/15/2001 | 3/15/2001 | Base | Optimized | ALL - North Atlanta Clust |
| 2/19/2001 | 3/19/2001 | Base | | ALL |
| 2/28/2001 | 3/28/2001 | Base | Optimized | ALL |
| 2/16/2001 | 3/16/2001 | Base | Optimized | ALL - ALL |
| 3/22/2001 | 4/22/2001 | Base | Optimized | ALL |
| 2/14/2001 | 3/14/2001 | Base | Optimized | ALL |
| 2/19/2001 | 3/19/2001 | Base | | ALL |
| 4/8/2001 | 5/8/2001 | Base | Optimized | ALL |
| 2/16/2001 | 3/16/2001 | Base | Optimized | ALL - ALL |
| 3/5/2001 | 4/5/2001 | Base | Optimized | ALL |
| 3/16/2001 | 4/16/2001 | Base | Optimized | ALL |

FIG. 6B

| | | |
|---|---|---|
| NEW 3 | $221,025 | Suzy |
| Basic Scenario - no constraints | $20,420 | jcrowther |
| N.Atlanta/brv | $19,601 | Rick |
| Scenario created by UIDesign | | UIDesign |
| Scenario created by UIDesign | | UIDesign |
| Scenario created by jclose | | jclose |
| TEST SCENARIO | | Rick |
| Scenario created by UIDesign | | UIDesign |
| Midtown Liquid | | Rick |
| Scenario created by PeterB | | PeterB |
| Max/Private label | | Bob |
| C/o C/o C/o Scenario created by Bob | | Bob |
| C/o C/o Scenario created by Bob | $907,277 | Bob |
| Scenario created by Bob | $16,664 | Bob |
| C/o Scenario created by Bob | $4,451 | Bob |
| C/o Scenario created by Bob | $21,208 | Bob |

FIG. 6C

| | | | |
|---|---|---|---|
| 4/29/2001 | 5/27/2001 | Base | Optimized | ALL - ALL |
| 2/16/2001 | 3/16/2001 | Base | Optimized | Bar Soap |
| 4/9/2001 | 5/9/2001 | Base | Optimized | bry |
| 3/19/2001 | 4/19/2001 | Base | Pending | Dial Bar Soap |
| 3/19/2001 | 4/19/2001 | Base | | Dial Bar Soap |
| 3/6/2001 | 4/6/2001 | Base | | Irish Spring Bar Soap |
| 4/2/2001 | 5/2/2001 | Base | | Irish Spring Bar Soap |
| 3/20/2001 | 4/20/2001 | Base | Pending | Irish Spring Bar Soap |
| 4/9/2001 | 5/9/2001 | Base | | Liquid Soap |
| 2/1/2001 | 2/28/2001 | Base | | Liquid Soap |
| 2/26/2001 | 3/26/2001 | Base | | Private Label - ALL |
| 2/26/2001 | 3/30/2001 | Base | Pending | ALL - ALL |
| 2/26/2001 | 3/30/2001 | Base | Optimized | Private Label - North Atla |
| 2/26/2001 | 3/30/2001 | Base | Optimized | ALL - ALL |
| 2/26/2001 | 3/30/2001 | Base | Optimized | ALL - ALL |
| 2/26/2001 | 3/30/2001 | Base | Optimized | ALL - ALL |

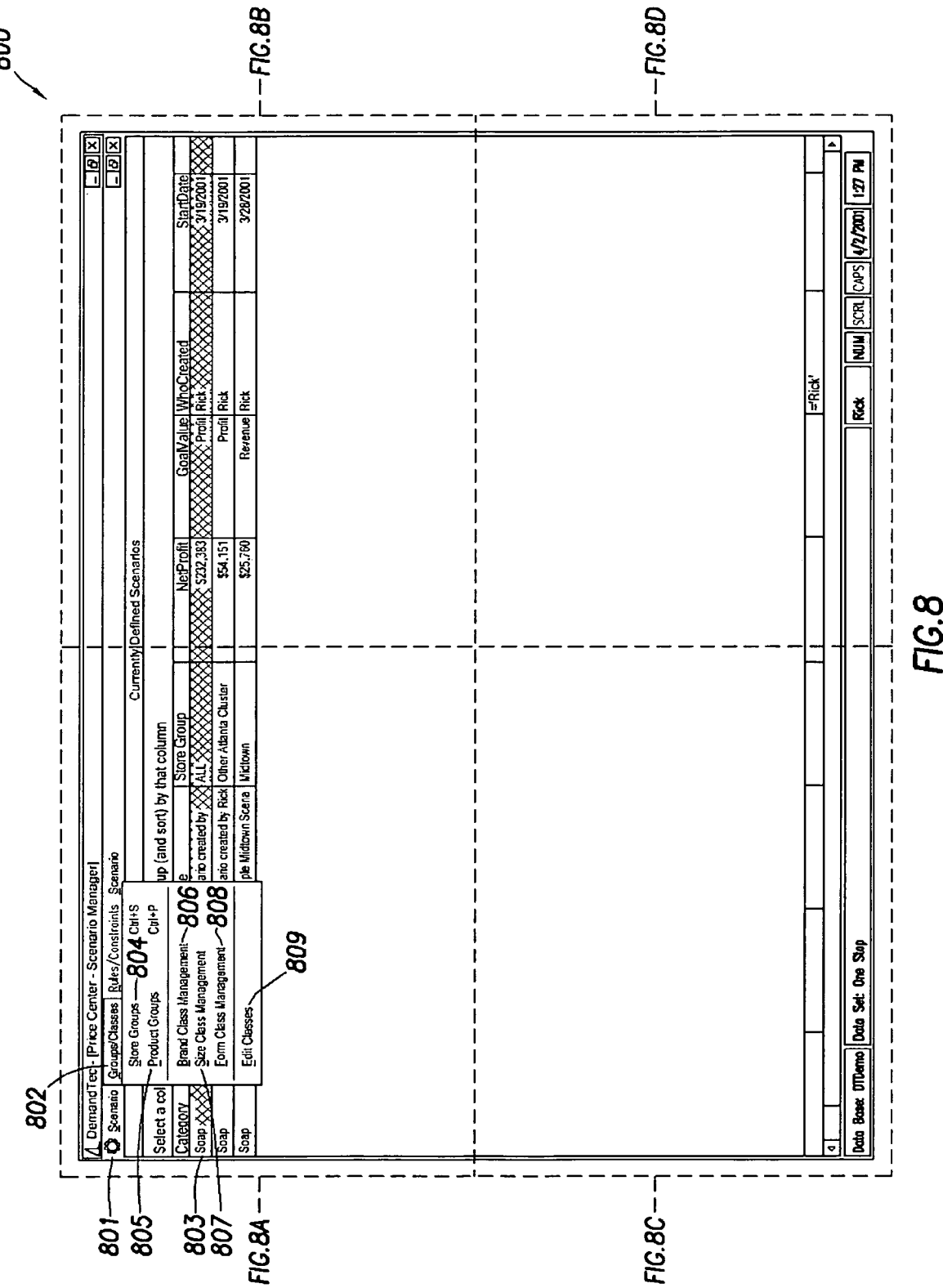

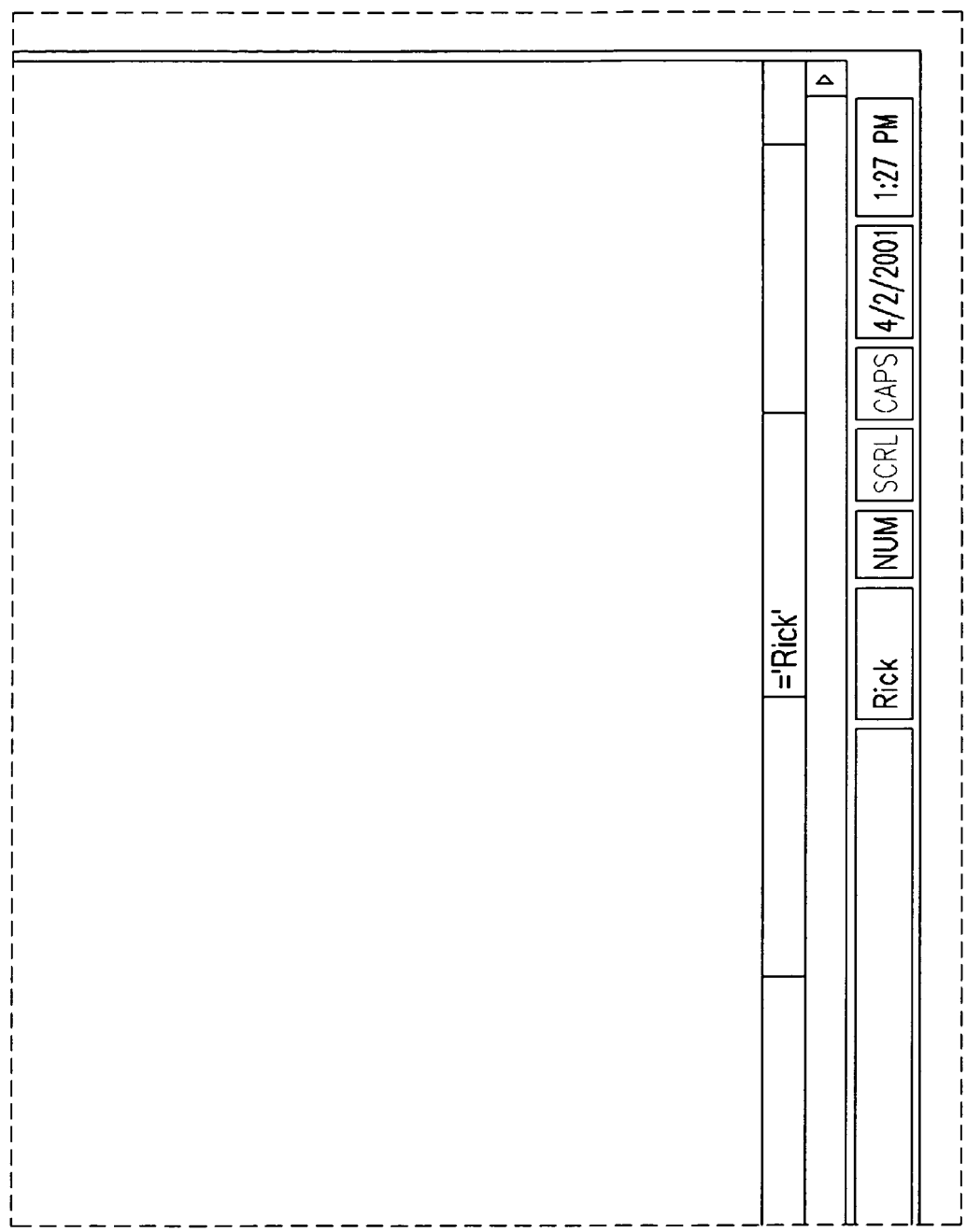

FIG. 9

| DemandTec - [Price Center - Scenario Manager] | | | | |
|---|---|---|---|---|
| Scenario Groups/Classes Rules/Constraints Admin —902 | | | | Defi |
| | | Personal Settings —904 | | |
| Select a column and drag its header here to | | Export Category Coefficients —905 | | |
| | | Exit —906 | Ctrl+X | |
| Category | ProductGroup | Scenario created by | ALL | Other Atlanta Cluster |
| Soap | ALL | Scenario created by Rick | | Midtown |
| Soap | ALL | Example Midtown Scena | | |
| Soap | ALL | | | |

DemandTec - [Price Center - Scenario Manager]

Scenario  Groups/Classes  Rules/Constraints  Admin

Select a column and drag its header here to group (and sort) by that column

| Category | ProductGroup | Name | Store Group |
|---|---|---|---|
| Soap | ALL | C/o infeasible groups | South Atlanta |
| Soap | ALL | Example Midtown Scena | Midtown |
| Soap | ALL | Scenario created by Hum | Midtown |
| Soap | ALL | infeasible groups | South Atlanta |
| Soap | ALL | C/o Clustered and ends i | North Atlanta Cluster |
| Soap | ALL | Scenario created by John | ALL |
| Soap | ALL | Scenario with Price Cons | ALL |
| Soap | ALL | Max Profit with | ALL |
| Soap | ALL | Profit with Minimum Volu | ALL |
| Soap | ALL | Scenario created by Dav | ALL |
| Soap | ALL | Scenario created by John | ALL |
| Soap | ALL | Scenario created by jcro | ALL |
| Soap | ALL | Farm Fresh | ALL |

FIG. 16A

| NetProfit | GoalValue | WhoCreated | StartDate |
|---|---|---|---|
| $41,965 | Profit | robert | 3/9/2001 |
| $25,760 | Revenue | Rick | 3/28/2001 |
| | Profit | HumanFactors | 3/5/2001 |
| | Profit | robert | 3/9/2001 |
| $99,501 | Profit | Suzy | 2/15/2001 |
| | Profit | John | 2/19/2001 |
| $112,262 | Profit | jcrowther | 2/28/2001 |
| $189,205 | Profit | jcrowther | 2/16/2001 |
| | Profit | Demo | 3/22/2001 |
| $231,259 | Profit | David | 2/14/2001 |
| | Profit | John | 2/19/2001 |
| $37,960 | Volume | John | 2/16/2001 |
| $97,718 | Profit | jcrowther | 3/5/2001 |
| $114,404 | Profit | jcrowther | 3/16/2001 |

| Soap | ALL | NEW 3 | ALL |
|------|-----|-------|-----|
| Soap | Bar Soap | Basic Scenario - no cons | Midtown |
| Soap | Big V Soap Products | C/o Big V Scenario | North Atlanta |
| Soap | Big V Soap Products | Big V Scenario | North Atlanta |
| Soap | Dial Bar Soap | Scenario created by UID | Midtown |
| Soap | Dial Bar Soap | Scenario created by UID | Midtown |
| Soap | Irish Spring Bar Soap | Scenario created by jclos | ALL |
| Soap | Irish Spring Bar Soap | TEST SCENARIO | Other Atlanta Cluster |
| Soap | Irish Spring Bar Soap | Scenario created by UID | ALL |
| Soap | Private Label | Max/Private label | ALL |
| Soap | Private Label | C/o C/o C/o Scenario cr | North Atlanta Cluster |
| Soap | Private Label | C/o C/o C/o Scenario cr | North Atlanta Cluster |
| Soap | Private Label | Scenario created by Bob | North Atlanta Cluster |
| Soap | Private Label | C/o Scenario created by | North Atlanta Cluster |
| Soap | Private Label | C/o C/o Scenario create | North Atlanta Cluster |

Data Base: DTDemo  Data Set: One Stop

| | | | |
|---|---|---|---|
| $221,025 | Profit | Suzy | 4/29/2001 |
| $20,420 | Profit | jcrowther | 2/16/2001 |
| $16,062 | Profit | Gary | 3/9/2001 |
| $18,876 | Profit | Gary | 3/9/2001 |
| | Profit | UIDesign | 3/19/2001 |
| | Profit | UIDesign | 3/19/2001 |
| | Profit | jclose | 3/6/2001 |
| | Profit | Rick | 4/2/2001 |
| | Volume | UIDesign | 3/20/2001 |
| $902,277 | Profit | Bob | 2/26/2001 |
| $16,664 | Profit | Bob | 2/26/2001 |
| $4,451 | Profit | Bob | 2/26/2001 |
| $21,208 | Profit | Bob | 2/26/2001 |
| | Profit | Bob | 2/26/2001 |

| Rick | NUM | SCRL | CAPS | 4/2/2001 | 1:38 PM |

DemandTec - [Price Center - Scenario Manager]

Scenario  Groups/Classes  Rules/Constraints  Admin

Select a column and drag its header here to group (and sort) by that column

Currently Defin

| Category | ProductGroup | Name | Store Group |
|---|---|---|---|
| Soap | ALL | C/o infeasible groups | South Atlanta |
| Soap | ALL | Example Midtown Scena | Midtown |
| Soap | ALL | Scenario created by Hum | Midtown |
| Soap | ALL | infeasible groups | South Atlanta |
| Soap | ALL | C/o Clustered and ends i | North Atlanta Cluster |
| Soap | ALL | Scenario created by John | ALL |
| Soap | ALL | Scenario with Price Cons | ALL |
| Soap | ALL | Max Profit with Reasona | ALL |
| Soap | ALL | Profit with Minimum Volu | ALL |
| Soap | ALL | Scenario created by Dav | ALL |
| Soap | ALL | Scenario created by John | ALL |
| Soap | ALL | Scenario created by | ALL |
| Soap | ALL | Farm Fresh | ALL |

FIG. 17A

*1700* ed Scenarios

| NetProfit | GoalValue | WhoCreated | StartDate |
|---|---|---|---|
| $41,965 | Profit | robert | 3/9/2001 |
| $25,760 | Revenue | Rick | 3/28/2001 |
|  | Profit | HumanFactors | 3/5/2001 |
|  | Profit | robert | 3/9/2001 |
| $99,501 | Profit | Suzy | 2/15/2001 |
|  | Profit | John | 2/19/2001 |
| $112,262 | Profit | jcrowther | 2/28/2001 |
| $189,205 | Profit | jcrowther | 2/16/2001 |
| $231,259 | Profit | David | 2/14/2001 |
|  | Profit | John | 2/19/2001 |
| $37,960 | Volume | John | 2/16/2001 |
| $97,718 | Profit | jcrowther | 3/5/2001 |
| $114,404 | Profit | jcrowther | 3/16/2001 |

*FIG. 17B*

| | | | | 4/29/2001 | |
| --- | --- | --- | --- | --- | --- |
| $221,025 | Profit | Suzy | | | |
| $20,420 | Profit | jcrowther | | 2/16/2001 | |

| Optimized | % of Rev | Change |
| --- | --- | --- |
| 1,499,656 | | +2.0% |
| 1,058,298 | 100.0% | -0.9% |
| 3,232,269 | | +0.3% |
| 2.16 | | -1.7% |
| 2,301,667 | | -2.3% |
| 930,602 | 28.8% | +7.4% |
| 91,897 | | -1.0% |
| 838,705 | 25.9% | +8.4% |
| 740,987 | | |
| 97,718 | 3.0% | +199.9% |

1700

1702

Rules    Results    Rick    NUM  SCRL  CAPS  4/2/2001  1:39 PM

Analyze Results of Scenario created by jcrowther

The Category Soap aggregated by Demand Group in the Chain ONESTOP STORES aggre

Result Summary

| | Current | Optimal | Change | %Change |
|---|---|---|---|---|
| ABC Contribution | $773,202 | $838,519 | $65,317 | +8.4% |
| Equiv. Volume | 1,469,984 | 1,499,656 | 29,673 | +2.0% |
| Revenue | $3,221,484 | $3,232,269 | $10,785 | +0.3% |

2201

Drag a column header here to group by that column

| Demand_Group | % Contribution Chg | % Sales Chg | Chain | Initial_Avg_Equiv_Price |
|---|---|---|---|---|
| Bar Soap | 14.6% | -2.5% | ONESTOP STORES | 2.94 |
| Liquid Soap | 1.3% | 5.1% | ONESTOP STORES | 1.68 |

Analyze Results of Scenario created by Rick

The Category Soap aggregated by Demand Group in the Chain ONESTOP STORES aggregat[ed]

Result Summary

|  | Current | Optimal | Change | %Change |
|---|---|---|---|---|
| ABC Contribution | $778,436 | $978,572 | $200,136 | +25.7% |
| Equiv. Volume | 1,478,278 | 1,384,953 | (93,325) | -6.3% |
| Revenue | $3,243,374 | $3,193,414 | ($49,960) | -1.5% |

*2402*

Drag a column header here to group by that column

| Demand_Group | % Contribution Chg | % Sales Chg | District | Initial_Avg_Equiv_Price | Initial_Contribution |
|---|---|---|---|---|---|
| Bar Soap | 24.8% | -6.0% | Sandy Springs | 3.12 | 25,792.78 |
| Bar Soap | 25.1% | -5.7% | Midtown | 2.93 | 49,127.00 |

...ed by District | 18 Records | One Stop

[Drill Down] [Print] [Export] [Done]

[Change]

| Initial_Equiv_Sales | Optimized_Avg_Equiv_Price | Optimized_Contribution | Optimized_Equiv_Sales | Nr_ |
|---|---|---|---|---|
| 33,516.12 | 3.28 | 32,192.26 | 31,500.93 | |
| 69,540.59 | 3.07 | 61,460.63 | 65,565.07 | |

FIG. 24C

| | | | | |
|---|---|---|---|---|
| Bar Soap | 25.7% | -5.8% | Decatur | 2.95 | 10,277.21 |
| Liquid Soap | 28.9% | -6.3% | Downtown | 1.57 | 57,132.15 |
| Liquid Soap | 23.5% | -6.6% | Decatur | 1.71 | 56,653.73 |
| Liquid Soap | 22.1% | -7.2% | Buckhead | 1.77 | 48,684.85 |
| Bar Soap | 25.6% | -5.4% | Downtown | 2.79 | 25,883.56 |
| Bar Soap | 27.3% | -5.7% | East Atlanta | 3.00 | 77,481.57 |
| Bar Soap | 25.3% | -5.8% | Perimeter | 3.00 | 65,385.44 |
| Liquid Soap | 27.8% | -6.0% | Virginia Highland | 1.54 | 15,144.87 |
| Liquid Soap | 27.2% | -7.2% | Lakewood | 1.79 | 14,559.97 |
| Bar Soap | 23.0% | -5.5% | Buckhead | 2.84 | 123,095.57 |
| Bar Soap | 23.3% | -5.3% | Lakewood | 2.79 | 17,745.20 |
| Liquid Soap | 25.7% | -7.0% | Midtown | 1.84 | 25,552.57 |
| Liquid Soap | 29.1% | -6.8% | Sandy Springs | 1.67 | 41,742.40 |
| Liquid Soap | 27.3% | -6.4% | East Atlanta | 1.48 | 25,945.71 |
| Bar Soap | 29.6% | -6.1% | Virginia Highland | 3.19 | 26,463.21 |
| Liquid Soap | 27.3% | -7.2% | Perimeter | 1.76 | 71,767.98 |

2400

| | | | |
|---|---|---|---|
| 14,575.32 | 3.09 | 12,915.69 | 13,736.09 |
| 155,519.22 | 1.64 | 73,653.87 | 145,762.22 |
| 127,429.67 | 1.80 | 69,960.73 | 119,069.59 |
| 103,278.34 | 1.86 | 59,422.29 | 95,826.58 |
| 40,089.90 | 2.93 | 32,497.33 | 37,936.97 |
| 111,123.40 | 3.15 | 98,663.24 | 104,779.52 |
| 91,764.36 | 3.15 | 81,921.28 | 86,430.69 |
| 41,761.02 | 1.61 | 19,359.81 | 39,258.41 |
| 37,242.22 | 1.88 | 18,520.02 | 24,558.00 |
| 179,644.05 | 2.97 | 151,435.57 | 169,790.02 |
| 25,200.98 | 2.93 | 21,880.26 | 23,858.20 |
| 60,416.14 | 1.94 | 32,132.21 | 56,180.05 |
| 106,957.99 | 1.76 | 53,890.00 | 99,659.97 |
| 71,556.72 | 1.55 | 33,040.16 | 66,944.61 |
| 37,240.97 | 3.35 | 34,291.86 | 34,967.19 |
| 171,421.12 | 1.84 | 91,334.82 | 159,129.12 |

DemandTec - [Price Center/ Scenario Manager]
Scenario  Groups/Classes  Rules/Constraints  Admin Currently Defined Scenarios Select a column and drag its header here to group (and sort) by that column

| Name | NetProfit | WhoCreated | StartDate | EndDate | ScenarioType | ScenarioRuns | Description | ProductGroupID |
|---|---|---|---|---|---|---|---|---|
| Clo infeasible groups | $41,565 | robert | 3/9/2001 | 4/9/2001 | Base | Optimized | ALL | {394FE271-317D- |
| Example Midtown Scena | $25,760 | Rick | 3/28/2001 | 4/28/2001 | Base | Optimized | ALL | {394FE271-317D- |
| Scenario created by Hum | | HumanFactors | 3/5/2001 | 4/5/2001 | Base | | ALL - Midtown | {394FE271-317D- |
| infeasible groups | | robert | 3/9/2001 | 4/9/2001 | Base | Pending | ALL | {394FE271-317D- |
| Clo Clustered and ends l | $99,501 | Suzy | 2/15/2001 | 3/15/2001 | Base | Optimized | ALL - North Atlanta Clust | {394FE271-317D- |
| Scenario created by John | | John | 2/19/2001 | 3/19/2001 | Base | | ALL | {394FE271-317D- |
| Scenario with Price Cons | $112,262 | crowther | 2/28/2001 | 3/28/2001 | Base | Optimized | ALL | {394FE271-317D- |
| Max Profit with Reasonal | $189,205 | jcrowther | 2/16/2001 | 3/16/2001 | Base | Optimized | ALL - ALL | {394FE271-317D- |
| Profit with Minimum Volu | | Demo | 3/22/2001 | 4/22/2001 | Base | Pending | ALL | {394FE271-317D- |
| Scenario created by Dav | $231,259 | David | 2/14/2001 | 3/14/2001 | Base | Optimized | ALL | {394FE271-317D- |
| Scenario created by John | | John | 2/19/2001 | 3/19/2001 | Base | | ALL | {394FE271-317D- |
| Scenario created by John | $37,960 | John | 2/16/2001 | 3/16/2001 | Base | Optimized | ALL - ALL | {394FE271-317D- |
| Scenario created by jcro | $97,718 | jcrowther | 3/5/2001 | 4/5/2001 | Base | Optimized | ALL | {394FE271-317D- |
| Fam Fresh | $114,404 | jcrowther | 3/16/2001 | 4/18/2001 | Base | Optimized | ALL - ALL | {394FE271-317D- |
| NEW 3 | $221,025 | Suzy | 4/28/2001 | 5/27/2001 | Base | Optimized | ALL - ALL | {38440853-D86D- |
| Basic Scenario - no cons | $20,420 | jcrowther | 2/16/2001 | 3/16/2001 | Base | Optimized | Bar Soap | {38440853-D86D- |
| Clo Big V Scenario | $16,062 | Gary | 3/9/2001 | 4/9/2001 | Base | Optimized | Big V Soap Products | {1B575F7C-DEAF- |
| Big V Scenario | $18,876 | Gary | 3/9/2001 | 4/9/2001 | Base | Optimized | Big V Soap Products | {1B575F7C-DEAF- |
| Scenario created by UID | | UIDesign | 3/19/2001 | 4/19/2001 | Base | Pending | Dial Bar Soap | {F9FB052C-DB67- |
| Scenario created by UID | | UIDesign | 3/19/2001 | 4/19/2001 | Base | | Dial Bar Soap | {F9FB052C-DB67- |
| Scenario created by jdos | | close | 3/6/2001 | 4/6/2001 | Base | | Irish Spring Bar Soap | {86BB4023-7E7F- |
| TEST SCENARIO | | Rick | 4/22/2001 | 5/22/2001 | Base | | Irish Spring Bar Soap | {86BB4023-7E7F- |
| Scenario created by UID | | UIDesign | 3/20/2001 | 4/20/2001 | Base | Pending | Irish Spring Bar Soap | {86BB4023-7E7F- |
| Max/Private label | | Bob | 2/26/2001 | 3/26/2001 | Base | Pending | Private Label - ALL | {86BB4023-7E7F- |
| Clo Clo Clo Scenario cr | | Bob | 2/26/2001 | 3/30/2001 | Base | Optimized | Private Label - North Atla | {DF0C9245-63ED- |
| Clo Clo Scenario cr | $902,277 | Bob | 2/26/2001 | 3/30/2001 | Base | Optimized | ALL - ALL | {DF0C9245-63ED- |
| Scenario created by Bob | $16,664 | Bob | 2/26/2001 | 3/30/2001 | Base | Optimized | ALL - ALL | {DF0C9245-63ED- |
| Clo Scenario created by | $4,451 | Bob | 2/26/2001 | 3/30/2001 | Base | Optimized | ALL - ALL | {DF0C9245-63ED- |
| Clo Clo Scenario create | $21,208 | Bob | 2/26/2001 | 3/30/2001 | Base | Optimized | ALL - ALL | {DF0C9245-63ED- |

Data Base: DTDemo   Data Set: One Stop   Rick   NUM SCRL CAPS   4/2/2001   1:50 PM

2900

| Name | NetProfit | WhoCreated | StartDate |
|---|---|---|---|
| C/o infeasible groups | $41,965 | robert | 3/9/2001 |
| Example Midtown Scena | $25,760 | Rick | 3/28/2001 |
| Scenario created by Hum | | HumanFactors | 3/5/2001 |
| infeasible groups | | robert | 3/9/2001 |
| C/o Clustered and ends i | $99,501 | Suzy | 2/15/2001 |
| Scenario created by John | | John | 2/19/2001 |
| Scenario with Price Cons | $112,262 | jcrowther | 2/28/2001 |
| Max Profit with Reasonal | $189,205 | jcrowther | 2/16/2001 |
| Profit with Minimum Volu | $231,259 | Demo | 3/22/2001 |
| Scenario created by Dav | | David | 2/14/2001 |
| Scenario created by John | | John | 2/19/2001 |
| Scenario created by John | $37,960 | John | 2/16/2001 |
| Scenario created by jcro | $97,718 | jcrowther | 3/5/2001 |
| Farm Fresh | $114,404 | jcrowther | 3/16/2001 |

2900 ned Scenarios

| EndDate | ScenarioType | ScenarioRuns | Description | ProductGroupID |
|---|---|---|---|---|
| 4/9/2001 | Base | Optimized | ALL | {39AFE271-317D- |
| 4/28/2001 | Base | Optimized | ALL | {39AFE271-317D- |
| 4/5/2001 | Base | | ALL - Midtown | {39AFE271-317D- |
| 4/9/2001 | Base | Pending | ALL | {39AFE271-317D- |
| 3/15/2001 | Base | Optimized | ALL - North Atlanta Clust | {39AFE271-317D- |
| 3/19/2001 | Base | | ALL | {39AFE271-317D- |
| 3/28/2001 | Base | Optimized | ALL | {39AFE271-317D- |
| 3/16/2001 | Base | Optimized | ALL - ALL | {39AFE271-317D- |
| 4/22/2001 | Base | Pending | ALL | {39AFE271-317D- |
| 3/14/2001 | Base | Optimized | ALL | {39AFE271-317D- |
| 3/19/2001 | Base | | ALL | {39AFE271-317D- |
| 3/16/2001 | Base | Optimized | ALL - ALL | {39AFE271-317D- |
| 4/5/2001 | Base | Optimized | ALL | {39AFE271-317D- |
| 4/16/2001 | Base | Optimized | ALL | {39AFE271-317D- |

_2900_

| | | |
|---|---|---|
| NEW 3 | $221,025 Suzy | 4/29/2001 |
| Basic Scenario - no cons | $20,420 jcrowther | 2/16/2001 |
| C/o Big V Scenario | $16,062 Gary | 3/9/2001 |
| Big V Scenario | $18,876 Gary | 3/9/2001 |
| Scenario created by UID | UIDesign | 3/19/2001 |
| Scenario created by UID | UIDesign | 3/19/2001 |
| Scenario created by jclos | jclose | 3/6/2001 |
| TEST SCENARIO | Rick | 4/2/2001 |
| Scenario created by UID | UIDesign | 3/20/2001 |
| Max/Private label | Bob | 2/26/2001 |
| C/o C/o C/o Scenario cr | Bob | 2/26/2001 |
| C/o C/o C/o Scenario cr | $902,277 Bob | 2/26/2001 |
| Scenario created by Bob | $16,664 Bob | 2/26/2001 |
| C/o Scenario created by | $4,451 Bob | 2/26/2001 |
| C/o C/o Scenario create | $21,208 Bob | 2/26/2001 |
| | | |
| ▽ | | |

Data Base: DTDemo  Data Set: One Stop

| | | | | |
|---|---|---|---|---|
| 5/27/2001 | Base | Optimized | ALL - ALL | {39AFE271-317D- |
| 3/16/2001 | Base | Optimized | Bar Soap | {38440858-D86D- |
| 4/9/2001 | Base | Optimized | Big V Soap Products | {1B575F7C-DEAF- |
| 4/9/2001 | Base | Optimized | Big V Soap Products | {1B575F7C-DEAF- |
| 4/19/2001 | Base | Pending | Dial Bar Soap | {F9FB652C-DB67- |
| 4/19/2001 | Base | | Dial Bar Soap | {F9FB652C-DB67- |
| 4/6/2001 | Base | | Irish Spring Bar Soap | {86BB4023-7E7F- |
| 5/2/2001 | Base | | Irish Spring Bar Soap | {86BB4023-7E7F- |
| 4/20/2001 | Base | Pending | Irish Spring Bar Soap | {86BB4023-7E7F- |
| 3/26/2001 | Base | | Private Label - ALL | {DF0C9245-63ED- |
| 3/30/2001 | Base | Pending | ALL - ALL | {DF0C9245-63ED- |
| 3/30/2001 | Base | Optimized | Private Label - North Atla | {DF0C9245-63ED- |
| 3/30/2001 | Base | Optimized | ALL - ALL | {DF0C9245-63ED- |
| 3/30/2001 | Base | Optimized | ALL - ALL | {DF0C9245-63ED- |
| 3/30/2001 | Base | Optimized | ALL - ALL | {DF0C9245-63ED- |

Rick | NUM | SCRL | CAPS | 4/2/2001 | 1:50 PM

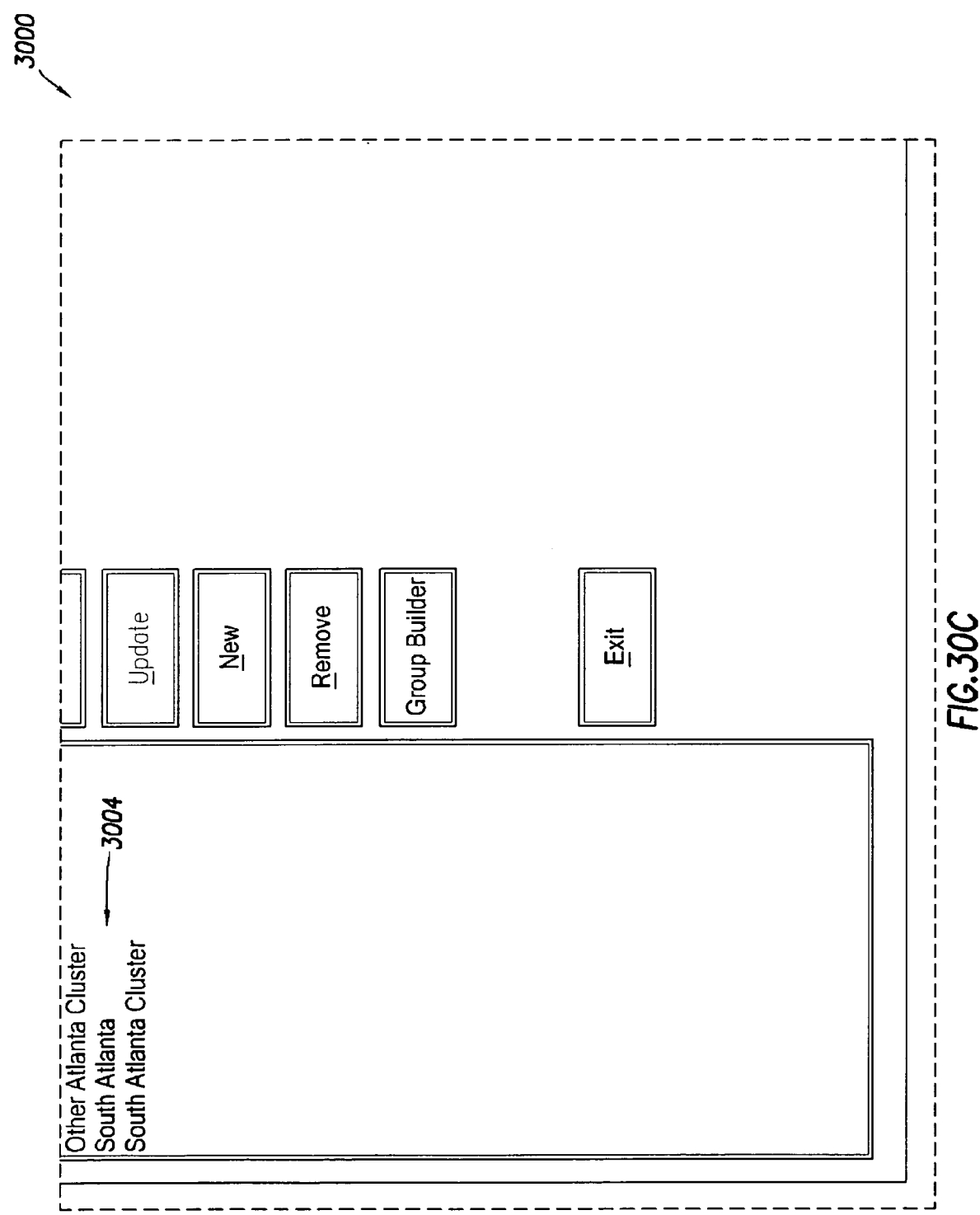

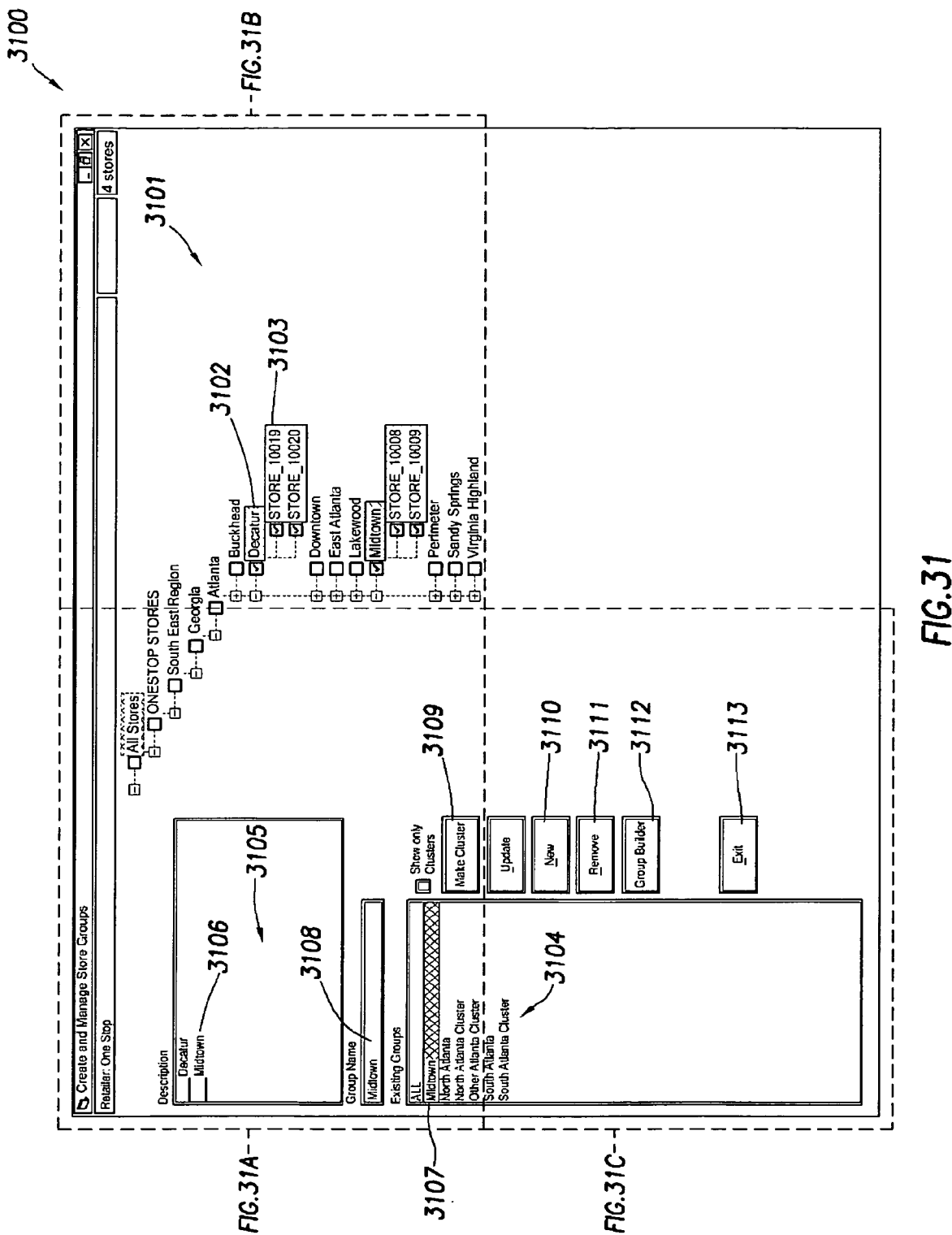

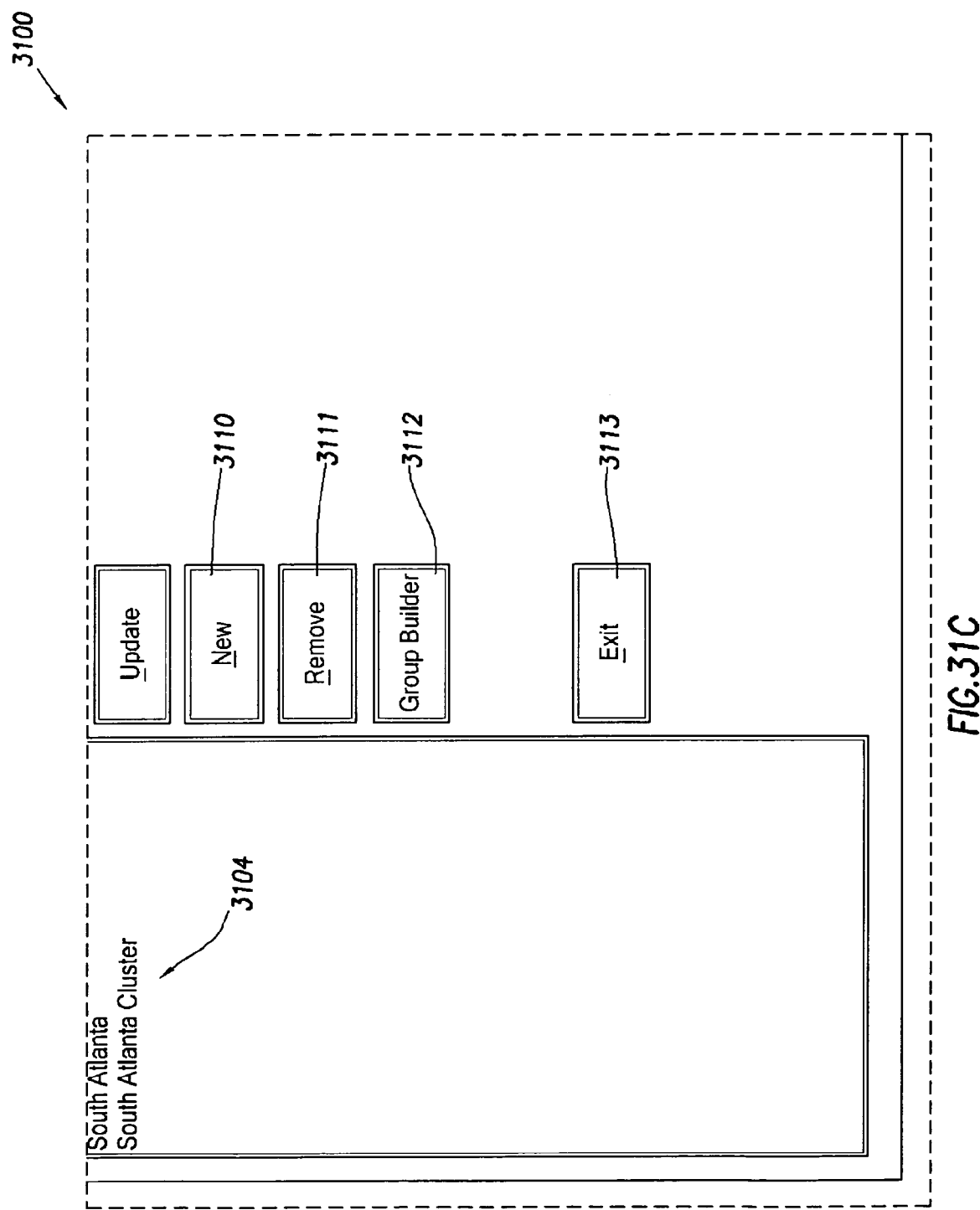

FIG.33B

*Table rotated 90° in figure:*

| | equivalentunits | UnitOfMeasure |
|---|---|---|
| Soap 8PK | 0.39244186046511 6 | OZ |
| er's Lavend | 0.234375 | OZ |
| Skin Care | 1.5 | OZ |
| ntibacteria | 0.5 | OZ |
| e Bar Soa | 0.478723404255319 | OZ |
| ace Olive a | 1.6875 | OZ |
| g Sport So | 0.9 | OZ |
| Cleansing | 0.46875 | OZ |
| ented Ba | 1.436170212765964 | OZ |
| bel White | 0.9 | OZ |
| D Antibact | 1.5 | OZ |

3300, 3301, 3302

Constraints s and its memberproducts [87 shown]
oup by that column

*FIG.33D*

| | |
|---|---|
| bel Pink B | 0.45 OZ |
| Pink BarS | 1.4210526315789 OZ |
| g Soap Re | 0.45 OZ |
| r's Almond | 0.234375 OZ |
| 12 CT | 0.25 OZ |
| Soap 2PK | 1.4361702127659 OZ |
| a Liquid S | 0.9375 OZ |
| Olive and | 1.5 OZ |
| Country De | 1 OZ |
| p Liquid | 1 OZ |
| iquid Fruit | 1 OZ |
| water Fre | 0.9 OZ |
| ntibacteria | 1 OZ |
| Honey Ba | 1.5 OZ |
| iquid Fruit | 1 OZ |
| g Soap Wa | 0.9 OZ |
| Bar Soap 3 | 1 OZ |
| bel Pink B | 0.9 OZ |
| g Soap Ori | 0.3375 OZ |
| bel Pink B | 0.3375 OZ |
| g Soap 3P | 0.9 OZ |

3300

Currently Defined Scenarios

Select a column and drag its header here to group (and sort) by that column

| Name | NetProfit | WhoCreated | StartDate | EndDate | ScenarioType | ScenarioRuns | Description |
|---|---|---|---|---|---|---|---|
| C/o infeasible groups | $41,965 | robert | 3/9/2001 | 4/9/2001 | Base | Optimized | ALL |
| Example Midtown Scenario | $25,760 | Rick | 3/28/2001 | 4/28/2001 | Base | Optimized | ALL |
| Infeasible groups | | robert | 3/9/2001 | 4/9/2001 | Base | Pending | ALL |
| C/o Clustered and ends in 9 | $99,501 | Suzy | 2/15/2001 | 3/15/2001 | Base | Optimized | ALL - North Atlanta Clust |
| Scenario created by John | | John | 2/19/2001 | 3/19/2001 | Base | | ALL |
| Scenario with Price Constraints | $112,262 | jcrowther | 2/28/2001 | 3/28/2001 | Base | Optimized | ALL |
| Max Profit with Reasonable Vol Constr | $169,205 | jcrowther | 2/16/2001 | 3/16/2001 | Base | Optimized | ALL - ALL |
| Profit with Minimum Volume Constraint | $114,017 | Demo | 3/22/2001 | 4/22/2001 | Base | Optimized | ALL |
| Scenario created by David | $231,258 | David | 2/14/2001 | 3/14/2001 | Base | Optimized | ALL |
| Scenario created by John | | John | 2/19/2001 | 3/19/2001 | Base | | ALL |
| Scenario created by Lori | $32,821 | Lori | 4/8/2001 | 5/8/2001 | Base | Optimized | ALL |
| Scenario created by John | $37,960 | John | 2/16/2001 | 3/16/2001 | Base | Optimized | ALL - ALL |
| Scenario created by jcrowther | $97,718 | jcrowther | 3/5/2001 | 4/5/2001 | Base | Optimized | ALL |
| Farm Fresh | $114,404 | jcrowther | 3/18/2001 | 4/18/2001 | Base | Optimized | ALL |
| NEW 3 | $221,025 | Suzy | 4/29/2001 | 5/27/2001 | Base | Optimized | ALL - ALL |
| Basic Scenario - no constraints | $20,420 | jcrowther | 2/16/2001 | 3/16/2001 | Base | Optimized | Bar Soap |
| N.Atlanta/brv | $19,501 | Rick | 4/9/2001 | 5/9/2001 | Base | Optimized | brv |

| RuleType | Active | Description | StoreGroup | ProductGroup | MinValue | MaxValue | Owner |
|---|---|---|---|---|---|---|---|

General | Location | Products | Rules | Results

FIG. 34

| Select a column and drag its header here to group (and sort) by that column | | Currently |
|---|---|---|
| Name | NetProfit | WhoCreated |
| C/o infeasible groups | $41,965 | robert |
| Example Midtown Scenario | $25,760 | Rick |
| Infeasible groups | | robert |
| C/o Clustered and ends in 9 | $99,501 | Suzy |
| Scenario created by John | | John |
| Scenario with Price Constraints | $112,262 | jcrowther |
| Max Profit with Reasonable Vol Constr | $189,205 | jcrowther |
| Profit with Minimum Volume Constraint | $114,017 | Demo |
| Scenario created by David | $231,259 | David |
| Scenario created by John | | John |
| Scenario created by Lori | $32,821 | Lori |
| Scenario created by John | $37,960 | John |
| Scenario created by jcrowther | $97,718 | jcrowther |
| Farm Fresh | $114,404 | jcrowther |

Defined Scenarios

| StartDate | EndDate | ScenarioType | ScenarioRuns | Description |
|---|---|---|---|---|
| 3/9/2001 | 4/9/2001 | Base | Optimized | ALL |
| 3/28/2001 | 4/28/2001 | Base | Optimized | ALL |
| 3/9/2001 | 4/9/2001 | Base | Pending | ALL |
| 2/15/2001 | 3/15/2001 | Base | Optimized | ALL - North Atlanta Clust |
| 2/19/2001 | 3/19/2001 | Base | | ALL |
| 2/28/2001 | 3/28/2001 | Base | Optimized | ALL |
| 2/16/2001 | 3/16/2001 | Base | Optimized | ALL - ALL |
| 3/22/2001 | 4/22/2001 | Base | Optimized | ALL |
| 2/14/2001 | 3/14/2001 | Base | Optimized | ALL |
| 2/19/2001 | 3/19/2001 | Base | | ALL |
| 4/8/2001 | 5/8/2001 | Base | Optimized | ALL |
| 2/16/2001 | 3/16/2001 | Base | Optimized | ALL - ALL |
| 3/5/2001 | 4/5/2001 | Base | Optimized | ALL |
| 3/16/2001 | 4/16/2001 | Base | Optimized | ALL |

FIG. 34B

| NEW 3 | | |
|---|---|---|
| Basic Scenario - no constraints | $221,025 | Suzy |
| N.Atlanta/bnv | $20,420 | jcrowther |
| | $19,601 | Rick |

| RuleType | Active | Description | StoreGroup | ProductGroup |
|---|---|---|---|---|

| General | Location | Products |
|---|---|---|

FIG.34C

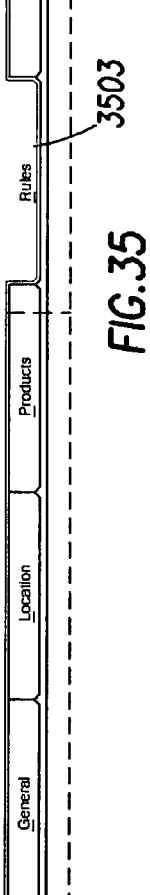

Defined Scenarios 3500

| StartDate | EndDate | ScenarioType | ScenarioRuns | Description |
|---|---|---|---|---|
| 3/9/2001 | 4/9/2001 | Base | Optimized | ALL |
| 3/28/2001 | 4/28/2001 | Base | Optimized | ALL |
| 3/9/2001 | 4/9/2001 | Base | Pending | ALL |
| 2/15/2001 | 3/15/2001 | Base | Optimized | ALL - North Atlanta Cluster |
| 2/19/2001 | 3/19/2001 | Base | | ALL |
| 2/28/2001 | 3/28/2001 | Base | Optimized | ALL |
| 2/16/2001 | 3/16/2001 | Base | Optimized | ALL - ALL |
| 3/22/2001 | 4/22/2001 | Base | Optimized | ALL |
| 2/14/2001 | 3/14/2001 | Base | Optimized | ALL |
| 2/19/2001 | 3/19/2001 | Base | | ALL |
| 4/8/2001 | 5/8/2001 | Base | Optimized | ALL |
| 2/16/2001 | 3/16/2001 | Base | Optimized | ALL - ALL |
| 3/5/2001 | 4/5/2001 | Base | Optimized | ALL |
| 3/16/2001 | 4/16/2001 | Base | Optimized | ALL |

| RuleType | Active | Description | | | |
|---|---|---|---|---|---|
| | | NEW 3 | | $221,025 | Suzy |
| | | Basic Scenario - no constraints | | $20,420 | jcrowther |
| | | N.Atlanta/brv | | $19,601 | Rick |
| | | | StoreGroup | ProductGroup | |

General | Location | Products

| Scenario Manager - Price Center | | | | |
|---|---|---|---|---|
| File | Edit View Tools Help | | | |
| Sce | Duplicate | Ctrl+C | | |
| | Duplicate with Results | Ctrl+W | —3903 | |
| Sele | Delete | Ctrl+D | | |
| | | | to group (and sort) by that column | |
| Ca | Optimize | Ctrl+O | tProfit | Status | Name |
| Ce | Reoptimize a Sub-set | | $ 2,093 | ≫optimizing.. | Simple Scenario - 1 [Copy][3] |
| Ce | Remove Optimization | | $ 8,829 | ≫ optimized | product group volume upper b |
| Ce | Feasibility | △ | $ 1,161 ≫ optimized | | Apply Volume Rule |
| Ce | Review & Approve Prices | | $ 8,836 ≫ optimized | | profit cross store [Copy][3] |
| Cereal | Oct 5, 2001 Clark | | $ 7,705 ≫ optimized | | profit cross store [Copy][3] |
| Cereal | Oct 5, 2001 pranita | | | | Apply Volume Rule |
| Cereal | Oct 5, 2001 pranita | | | | Apply Volume Rule |
| Cereal | Oct 5, 2001 pranita | | | | Apply Volume Rule |
| Cereal | Oct 5, 2001 Clark | | $ 8,836 ≫ optimized | | profit cross store [Copy][1] |
| Cereal | Oct 5, 2001 Clark | | $ 8,836 ≫ optimized | | profit cross store |
| Cereal | Oct 5, 2001 Clark | | $ 0 ≫ optimized | | Expensive to Moderate Other |
| Cereal | Oct 5, 2001 Clark | | $ 0 ≫ optimized | | Expensive to Moderate Other |
| Cereal | Oct 5, 2001 Clark | | $ 0 ≫ optimized | | Expensive to Moderate Other |

| | | | | | |
|---|---|---|---|---|---|
| Cereal | Oct 5, 2001 | clark | $0 | ✓ optimized | Expensive to Moderate Other |
| Cereal | Oct 5, 2001 | clark | $0 | ✓ optimized | Expensive to Moderate Other |
| Cereal | Oct 5, 2001 | clark | $0 | ✓ optimized | Expensive to Moderate Other |
| Cereal | Oct 5, 2001 | clark | $8,096 | ✓ optimized | code review volume goal test |
| Cereal | Oct 5, 2001 | pranita | | | Apply Volume Rule |
| Cereal | Oct 5, 2001 | pranita | $7,721 | ✓ optimized | profit with vol constraint |
| Cereal | Oct 5, 2001 | clark | $8,829 | ✓ optimized | profit not checked |
| Cereal | Oct 5, 2001 | clark | $8,096 | ✓ optimized | revenue not volume |
| Cereal | Oct 5, 2001 | clark | $5,019 | ✓ optimized | revenue no profit 2 |
| Cereal | Oct 5, 2001 | clark | $7,523 | ✓ optimized | revenue both rules |
| Cereal | Oct 5, 2001 | clark | $5,373 | ✓ optimized | volume goal but not profit 2 |
| Cereal | Oct 5, 2001 | clark | $8,063 | ✓ optimized | volume goal but no profit cons |
| Cereal | Oct 5, 2001 | clark | $8,829 | ✓ optimized | profit but no volume constraint |
| Cereal | Oct 5, 2001 | clark | $8,096 | ✓ optimized | volume checked |
| Cereal | Oct 5, 2001 | clark | $7,755 | ✓ optimized | profit rule checked |
| Cereal | Oct 5, 2001 | grabinov | $1,578 | ✓ optimized | grabinov 2001-10-05 [1] |
| Cereal | Oct 5, 2001 | grabinov | $4,969 | ✓ optimized | five stores group |
| Cereal | Oct 5, 2001 | pranita | $4,969 | ✓ optimized | Scenario with ABC |
| Cereal | Oct 5, 2001 | grabinov | $1,003 | ✓ optimized | fr test 5 |

Scenario Manager - Price Center

File  Edit  View  Tools  Help

Scenario List: DT Morgan

Select a column and drag its header here to group (and sort) by that column

| Category | Created | Creator | NetProfit | Status | Name |
|---|---|---|---|---|---|
| Cereal | Oct 4, 2001 | Rick | $ 1,930 | optimized | Simple Scenario - 1 [Copy][3] |
| Cereal | Oct 4, 2001 | jclose | $ 2,093 | optimized | Simple Scenario - 1 [Copy][3] |
| Cereal | Oct 4, 2001 | jclose | | failed | jclose 2001-10-02 [1] |
| Cereal | Oct 4, 2001 | clark | $ 7,937 | optimized | clark 2001-10-04 [2] |
| Cereal | Oct 4, 2001 | clark | | | clark 2001-10-04 [1] |
| Cereal | Oct 4, 2001 | clark | $ 23,560 | optimized | Cross Store : [Copy][ |
| Cereal | Oct 4, 2001 | clark | $ 23,545 | recalc | Cross Store : [Copy][ |
| Cereal | Oct 4, 2001 | clark | $ 23,545 | optimized | Cross Store : [Copy][ |
| Cereal | Oct 4, 2001 | clark | $ 4,989 | optimized | Cross Store : [Copy][ |
| Cereal | Oct 4, 2001 | clark | $ 4,989 | failed | Cross Store : |
| Cereal | Oct 4, 2001 | clark | $ 4,989 | optimized | Volume Rule Product |
| Cereal | Oct 4, 2001 | clark | | optimized | PG (GM) test |
| Cereal | Oct 4, 2001 | clark | | | New DG test Group |

| | | | | |
|---|---|---|---|---|
| Cereal | Oct 4, 2001 | clark | $4,989 | optimized | demand group test |
| Cereal | Oct 4, 2001 | clark | | failed | Prod Group Rule [Copy][1] |
| Cereal | Oct 4, 2001 | clark | $0 | optimized | Prod Group Rule |
| Cereal | Oct 4, 2001 | clark | $6,135 | optimized | zone scenario [Copy][3] |
| Cereal | Oct 4, 2001 | clark | $0 | optimized | zone scenario [Copy][2] |
| Cereal | Oct 4, 2001 | Bob | | | zone scenario [Copy][1] |
| Cereal | Oct 3, 2001 | pranita | $2,383 | optimized | Feasibility test |
| Cereal | Oct 3, 2001 | grabinov | $6,532 | optimized | Verify Unit Cost field |
| Cereal | Oct 3, 2001 | clark | | | buck 57 |
| Cereal | Oct 3, 2001 | clark | $3,085 | optimized | Transitivity Andy 2 [Copy][1] |
| Cereal | Oct 3, 2001 | pranita | $52,973 | optimized | Size Rule Transitivity test - n |
| Cereal | Oct 3, 2001 | dann | | failed | COST DAT IMP TEST3 <Re |
| Cereal | Oct 3, 2001 | dann | | failed | All stores [Copy][2] |
| Cereal | Oct 3, 2001 | dann | $796 | optimized | All stores [Copy][1] |
| Cereal | Oct 3, 2001 | clark | | | All stores |
| Cereal | Oct 3, 2001 | dann | $4,177 | optimized | clark [Copy][1] |
| Cereal | Oct 3, 2001 | dann | $4,177 | optimized | rules are jacked around ABC |
| Cereal | Oct 3, 2001 | dann | | | rules are jacked around ABC |
| Cereal | Oct 3, 2001 | dann | | | rules are jacked around ABC |

FIG. 40C

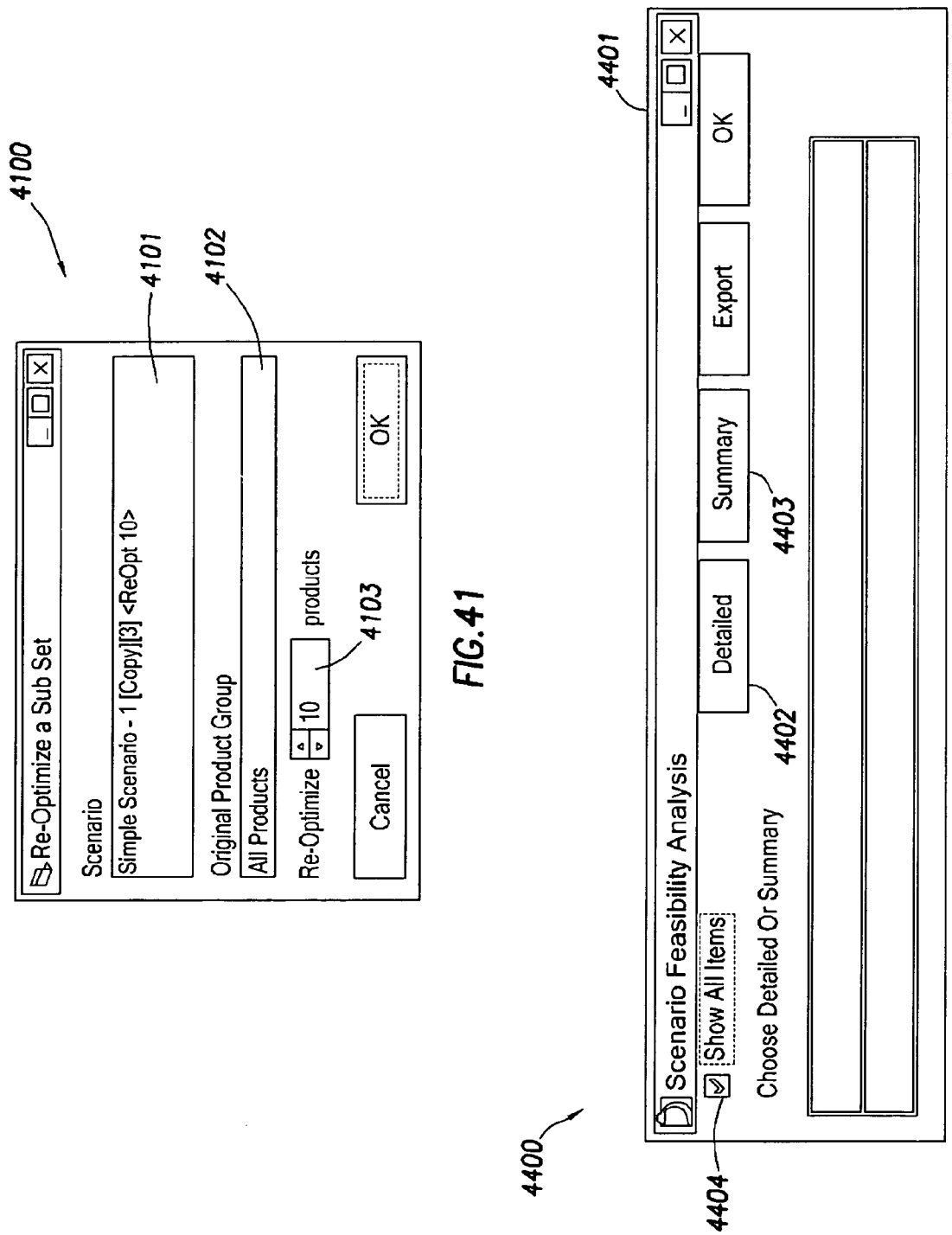

| 4300 | | | |
|---|---|---|---|
| Cereal | Oct 4, 2001 | clark | $23,545 recalc Cross Store : [Copy][ |
| Cereal | Oct 4, 2001 | clark | $23,545 optimized Cross Store : [Copy][ |
| Cereal | Oct 4, 2001 | clark | $4,989 optimized Cross Store : |
| Cereal | Oct 4, 2001 | clark | $4,989 failed Volume Rule Product |
| Cereal | Oct 4, 2001 | clark | $4,989 optimized PG (GM) test |
| Cereal | Oct 4, 2001 | clark | $4,989 optimized New DG test Group |
| Cereal | Oct 4, 2001 | clark | $4,989 optimized demand group test |
| Cereal | Oct 4, 2001 | clark | $0 failed Prod Group Rule [Copy][1] |
| Cereal | Oct 4, 2001 | clark | $0 optimized Prod Group Rule |
| Cereal | Oct 4, 2001 | clark | $6,135 optimized zone scenario [Copy][3] |
| Cereal | Oct 4, 2001 | Bob | $0 optimized zone scenario [Copy][2] |
| Cereal | Oct 3, 2001 | pranita | $2,383 optimized zone scenario [Copy][1] |
| Cereal | Oct 3, 2001 | grabinov | $6,532 optimized Feasibility test |
| Cereal | Oct 3, 2001 | clark | $3,085 optimized Verify Unit Cost field |
| Cereal | Oct 3, 2001 | clark | buck 57 |
| Cereal | Oct 3, 2001 | pranita | Transitivity Andy 2 [Copy][1] |
| Cereal | Oct 3, 2001 | dann | failed Size Rule Transitivity test - nd |
| Cereal | | | COST DAT IMP TEST3 <Re( |
| Cereal | | | All stores [Copy][2] |

FIG. 43C

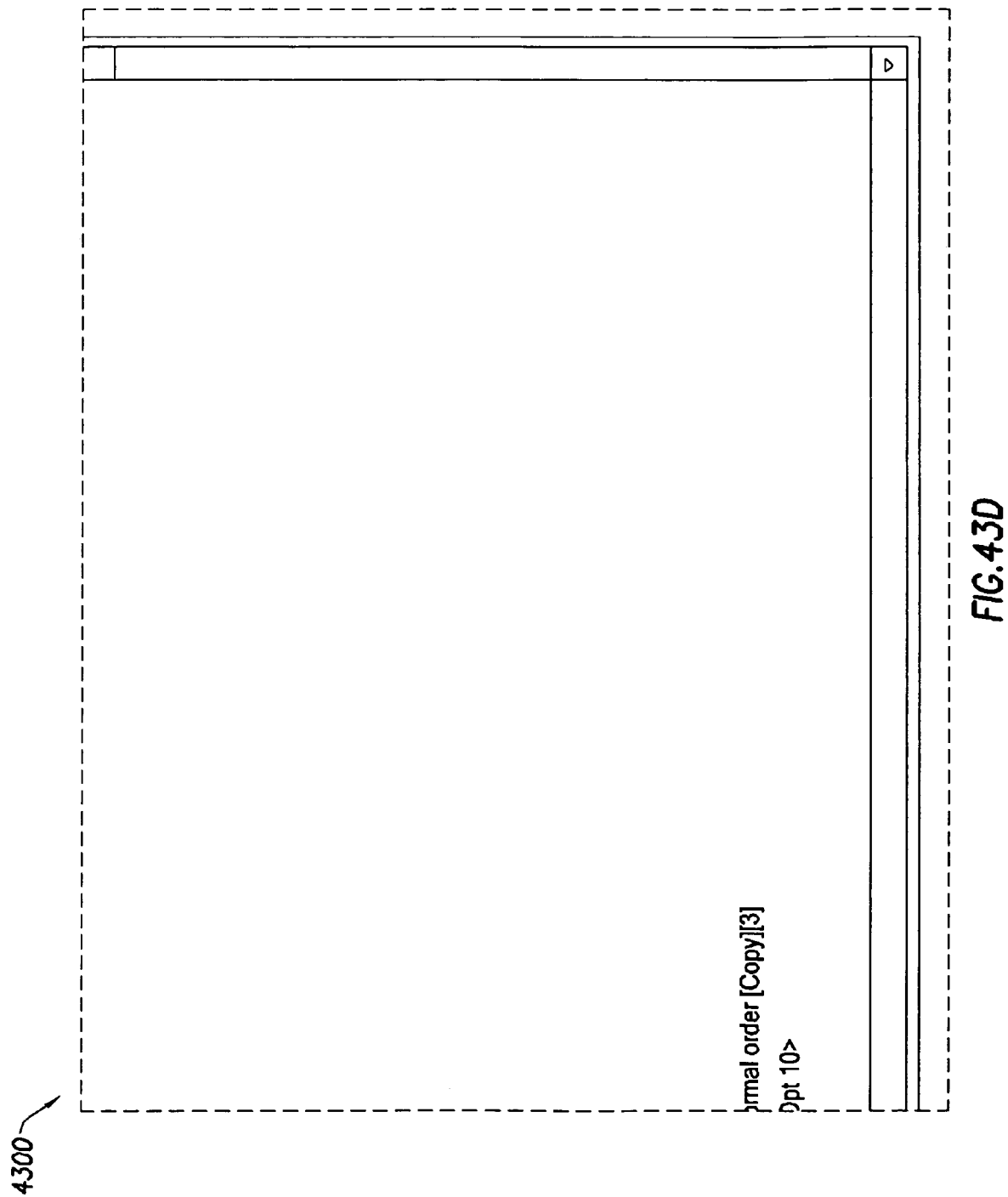

SELECTIVE MERCHANDISE PRICE OPTIMIZATION

CROSS-REFERENCE TO RELATED APPLICATIONS

This application is a continuation-in-part of co-pending U.S. patent application Ser. No. 09/849,616 entitled, Interface for Merchandise Price Optimization, having a common assignee, common inventors, and filed on May 4, 2001. This application is related to the following co-pending U.S. patent applications, all of which have a common assignee and common inventors.

| SERIAL NUMBER | FILING DATE | TITLE |
|---|---|---|
| 09849448 | May 4, 2001 | INTERFACE FOR MERCHANDISE PROMOTION OPTIMIZATION |

BACKGROUND OF THE INVENTION

1. Field of the Invention

This invention relates in general to the field of econometrics, and more particularly to an apparatus and method for determining optimum prices for a set of products within a product category, where the optimum prices are determined to maximize a merchandising figure of merit such as revenue, profit, or sales volume.

2. Description of the Related Art

Today, the average net profit generated chains and individual stores within the consumer products retail industry is typically less than two percent of sales. In other words, these stores make less than two dollars profit for every one hundred dollars in revenue. Stores in this industry walk a very fine line between profitability and bankruptcy. Consequently, in more recent years, those skilled within the merchandising arts have studied and developed techniques to increase profits. These techniques are geared toward the manipulation of certain classes of merchandising variables, or "levers." In broad terms, these merchandising levers fall into five categories: price (i.e., for how much a product is sold), promotion (i.e., special programs, generally limited in time, to incite consumers to purchase particular products), space (i.e., where within a store particular products are displayed), logistics (i.e., how much of and when a product is ordered, distributed, and stocked), and assortment (i.e., the mix of products that are sold within a chain or individual store). It has long been appreciated that manipulating certain attributes within each of these "levers" can result in increased sales for some products, while resulting in decreased sales for other, related products. Therefore, it is no surprise that managers within the consumer products merchandising industry are very disinclined to make any types of changes without a reasonably high confidence that the changes will result in increased profits. The margin for error is so small that the implementation of any wrong decision could mean the difference between a profitable status and an unprofitable status.

Ad hoc methods for manipulating merchandising variables in order to increase profits have been employed for years within the industry. And a whole system of conventional wisdoms regarding how to manipulate certain levers has developed, to the extent that courses of undergraduate and graduate study are offered for the purpose of imparting these conventional wisdoms to future members of the industry. For example, category managers (i.e., those who are responsible for marketing a category of related products within a chain of stores) are inclined to believe that high-volume products possess a high price elasticity. That is, the category managers think that they can significantly increase sales volume for these products by making small price adjustments. But this is not necessarily true. In addition, category managers readily comprehend that products displayed at eye level sell better than those at floor level. Furthermore, it is well known that a store can sell more of a particular product (e.g., dips and salsa) when the particular product is displayed next to a complementary product (e.g., chips). Moreover, ad hoc psychological lever manipulation techniques are employed to increase sales, such as can be observed in some stores that constrain the values of particular price digits (e.g., $1.56 as opposed to $1.99) because conventional insights indicate that demand for some products decreases if those products have prices that end in "9."

Although experiential lessons like those alluded to above cannot be applied in a deterministic fashion, the effects of manipulating merchandising variables can most definitely be modeled statistically with a high degree of accuracy. Indeed, there is a quantifiable relationship between each of these merchandising levers and consumer demand for a product, or group of products, within a store, or a group of stores in a retail chain. And the relationship between these levers and consumer demand can be accurately modeled, as long as the modeling techniques that are employed take into account a statistically sufficient number of factors and data such that credible and unbiased results are provided. Examples of these factors include price and sales history as a function of time (e.g., day of the week, season, holidays, etc.), promotion (e.g., temporary price reductions and other promotional vehicles), competition (e.g., price and sales history information for directly competitive products that are normally substitutes), and product size variations. Those skilled within the art typically refer to a model as is herein described as a demand model because it models the relationship between one or more merchandising levers and consumer demand for a group of products.

The degree to which demand for a particular product is correlated to a particular lever is called its "lever elasticity." For example, a product with a low price elasticity can undergo a significant change in price without affecting demand for the product; a high price elasticity indicates that consumer demand for the product is very susceptible to small price variations.

Demand models are used by product category mangers as stand-alone models, or as part of an integrated demand/price model. In the stand-alone application, a category manager inputs potential prices for a product or product group, and the stand-alone model estimates sales for the product or product group. Accordingly, the category manager selects a set of prices to maximize sales of the product or product group based upon outputs of the stand-alone demand model. An integrated demand/price model typically models demand within a set of constraints provided by the category manager for a product or group of products and establishes an optimum price for the product or group of products based partially upon the price elasticity of the product or group of products and the objectives of the model analysis.

Notwithstanding the benefits that category managers are afforded by present day demand/price models, their broad application within the art has been constrained to date because of three primary limitations. First, present day demand/price models do not take into account the costs associated with providing a product for sale. That is, the models can only determine prices as a function of demand to maximize sales, or revenue. But one skilled in the art will appreciate that establishing product prices to maximize revenue in an industry that averages less than two percent net profit may indeed result in decreased profits for a retailer because he could potentially sell less high-margin products and more low-margin products according to the newly established product prices. Hence, determining a set of prices based upon demand alone can only maximize volume or revenue, not profit. And profit is what makes or breaks a business. Secondly, present day demand/price models typically estimate price elasticity for a given product or product group without estimating how changes in price for the product or product group will impact demand for other, related products or product groups. For instance, present day demand/price models can estimate price elasticity for, say, bar soap, but they do not estimate the change in demand for, say, liquid soap, as a result of changing the prices of bar soap. Consequently, a soap category manager may actually decrease profits within his/her category by focusing exclusively on the prices of one subcategory of items without considering how prices changes within that one subcategory will affect demand of items within related subcategories. Finally, it is well appreciated within the art that present day statistical techniques do not necessarily yield optimum results in the presence of sparse and/or anomalous data.

Therefore, what is needed is a technique that enables a user to configure and execute optimization scenarios within a model that determines optimized prices for products within a product category, where the model considers the cost of the products as well as the demand for those products and other related products.

In addition, what is needed is a price optimization interface apparatus that allows a user to configure optimization parameters of an apparatus that models the relationship between the prices of products within a given subcategory and the demand for products within related subcategories.

Furthermore, what is needed is a method for viewing results of a system that optimizes the prices of products within a plurality of subcategories, where the system maximizes a particular merchandising figure of merit that is a function of cost as well as demand.

In some of the above noted applications, rules are prescribed by an operator that constrain certain aspects of an optimization to be performed. In certain cases, it may be determined that particular rules conflict with one another so as to render the optimization infeasible. Therefore, it is additionally desirable to provide a method and apparatus that resolve conflicts between two or more conflicting rules, thus allowing an optimization to proceed.

Moreover, what is needed is an apparatus and method that enable users to update cost and/or other information for a subset of products within an defined optimization scenario and to prescribe an upper limit for the number of price tag changes that result from an ensuing re-optimization that is performed on the optimization scenario.

SUMMARY OF THE INVENTION

The present invention provides a superior technique for configuring optimization scenarios, determining a set of optimum prices corresponding to the scenarios, and displaying the set of optimum prices for multiple sets of highly related products within a product category. Contrasted with present day optimization systems that consider only gross figures in their respective optimizations, prices according to the present invention can be optimized to maximize merchandising figures of merit (e.g., net profit) that take into account demand chain costs associated with the products.

In one embodiment, an interface enabling a user to determine optimum prices of products for sale is provided. The interface has a scenario/results processor. The scenario/results processor enables a user to prescribe an optimization scenario, and presents the optimum prices to the user, where the optimum prices are determined by execution of the optimization scenario by optimization engine coupled to said scenario/results processor, and where the optimum prices are determined based upon product demand estimated by said optimization engine and calculated activity based costs. The scenario/results processor has an input/output processor and a scenario controller. The input/output processor acquires data corresponding to the optimization scenario from the user, and distributes optimization results to the user. The input/output processor includes and template controller and a command interpreter. The template controller is configured to provide first price optimization templates and second price optimization templates, where the first price optimization templates are presented to the user to allow for prescription of the optimization scenario, and for distribution of the optimization results. The first price optimization templates include a plurality of new scenario templates, configured to enable the user to prescribe scenario parameters corresponding to the optimization scenario. The plurality of new scenario templates includes an at-large rules template.

The at-large rules template is for specifying rules to govern determination of the optimum prices. The rules include maximum allowable price swing for each of the products for sale and maximum allowable swing for average price of each demand group within the plurality of demand groups. The command interpreter is configured to extract commands from the first price optimization templates executed by the user, and is configured to populate the second price optimization templates according to result data provided for presentation to the user. The scenario controller is coupled to the input/output processor, and controls acquisition of the data and distribution of the optimization results in accordance with a price optimization procedure, where the price optimization procedure relaxes constraints of lower priority conflicting rules to render the optimization scenario feasible.

One aspect of the present invention contemplates a method for providing an interface to an apparatus for optimizing the prices of products for sale. The method includes utilizing a computer-based scenario/results processor within an optimization server to present a sequence of data entry templates to a user, whereby the user specifies an optimization scenario, the optimization server optimizing the prices according to market demand for the products and demand chain costs for the products. The utilizing includes first providing an at-large rules template, for specifying rules to govern determination of the optimum prices, wherein the rules specify maximum allowable price swing for each of the products for sale, and maximum allowable swing for the average price of each demand group within a plurality of demand groups; and second providing a configured rules template, for prioritizing the rules, wherein, if particular rules conflict, the optimization server optimizes the prices by progressively relaxing constraints prescribed by lower-priority rules; and selectively limiting the number of prices that are optimized. The method also includes, within an optimization engine that is coupled to the computer-based scenario/results processor, estimating the market demand and calculating the demand chain costs for the products. The method further includes generating a plurality of optimization results templates and providing these templates to the user, where the optimum prices are presented.

BRIEF DESCRIPTION OF THE DRAWINGS

These and other objects, features, and advantages of the present invention will become better understood with regard to the following description, and accompanying drawings where:

FIG. 6 is a diagram illustrating a currently defined scenarios template according to an exemplary embodiment of the present invention.

FIG. 16 is a diagram showing a currently defined scenarios window according to an exemplary embodiment of the present invention that features defined scenarios in various states of optimization.

FIG. 24 is a diagram depicting an analyze scenario results template that corresponds to display options selected within the drill down configuration template of FIG. 23.

FIG. 29 is a diagram featuring a currently defined scenarios window corresponding to the display properties selected in the personal settings template of FIG. 28.

FIG. 41 is a detailed diagram of a re-optimize a subset template according to the exemplary embodiment.

FIG. 44 is a diagram featuring a feasibility analysis configuration template according to the exemplary embodiment.

DETAILED DESCRIPTION

The following description is presented to enable one of ordinary skill in the art to make and use the invention as provided in the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

In light of the above background on the techniques employed by present day techniques for optimizing the prices for a group of products within a store or group of stores, a detailed description of the present invention will be provided with reference to FIGS. 1 through 44. The present invention overcomes the limitations of present day demand/price models by providing an apparatus and methods that enable category managers to optimize the prices of multiple sets of highly related products within a product group, to re-optimize subsets of those groups when updates occur, and to render optimizations feasible when conflicts arise between prescribe optimization rules. The optimization afforded by the present invention 1) employs product cost figures to determine an optimum set of prices, and 2) takes into consideration the effects in demand that prices changes in one set of highly related products will cause in all other sets of highly related products within the product group.

Figure 1:
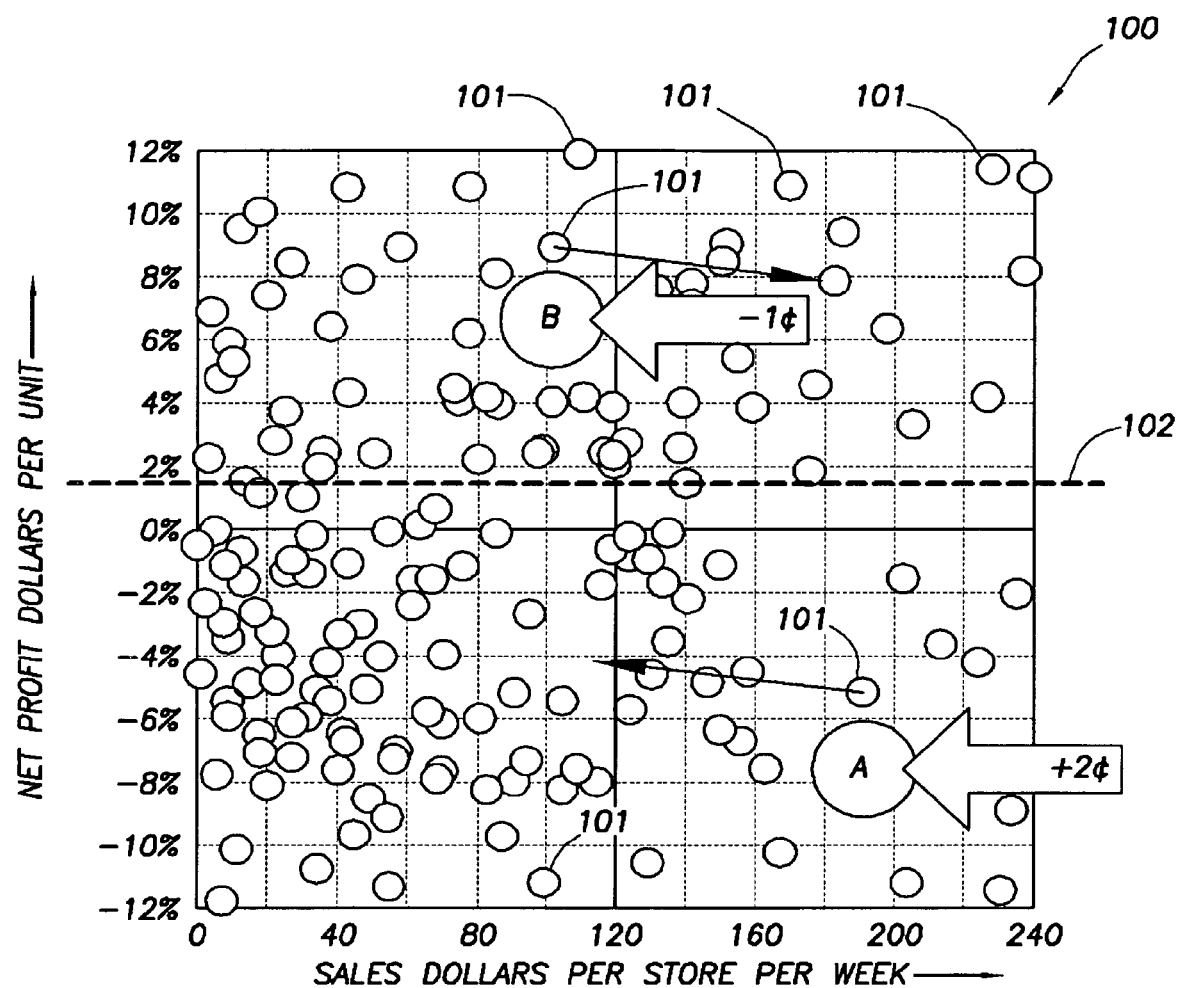
FIG. 1 is a diagram illustrating how small price changes are applied according to the present invention in order to shift consumer demand from a low-margin product to a higher-margin, strong substitute product.

Now referring to FIG. 1, a chart 100 is presented illustrating how small price changes are applied according to the present invention in order to shift consumer demand from a low-margin product to a higher-margin, highly related product. The chart 100 shows a number of product item points 101 having various levels of net profitability per unit (ordinate axis) as a percentage of sales dollars per store per week (abscissa axis). One skilled in the art will appreciate that the chart ranges and the dispersion of product item points 101 over the range of sales and net percentage profits is representative of a typical store or chain of stores in the consumer products merchandising industry. In addition, the chart 100 shows an average profit line 102 that is also representative of profits generated by stores within the consumer products industry. The chart 100 specifically depicts a high-sales, low-margin product A 101 and a low-sales, high-margin product B 101. Products A 101 and B 101 are also highly correlated products 101, that is, they are normally strong substitutes, yet in some cases may be strong complements. Because they are highly correlated, products A 101 and B 101 have very similar attributes from a consumer demand point of view. For example, product A 101 may represent a popular brand of corn flakes, while product B 101 represents a private label brand of corn flakes.

Those skilled in the art will also concur that while the average net profit 102 for a group of products in the consumer products industry is typically less than two percent of sales, there is a wide dispersion of net profits around the average 102, often as much as 10 percent variation from the average 102, by item 101, and by store. Accordingly, the chart 100 of FIG. 1 depicts products 101 within four profitability quadrants. From a profitability perspective, having products within the upper right quadrant of the chart 100 is desirable. The upper right quadrant contains high-volume, high-margin products 101. In other words, if a product 101 is shown in the upper right quadrant of the chart 100, it is a product 101 that has high sales, and its cost of sales is low compared to its price—a very profitable item. In contrast, the lower right quadrant contains products 101 that are unprofitable because products in this quadrant, although they are high-volume, they generate negative profits—their cost per unit is greater than their price per unit. A chain cannot stay in business very long when most its sales come from products in the undesirable, lower right quadrant of the chart 100. Similarly, the upper left quadrant of the chart 100 contains products 101 that generate negative profits, yet which have a low sales volume. And the upper left quadrant contains products 101 that at least are profitable, albeit they do not sell very well.

At a very basic level, the present invention operates to shift consumer demand from products 101 in undesirable quadrants of the chart 100 to highly correlated, or strong substitute, products 101 in more desirable quadrants of the chart 100. Using the example of strong substitute products A 101 and B 101, the apparatus and method according to the present invention engineers this shift in demand by adjusting the prices of A 101 and B 101 to send demand from A 101 to B 101. The chart 100 depicts a 2-cent increase in the price for product A 101 and a 1-cent decrease in price for product B 101, thus resulting in a demand shift from A to B.

The optimization techniques according to the present invention employ both cost data and price/sales relationships for all products within a product category to affect demand shifts, not just for selected products 101 within a product category, but for all products 101, if chosen, within the product category. By engineering a clockwise shift in demand for related products 101 within a product category, the model according to the present invention provides both apparatus and methods for increasing the average net profit 102 for a store or chain of stores.

Figure 2:
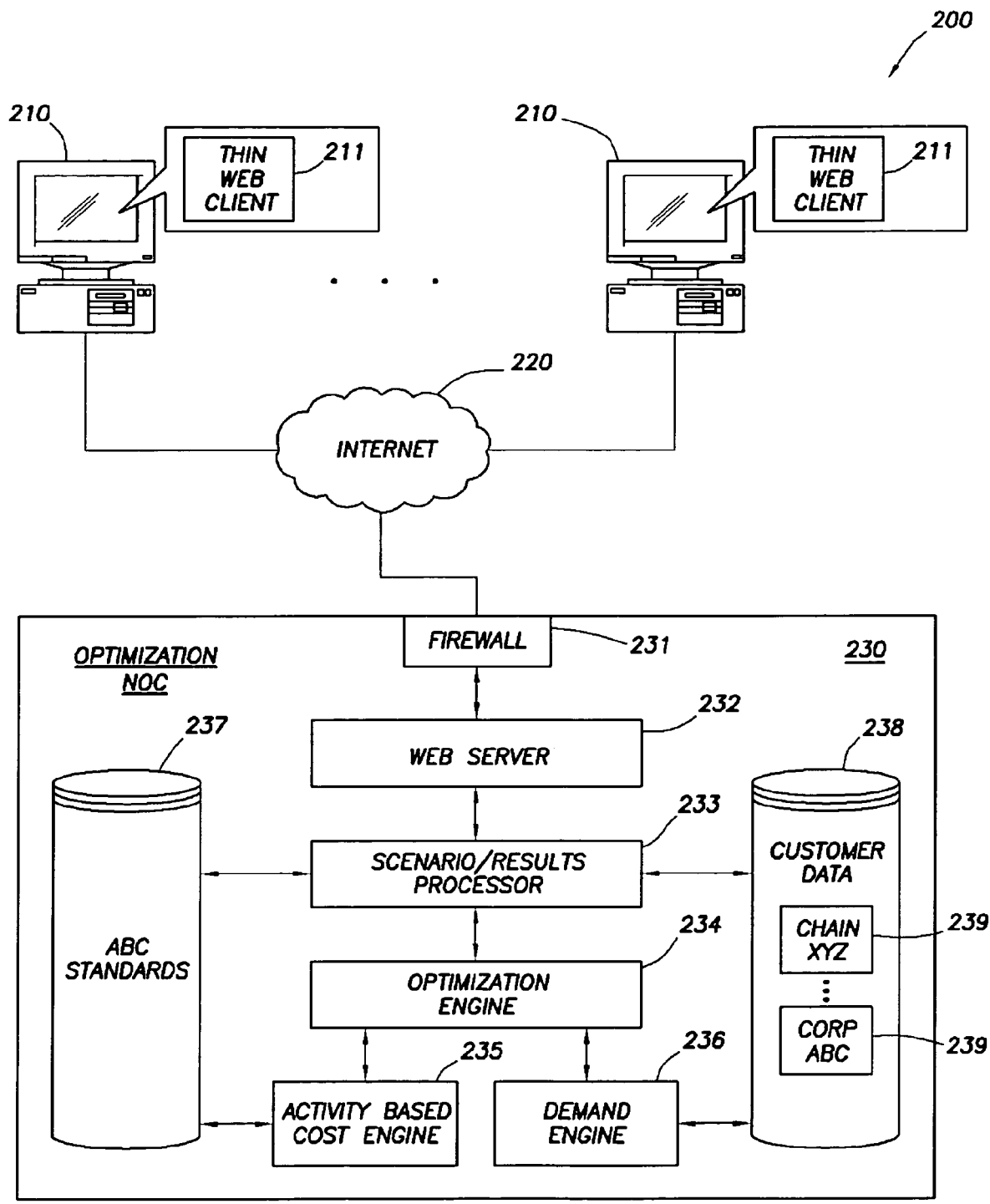
FIG. 2 is a block diagram illustrating an apparatus for merchandise price optimization according to the present invention.

Now referring to FIG. 2, a block diagram 200 is presented illustrating an apparatus for merchandise price optimization according to the present invention. The block diagram 200 shows an optimization network operations center (NOC) 230 that is accessed over a data network 220 by a plurality of off-site computers 210 belonging to a plurality of customers. In one embodiment, the data network 220 is the Internet 220 and the off-site computers 210 are executing a Transport Control Protocol (TCP)/Internet Protocol (IP)-based thin web client application 211 such as Microsoft® Internet Explorer® or Netscape® Navigator®. In an alternative embodiment, the computers 210 execute an additional client application for executing distributed applications such as Citrix® ICA® Client 211. The optimization NOC 230 has a firewall 231 through which data network packets enter/exit the NOC 230. The firewall 231 is coupled to a web server 232. The web server 232 provides front-end services for a scenario/results processor 233. The scenario/results processor 233 is coupled to an optimization engine 234, an activity based cost (ABC) standards data base 237, and a customer data base 238. The customer data base 238 provides storage for data sets 239 corresponding to a plurality of customers. The optimization engine 234 interconnects to an activity based cost engine 235 and a demand engine 236. The activity based cost engine 235 is coupled to the ABC standards data base 237 and the demand engine 236 is coupled to the customer data base 238

In operation, each of the customers maintains a protected data set 239 within the customer data base 238. Point of sale data is uploaded over the data network 220 from files on the customer computers 210 into corresponding data sets 239 within the data base. The scenario/results processor 233 controls the timing and sequence of customer activities for uploading data, configuring optimization scenarios, setting rules and constraints, and downloading optimization results for display on the client computers 210. In one embodiment, the scenario/results processor 233 builds Hypertext Markup Language (HTML) web pages for transmittal over the data network 220 to the clients 210. In an alternative embodiment, the scenario/results processor 233 builds Extensible Markup Language (XML) pages for distribution to the clients 210. In a Java®-based embodiment, the scenario/results processor 233 builds, processes, and distributes Java applets to the clients 210.

The web server 232 receives and issues data network transactions over the data network 220 to affect the distribution of web pages, or templates, and to receive commands and data from the client machines 210.

Configured optimization scenarios are executed by the optimization engine 234. Using scenario configuration parameters provided by users through the browser 211 on a client machine 210, the optimization engine 234 directs the demand engine 236 to extract data from the customer data set 239 that applies to the optimization scenario that is being executed. The demand engine 236 predicts sales and market share of products as a function of price according to rules and constraints of the optimization scenario and the activity based cost engine 235 calculates variable and fixed costs for products at specific store locations according to parameters of the optimization scenario.

The demand engine 236 relies on a mixed-model framework, simultaneously utilizing information in the client data set 239 across all stores and products within a product category, where a product category is defined as a collection of substitutable or complementary products. Furthermore, a demand group is defined to be a set of highly substitutable or complementary products. By way of example, a product category may comprise personal soap products. Demand groups within the personal soap category could consist of bar soaps and liquid soaps. The mixed model methodology is also referred to as "Bayesian Shrinkage" Modeling, because by combining data from various stores and/or products, one skilled can "shrink" individual parameter estimates towards the average estimate, dampening the extreme values that would result if traditional statistical techniques were used.

The demand engine 236 uses the data from the client data set 239 to estimate coefficients that may be used in an equation to predict consumer demand. In a preferred embodiment of the invention, sales for a demand group (S) is calculated, and a market share (F) for a particular product is calculated, so that demand (D) for a particular product is estimated by $D=S \cdot F$.

The activity based cost engine 235 employs data from the client data set 239 (supplied through the optimization engine 234), industry standard average data for calculating activity based costs from the ABC standards data base 237, and may also receive imputed variables (such as baseline sales and baseline prices) and data from the demand engine 236 (via the optimization engine 234) to calculate fixed and variable costs for the sale of each product. Examples of the types of activity based costs for products that are calculated by the activity based cost engine 235 include bag costs, checkout labor costs, distribution center inventory costs, invoicing costs, transportation costs, and receiving and stocking costs.

The optimization engine 234 executes the optimization scenario that clients configure using the scenario/results processor 233. Using estimated sales and market share data provided by the demand engine 236, along with fixed and variable activity based costs calculated by the activity based cost engine 235, in a price optimization embodiment, the optimization engine 234 determines optimum prices for selected products within one or more demand groups across a product category as constrained by rules and constraints provided by clients. Some of the rules/constraints set by the client include constraints to the overall weighted price advance or decline of products, branding price rules, size pricing rules, unit pricing rules, line pricing rules, and cluster (i.e., groups of stores) pricing rules. In addition, the client provides overall constraints for optimization scenarios that include specification of figures of merit that optimum prices are determined to maximize. Example options for figure of merit selection in a price optimization embodiment include net profit, volume, and revenue.

The results of an executed optimization scenario are provided to the client, or user, via the scenario/results processor 233 through a sequence of result templates. The result data may also be downloaded over the data network 220 to a designated file on the client machine 210.

Figure 3:
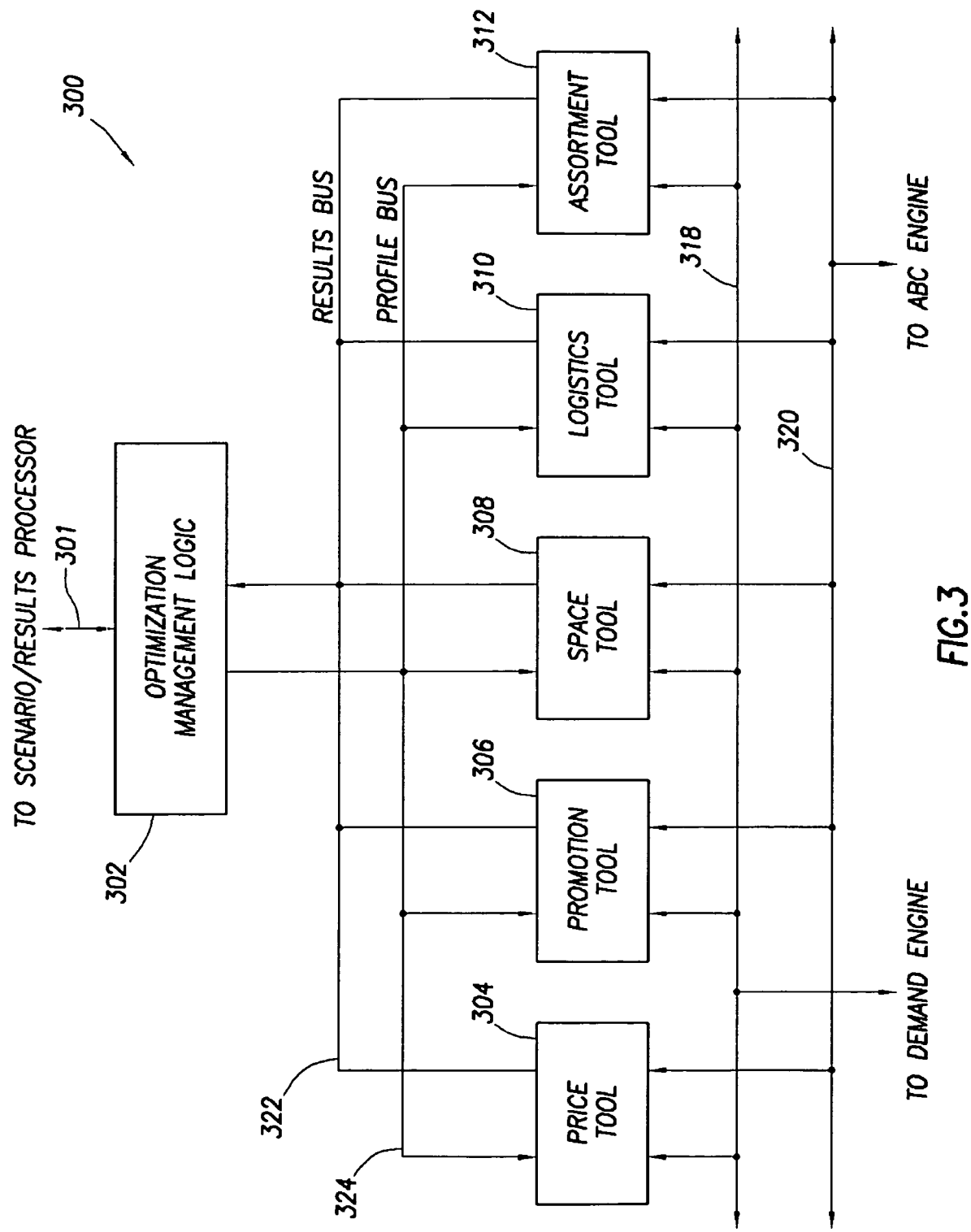
FIG. 3 is a block diagram depicting details of an optimization engine according to the present invention.

Now referring to FIG. 3, a block diagram is presented depicting details of an optimization engine 300 according to the present invention. The optimization engine 300 includes optimization management logic 302 that is coupled to a scenario/results processor (not shown) according to the present invention via bus 301. The optimization engine 300 also includes a price optimization tool 304, a promotion optimization tool 306, a space optimization tool 308, a logistics optimization tool 310, and an assortment optimization tool 312. Profile bus 324 provides optimization profile configuration parameters from the optimization management logic 302 to one or more of the optimization tools 304, 306, 308, 310, 312. The optimization tools 304, 306, 308, 310, 312 communicate result data from executed optimization scenarios to the optimization management logic 302 via result bus 322. Each of the optimization tools 304, 306, 308, 310, 312 are coupled to a demand engine (not shown) via bus 318 and to an ABC engine via bus 320.

In operation, the optimization management logic 302 interprets an optimization scenario configured by a user to direct the retrieval and/or upload of data from the client computer, and the receipt of customer data from the demand engine and ABC standards data from the ABC engine in accordance with the type of optimization that is being performed. The price optimization tool 304 is employed to determine a set of optimum prices for products of a product category comprising a plurality of demand groups. The promotion optimization tool 306 is employed to determine an optimum promotion strategy for products of a product category comprising a plurality of demand groups. The space tool 308 is employed to determine an optimum placement strategy within stores for products of a product category comprising a plurality of demand groups. The logistics tool 310 is employed to determine an optimum inventory strategy within stores for products of a product category comprising a plurality of demand groups. And the assortment tool 312 is employed to determine an optimum mix of products of a product category comprising a plurality of demand groups. Each of the tools 304, 306, 308, 310, 312 include provisions for determining optimum lever parameters for the maximization of cost-based merchandising figures of merit such as net profit. In one embodiment, the optimization engine 300 comprises computer program modules coded for execution by an optimization analysis program such as GAMS®. The results of an optimization are exported from the application program as tables into a data base server application such as Microsoft® SQL Server.

Figure 4:
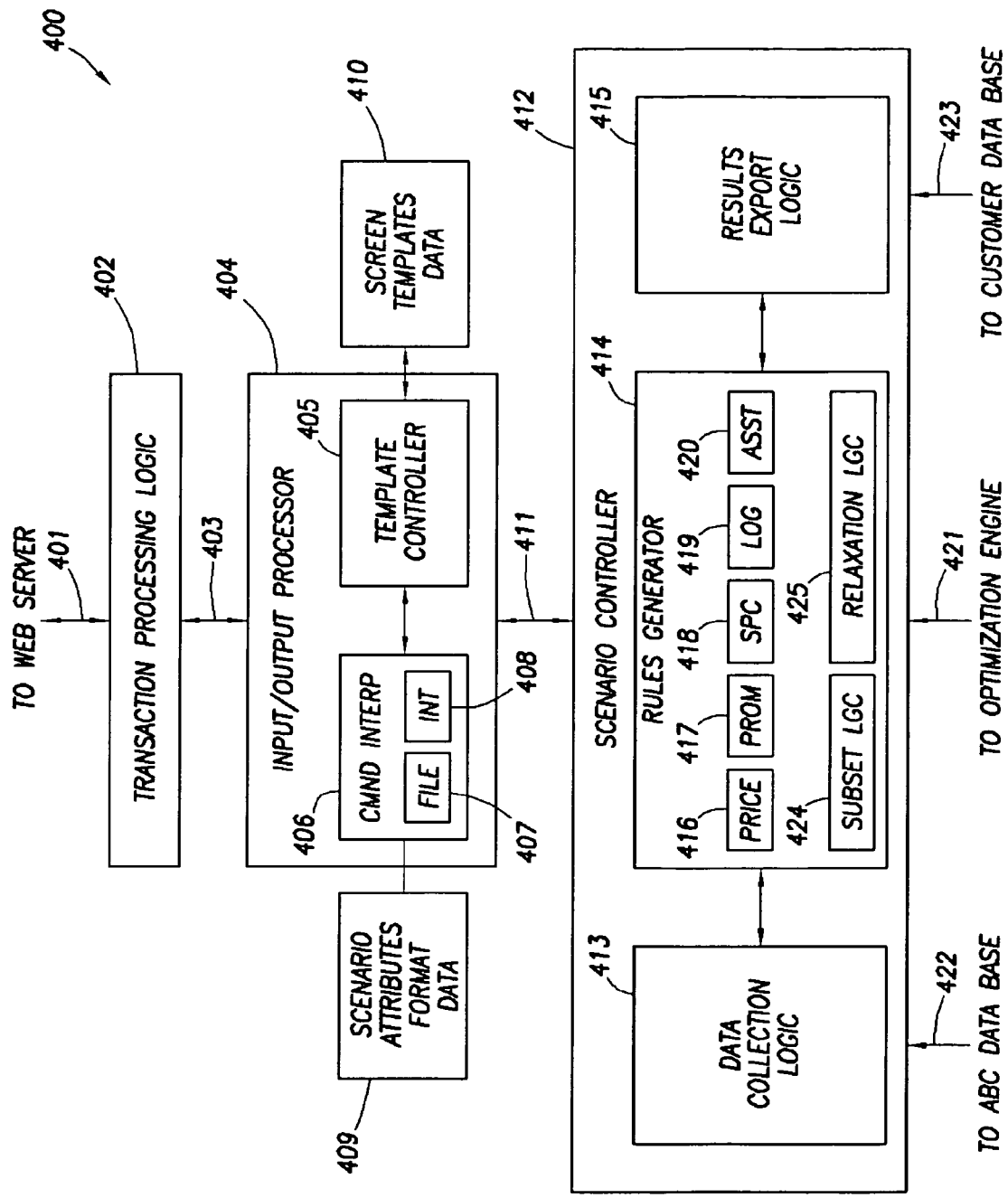
FIG. 4 is a block diagram showing scenario/results processor details according to the present invention featuring logic for resolving rule conflict and for performing re-optimization on a product subset.

Now referring to FIG. 4, a block diagram is presented showing details of a scenario/results processor 400 according to the present invention. The scenario/results processor includes transaction processing logic 402 that communicates with a web server (not shown) according to the present invention via bus 401. Bus 403 couples the transaction processing logic 402 to an input/output processor 404. The input/output processor 404 includes a template controller 405 and command interpretation logic 406. The input/output processor 404 is connected to a scenario attributes format data set 409 and a screen templates data set 410. In one embodiment, the data sets 409, 410 are stored within an ABC standards data base (not shown) according to the present invention. The input/output processor 404 communicates with a scenario controller 412 via bus 411. The scenario controller 412 has data collection logic 413, a rules generator 414, and results export logic 415. The scenario controller 412 is coupled to an optimization engine (not shown) according to the present invention via bus 421, an ABC data base (not shown) via bus 422, and a customer data base (not shown) via bus 423.

Operationally, the transaction logic 402 provides application level message services for the scenario/results processor 402 to receive/transmit messages from/to clients via the web server. In one embodiment, sessions are established via conventional socket calls according to Microsoft® Windows NT® operating system. The input/output processor 404 directs the acquisition of client data to define parameters of an optimization scenario and directs the distribution of scenario results to the clients. The command interpretation logic 406 utilizes a series of scenario configuration templates, or new scenario templates, provided by the template controller 405 to enable a user to configure parameters of a optimization scenarios for execution. The new scenario templates, or windows, are stored in the screen templates data set 410, and are populated with appropriate configuration option data by the command interpretation logic 406. The input/output processor 404 routes these templates to the transaction logic 402, whereby the templates are routed to the user client machines over the data network. The command interpretation logic 406 includes interactive data acquisition logic 408 and file acquisition logic 407. The interactive data acquisition logic 408 is employed to populate selected scenario configuration templates with fields/parameters whereby a user interactively provides data required to configure a scenario or to display the results of an executed scenario. The file acquisition logic 407 is employed to control the reception of electronic files from a client machine required to configure a scenario and to control the transmission of files to export results of an executed scenario to a client machine. The scenario attributes format data set 409 describes the format requirements for product attribute data so that data received by the command interpretation logic 406 can be manipulated into formats that comport with each of the optimization tools 304, 306, 308, 310, 312 described with reference to FIG. 3.

The scenario controller 412 directs the configuration and execution of an optimization scenario, and presentation of the results of an optimization scenario. The scenario controller 412 has data collection logic 413, a rules generator 414, and results export logic 415. The rules generator 414 comprises a plurality of rules logic elements to include a price optimization rules element 416, a promotion optimization rules element 417, a space optimization rules element 418, a logistics optimization rules element 419, and an assortment optimization rules element 420. The rules generator 414 also has subset re-optimization logic 424 and rule relaxation logic 425.

Operationally, through a subset of the new scenario templates, a user on a client machine selects to perform one of a plurality of available optimizations. The selected optimization is provided to the scenario controller 412 via bus 411. The data collection logic 413 prescribes client data that is required to execute the selected optimization. The rules generator 414 selects a rules logic element 416-420 that comports with the selected optimization and the rule relaxation logic 425 is selected to allow the user to prioritize generated rules according to the selected rules logic element 416-420. The results export logic 415 identifies results templates and/or file designations that are required to present results of the selected optimization. Template designations for additional data that is required from the user are provided to the input/output processor 404 and the selected rules logic element 416-420 provides rules configuration parameters for the optimization scenario to the optimization engine via bus 421.

The template controller 405 and command interpretation logic 406 together configure the designated new scenario templates for presentation to the user, whereby configuration data and additional data (if any) for the optimization scenario are retrieved. In an embodiment where subset re-optimization is contemplated, the additional data is provided for a subset of the products within a previously defined optimization scenario and templates are presented to the user to allow for the prescription of a maximum number of changes. In a price subset re-optimization embodiment, the changes comprise price changes. In a promotion subset re-optimization embodiment, the changes comprise promotion changes. In a space subset re-optimization embodiment, the changes comprise product movements. In a logistics subset re-optimization embodiment, the changes comprise inventory changes. In an assortment subset re-optimization embodiment, the changes comprise changes in product assortment. Once the configuration/additional data are in place within the data base (not shown), the scenario controller 412 directs the optimization engine to execute the configured optimization scenario. When an optimization is complete, the results export logic 415 retrieves scenario results from the optimization engine and formats the results for export to the user via either result templates or file transfer.

Figure 5:
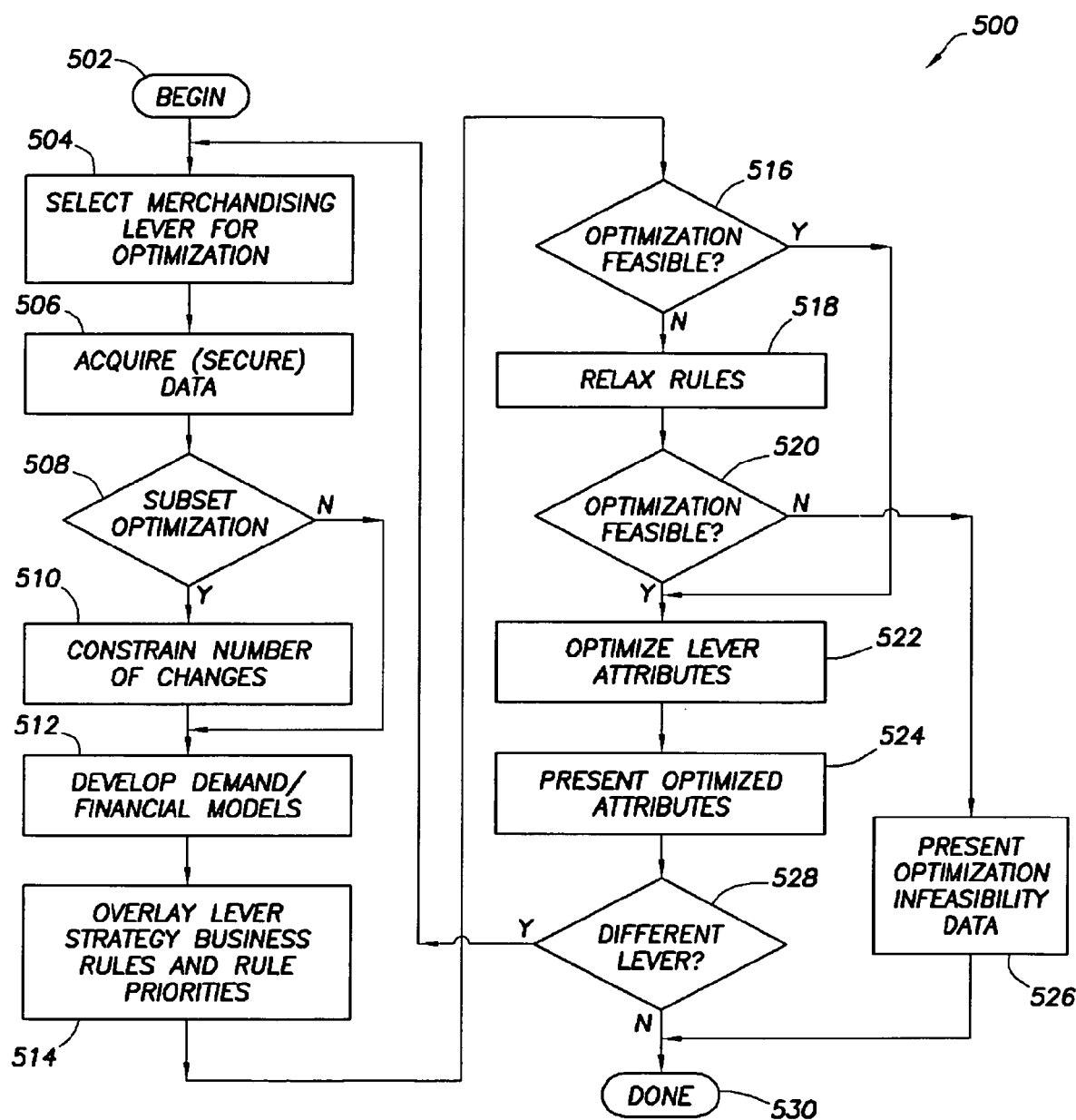
FIG. 5 is a flow chart featuring a method according to the present invention for optimizing selected product merchandising levers featuring flows for resolving rule conflict and for performing re-optimization on a product subset.

Now referring to FIG. 5, a flow chart 500 is presented featuring a method according to the present invention for optimizing selected product merchandising levers. The method is provided to illustrate program flow for determining a set of optimum prices for one or more merchandising levers in an optimization system that employs both a demand model and an activity based cost model for optimization. By utilizing cost data as well as demand, optimization scenarios can be executed that maximize meaningful merchandising figures of merit such as net profit.

Flow begins as block 502, where a user selects to perform an optimization according to the present invention. Flow then proceeds to block 504.

At block 504, the user is prompted to select one of a plurality of merchandising levers for which to perform an optimization. In one embodiment, the merchandising levers include sales price, promotion strategy, space strategy, logistics strategy, and product mix. Alternative embodiments provide subsets of the aforementioned levers for optimization. Flow then proceeds to block 506.

At block 506, the system acquires data that is required to perform an optimization according to the selection provided in block 504. In one embodiment, primary point of sale data is uploaded into a client data base according to the present invention and any additional data required for the optimization is provided interactively by the user. The additional data includes rules and constraints that the user specifies concerning product categories and demand groups for optimization, selection of stores for optimization, grouping of stores for imputation of data where insufficient sales history exists, swing constraints (i.e., maximum and/or minimum change limits for parameters such as volume, price change, etc.), front end parameters for an activity based cost engine (e.g., labor rates, cost of capitol, etc.), merchandising figure of merit to maximize, and user preference for presentation of results (i.e., list, graph, downloadable file, etc.). In an alternative embodiment, the additional data is stored within a file on a client machine and is uploaded to the data base over a data network. In an embodiment comprising a plurality of clients, access to client data within the data base and control of optimizations is protected by secure measures such as passwords, user privilege restrictions, digital authentication, and encrypted communications. Flow then proceeds to decision block 508.

At decision block 508, an evaluation is made to determine if the optimization to be performed applies to a set of products or to a subset of products within a previously defined optimization. If a subset re-optimization is prescribed, then flow proceeds to block 510. If a new optimization on a set of products is prescribed, then flow proceeds to block 512.

At block 510, the number of allowable changes resulting from a subset re-optimization is specified by the user. Flow then proceeds to block 512

At block 512, demand and ABC (i.e. financial) models are developed according to user-supplied scenario data by modeling applications according to the present invention. Flow then proceeds to block 514.

At block 514, rules and constraints provided by the user for the optimization scenario are applied to bound (i.e., constrain) the optimization that is to be performed. In addition to the prescription of rules, the user must also prioritize the rules so that, in the case that certain rules conflict, subsequent steps can render the optimization feasible. Flow then proceeds to decision block 516.

At decision block 516, an evaluation is made to determine if the prescribed optimization is feasible, i.e., if an optimum solution can be found that satisfies the developed models and the user-provided rules/constraints. If it is determined that the prescribed optimization is feasible, then flow proceeds to block 522. If it is determined that the prescribed optimization is not feasible, then flow proceeds to block 518.

At block 518, the lower priority rules that contribute to a conflict are progressively relaxed up to a limit in order to render an optimization as feasible. For example, say that one conflicting rule in a price optimization embodiment specifies that the price change for individual products should not be less than −20 percent and not more than +20 percent and that a lower priority rule specifies that individual product prices should not be less than −10 percent and not more than +10 percent of a competitive price. In such a case where competitive price changes would otherwise render the optimization infeasible, the boundaries of the lower priority competitive price rule are progressively relaxed until the optimization is either rendered feasible or until a prescribed boundary limit is reached. In one embodiment, the increment for progressive relaxation of percentage bounds is one-half of a percent and each boundary limit is ten percent of the original boundary. Under such an embodiment, the upper and lower boundaries of the competitive price ruled would be relaxed by one-half of a percent up to a point where the boundaries are −11 percent and +11 percent. Flow then proceeds to decision block 520.

At decision block 520, an evaluation is made to determine if, following rule relaxation, the optimization has been rendered feasible. If so, then flow proceeds to block 522. If not, then flow proceeds to block 526.

At block 526, data describing infeasible constraints is provided to the user. Flow then proceeds to block 530.

At block 522, an optimization is performed by the system according to the present invention that utilizes both the demand model data and the financial model data to determine a set of optimum lever attributes for specified products that maximize the specified merchandising figure of merit within the rules and constraints provided by the user. If a subset re-optimization has been prescribed, then attributes are allowed to change for those products whose input data has changed. If the maximum number of changes prescribed in block 510 is greater than the number of those products whose input data has changed, then the re-optimization allows attributes to change for a number of other products, up to the maximum number that was specified. Flow then proceeds to block 524.

At block 524, results of the optimization are provided to the user in the form previously specified within block 506. Flow then proceeds to decision block 528.

At decision block 516, the user is provided with an opportunity to select another one of the plurality of merchandising levers for which to perform a new optimization. If the user selects to configure and execute another optimization, then flow is directed to block 504. If the user elects to exit, then flow proceeds to block 518.

At block 518, the method completes.

Having now described the architecture and detailed design of the present invention to support optimization systems having a plurality of merchandising levers available for manipulation, attention is now directed to FIGS. 6-44, where an exemplary embodiment of a thin client-based price optimization apparatus will now be discussed. The thin client-based price optimization apparatus is presented in terms of a sequence of web templates (i.e., HTML and/or XML generated content displayed within a user's thin web client program) provided to users for the purpose of optimizing prices within specified product categories to maximize specified merchandising figures of merit in accordance with user-supplied rules/constraints.

Now referring to FIG. 6, a diagram is presented illustrating a currently defined scenarios template 600 according to the exemplary embodiment of the present invention. The currently defined scenarios template 600 is generated within a scenario/results processor using data pertaining to a particular client that is stored within an area of a data base that corresponds to the particular client. When the client logs in to an optimization NOC according to the present invention, like the NOC 230 shown in FIG. 2, the currently defined optimization scenarios corresponding to the particular client are provided by a web server over a data network to a client machine in the form of the currently defined scenarios template 600. The template shows a plurality of currently defined scenarios 601-604 corresponding to the particular client. A plurality of scenario identifiers 605 are employed to identify each of the currently defined scenarios 601-604. The plurality of scenario identifiers 605 includes identifying features such as scenario name, scenario originator, scenario type, start date for optimization, end date for optimization, scenario description, net profit resulting from optimization, and optimization status (i.e., new, optimization pending, optimized, etc.).

In the exemplary embodiment, shading and/or color features are employed within the currently defined scenarios window 600 so that a user can easily distinguish the status of the plurality of optimization scenarios 601-604. In the exemplary embodiment shown in FIG. 6, a scenario without shading 603 distinguishes a newly configured scenario. A lightly shaded scenario 601 indicates that a corresponding optimization has been completed. A darkly shaded scenario 602 is one that is pending an optimization. Highlighting is employed by the exemplary embodiment to indicate a scenario 604 that is selected by the user.

Figure 7:
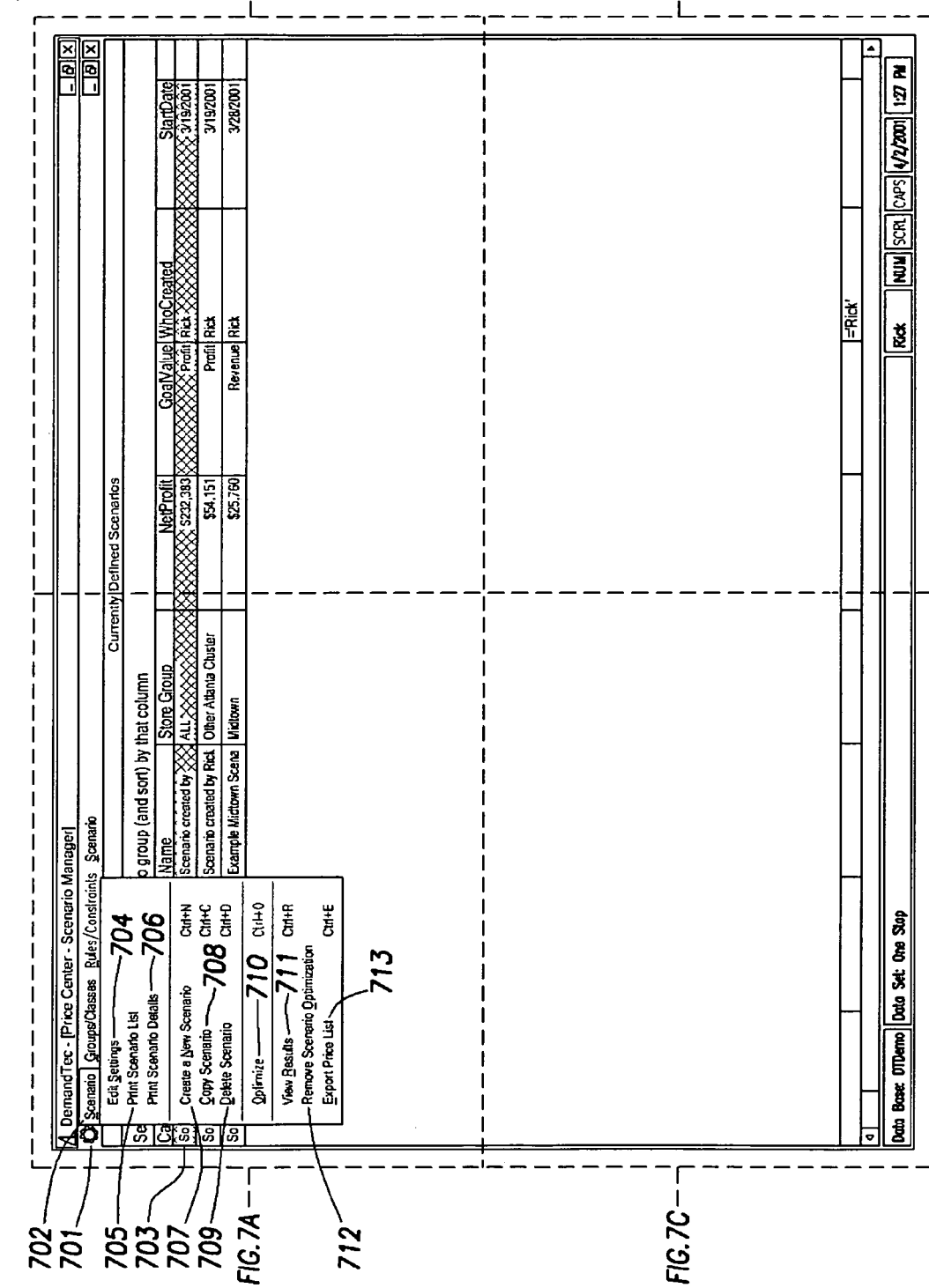
FIG. 7 is a diagram featuring a scenario menu within the currently defined scenarios template of FIG. 6.
Figure 7A:
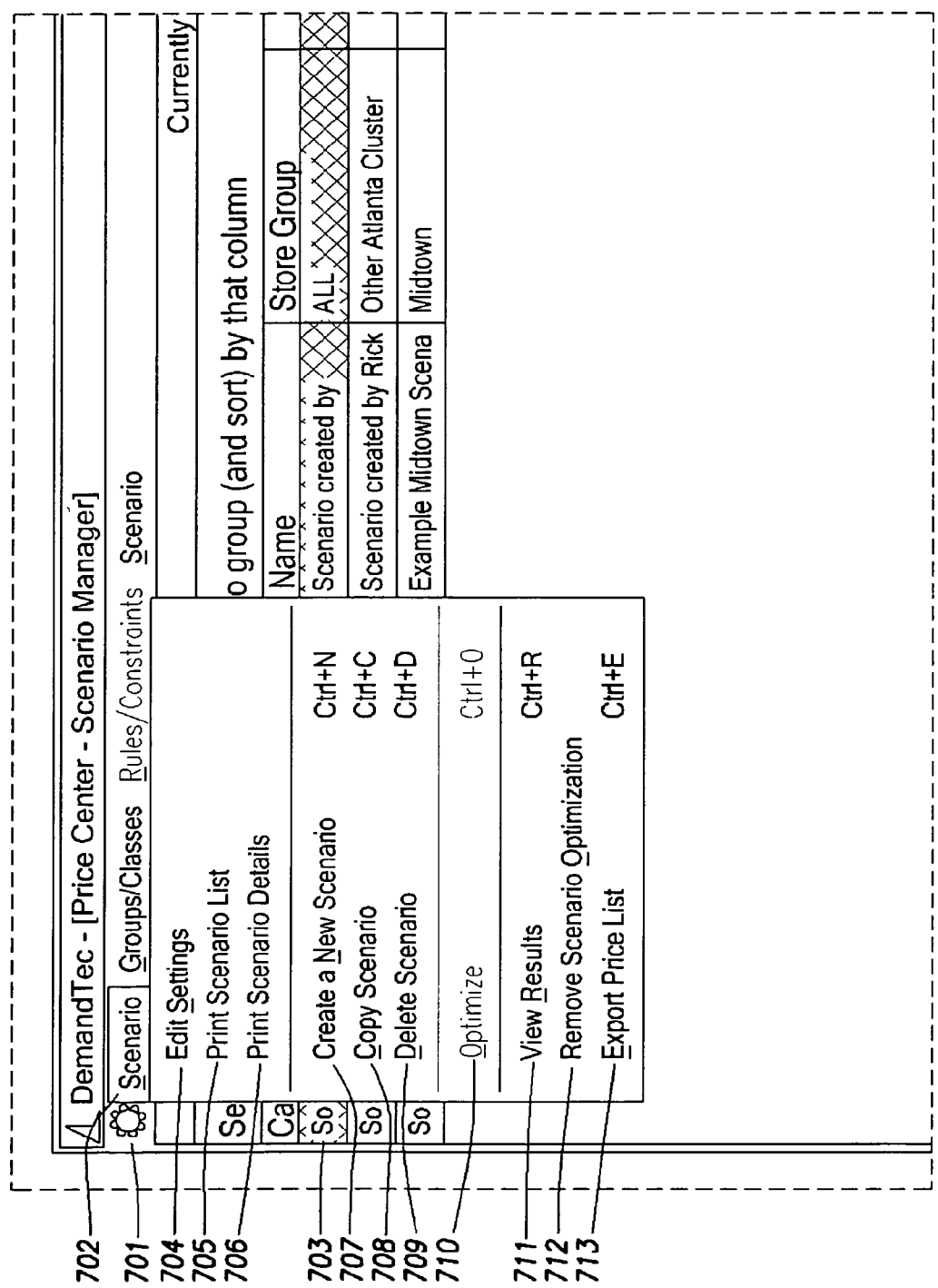
Figure 7B:
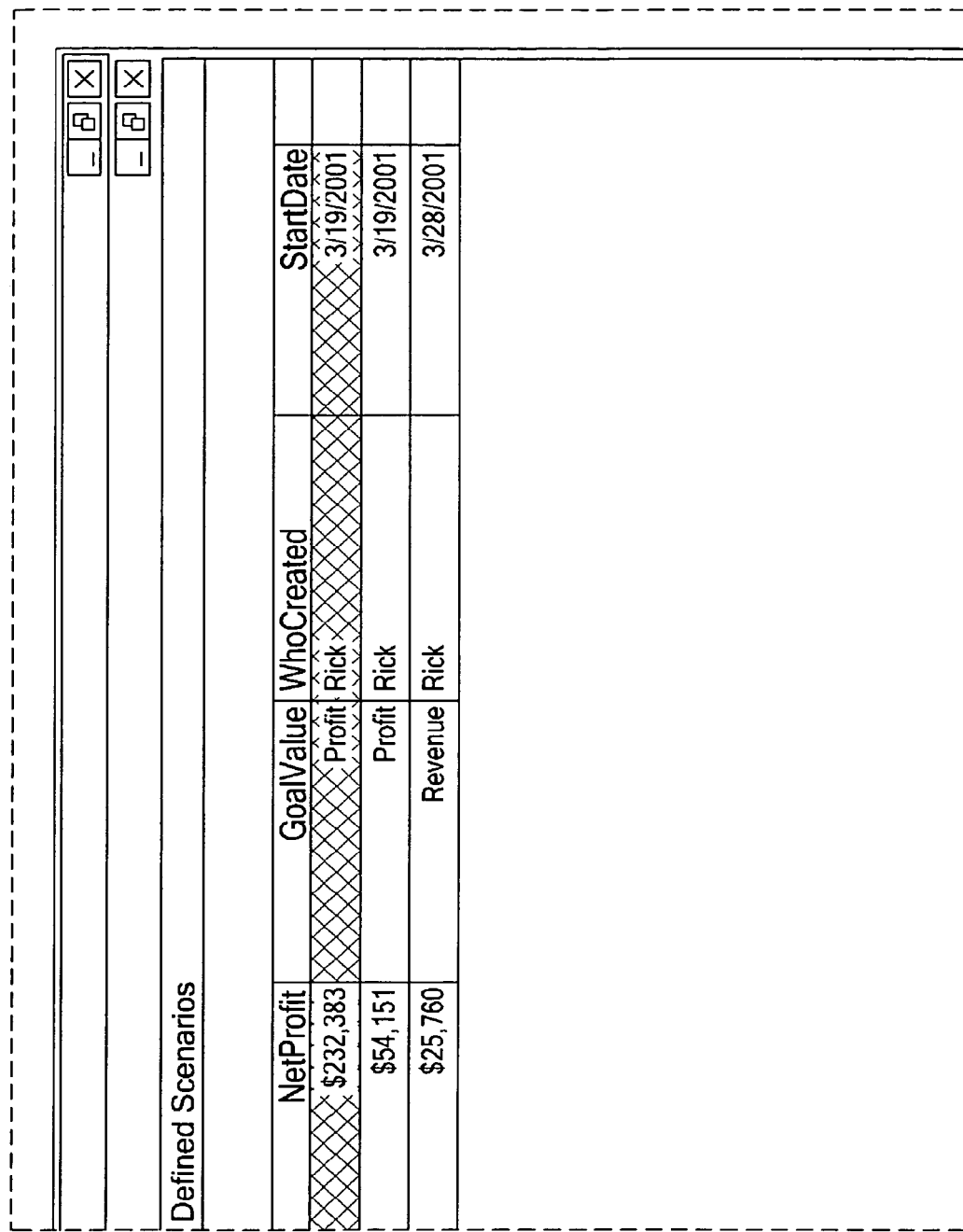
Figure 7C:
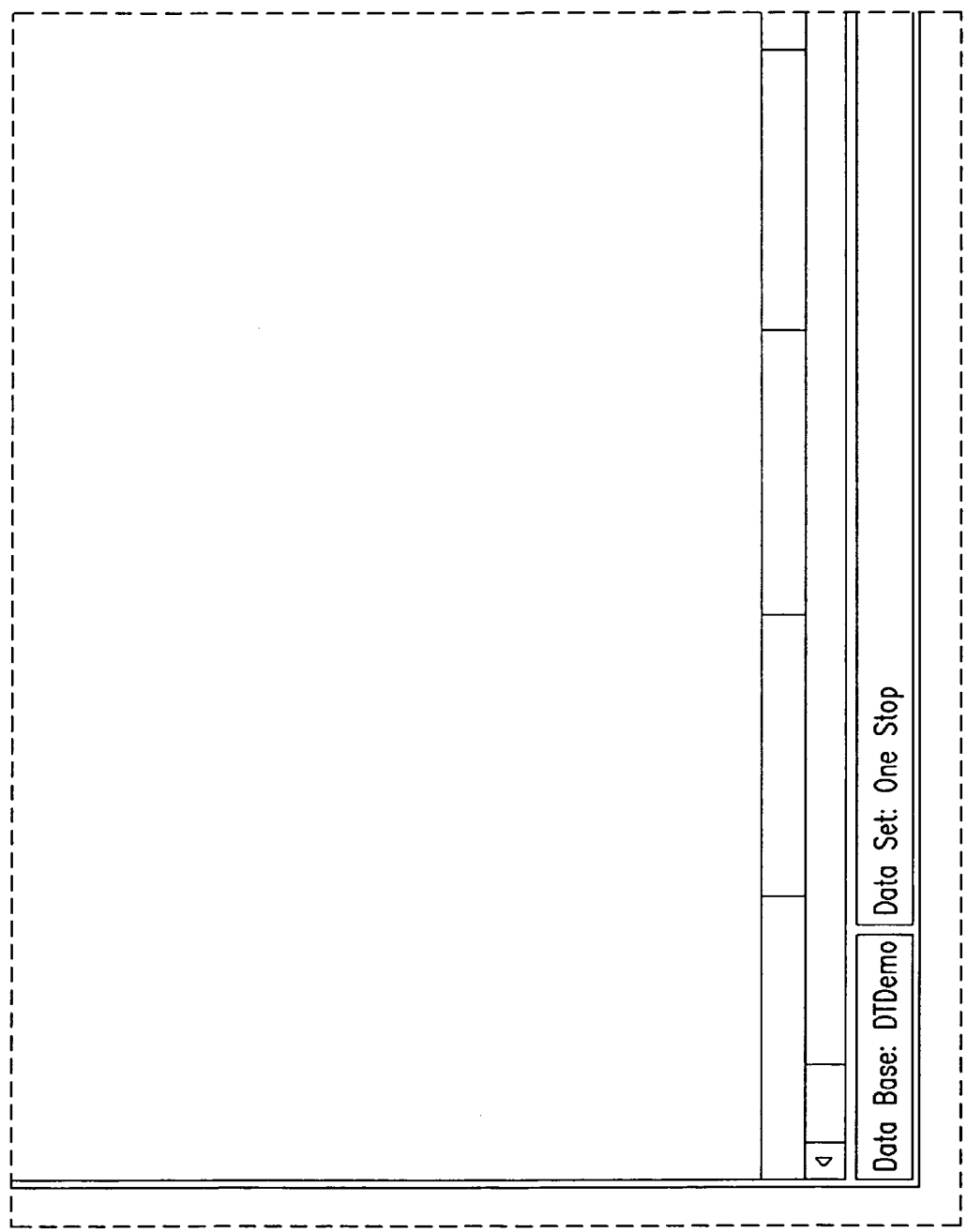
Figure 7D:
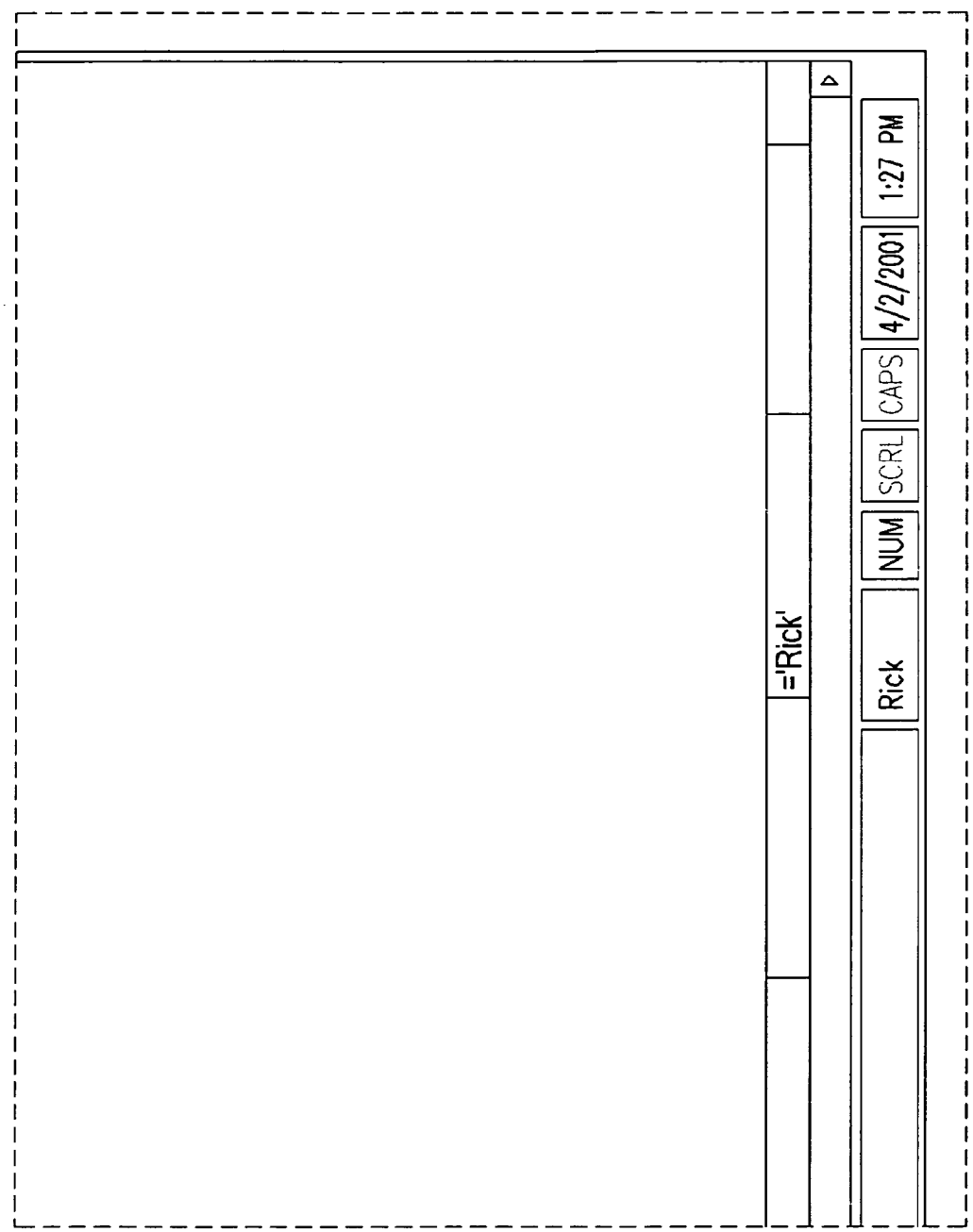

Referring to FIG. 7, a diagram 700 is presented featuring a scenario menu within the currently defined scenarios template of FIG. 6. The scenario menu provides a user with the ability to create, modify, and delete optimization scenarios according to the exemplary embodiment. The scenario menu is selected by activating a scenario menu header 702 on a menu bar 701 offered to the user by the exemplary embodiment. Selection of the scenario menu header 702, as with all other selectable items according to the exemplary embodiment, is accomplished via a pointing device or keystroke combination that are enabled by the user's thin web client and which are available for implementation by the exemplary embodiment.

The scenario menu provides scenario configuration options 704, 706, 707, 709, 711-713 that are available for a user-selected scenario 703 within the currently defined scenarios template. Options 710 that are not available for the highlight scenario 703 are indicated by dimming or an otherwise distinguishable feature. In addition to providing options for the highlighted scenario 703, the scenario menu provides an option 707 to create a new scenario and an option 705 to print a listing of currently defined scenarios. Exemplary options for the highlighted scenario 703 include an edit settings option 704, a print scenario details option 706, a copy scenario option 708, a delete scenario option 709, a view results option 711, a remove scenario optimization option 712, and an export price list option 713. If the highlighted scenario 703 has not been previously optimized, the an optimize option 710 is provided by the scenario menu.

Figure 8A:
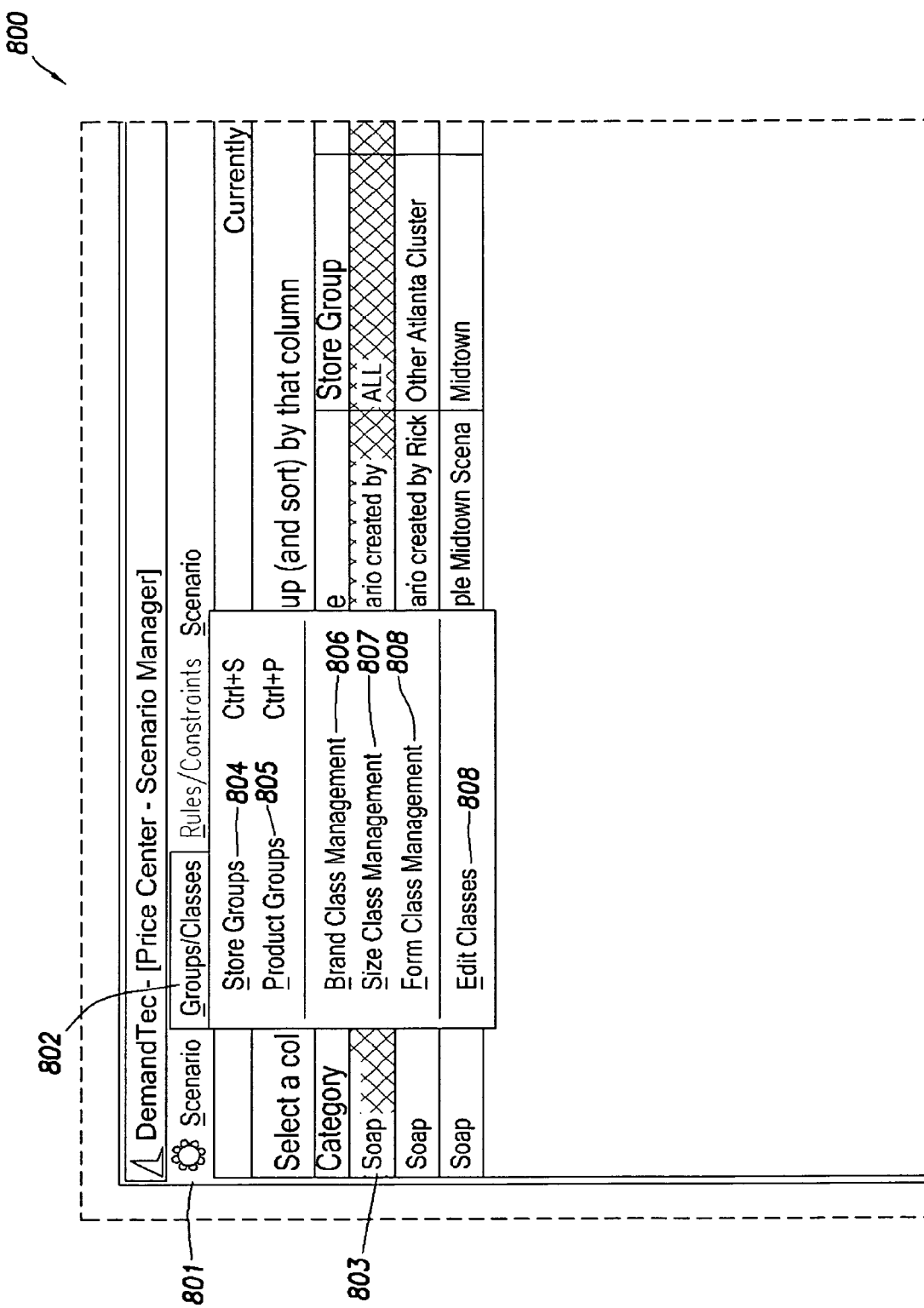
FIG. 8 is a diagram depicting a groups/classes menu within the currently defined scenarios template of FIG. 6.
Figure 8B:
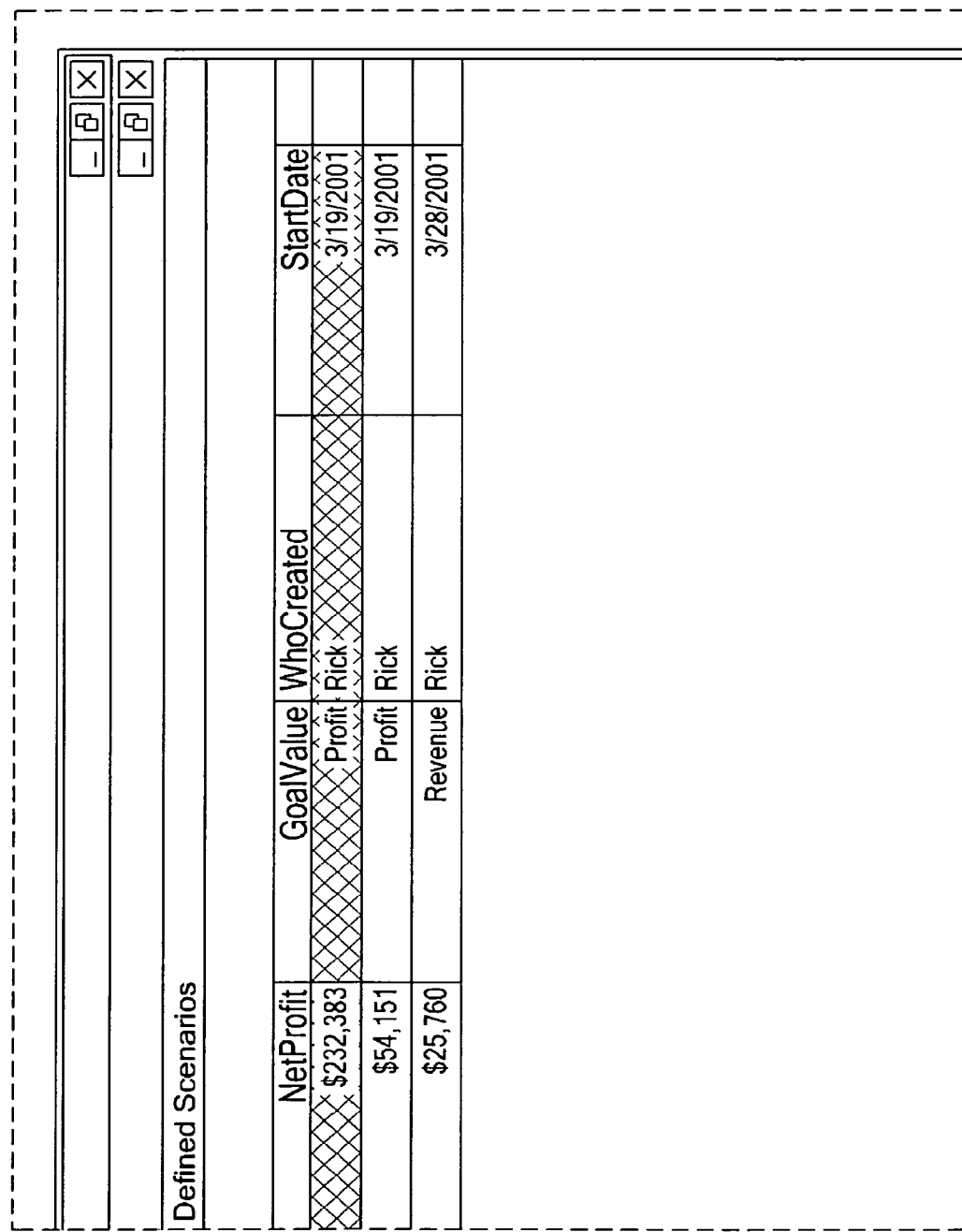
Figure 8C:
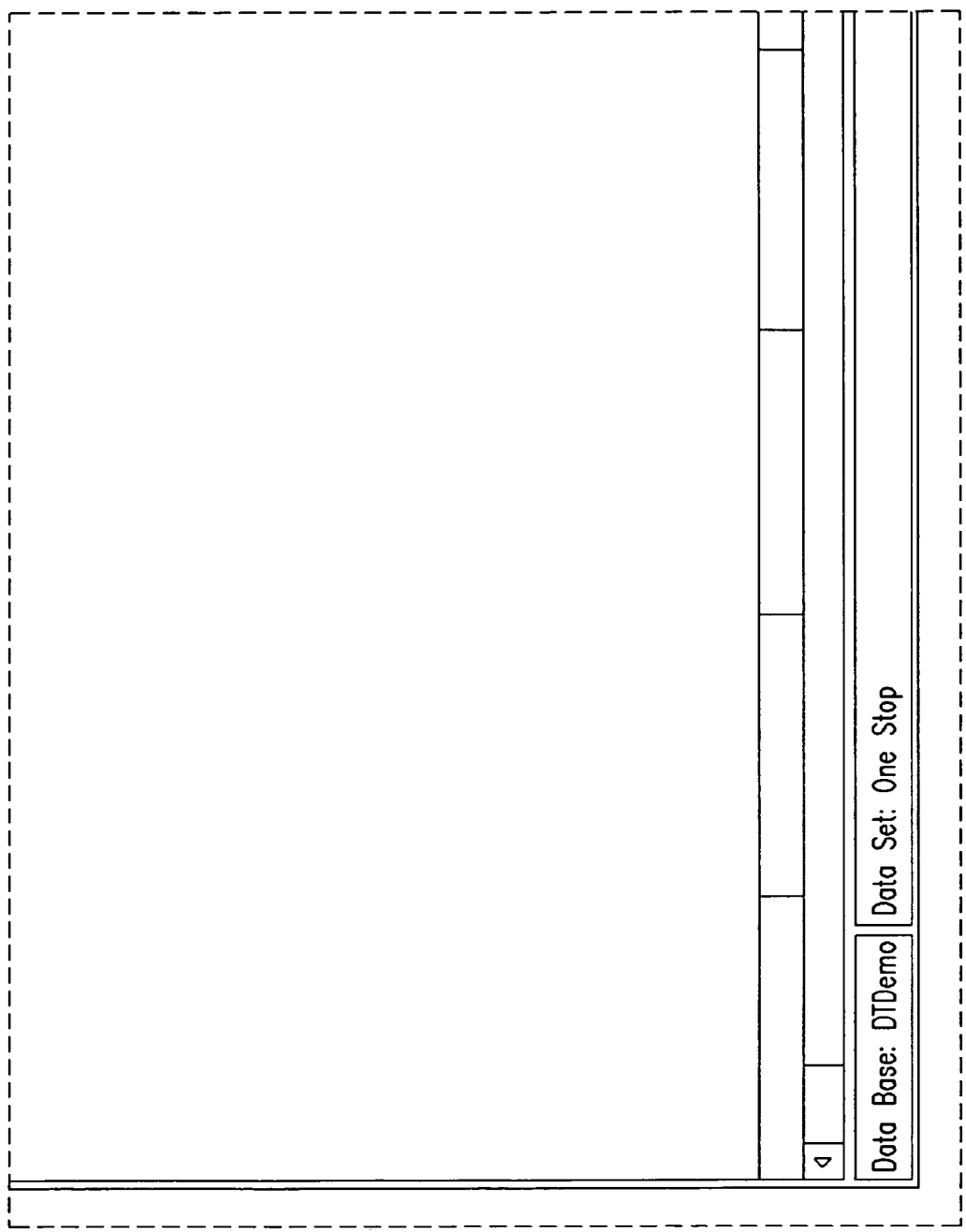

Referring to FIG. 8, a diagram 800 is presented depicting a groups/classes menu within the currently defined scenarios template of FIG. 6. The groups/classes menu provides a user with the ability to create and edit categorization attributes corresponding to product data and store data associate with a highlighted scenario 803. The groups/classes menu is invoked by selecting a groups/classes header 802 on the menu bar 801. The groups/classes menu provides the following options: manage store groups 804, manage product groups 805, manage classes of product brands 806, manage classes of product sizes 807, manage classes of product forms 808, and an option to edit product classes 809. If an additional class of products is defined via the edit classes option 809, then an option to manage that product class would be shown along with the other product class management options 806-808.

Figure 9:
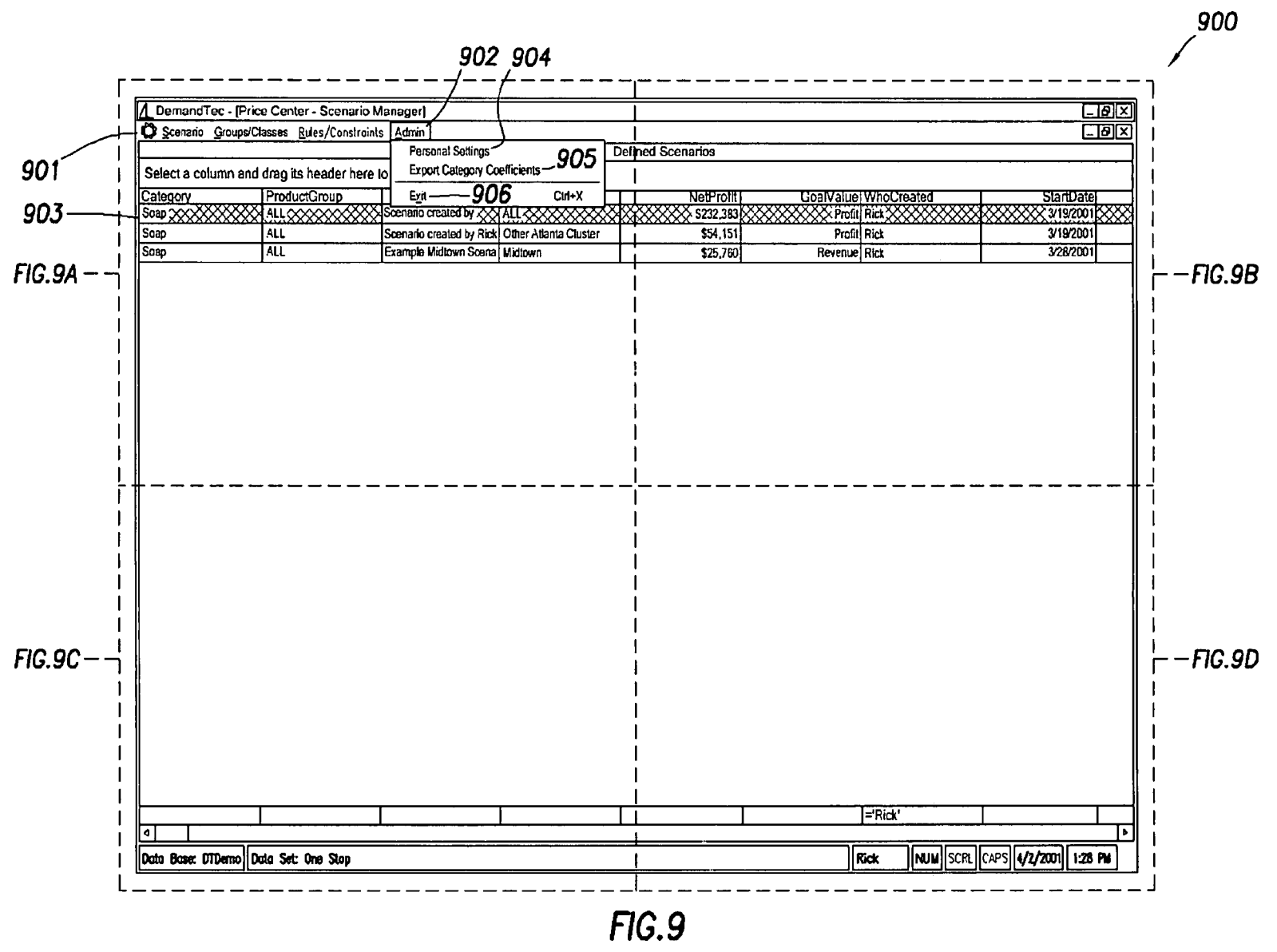
Figure 9B:
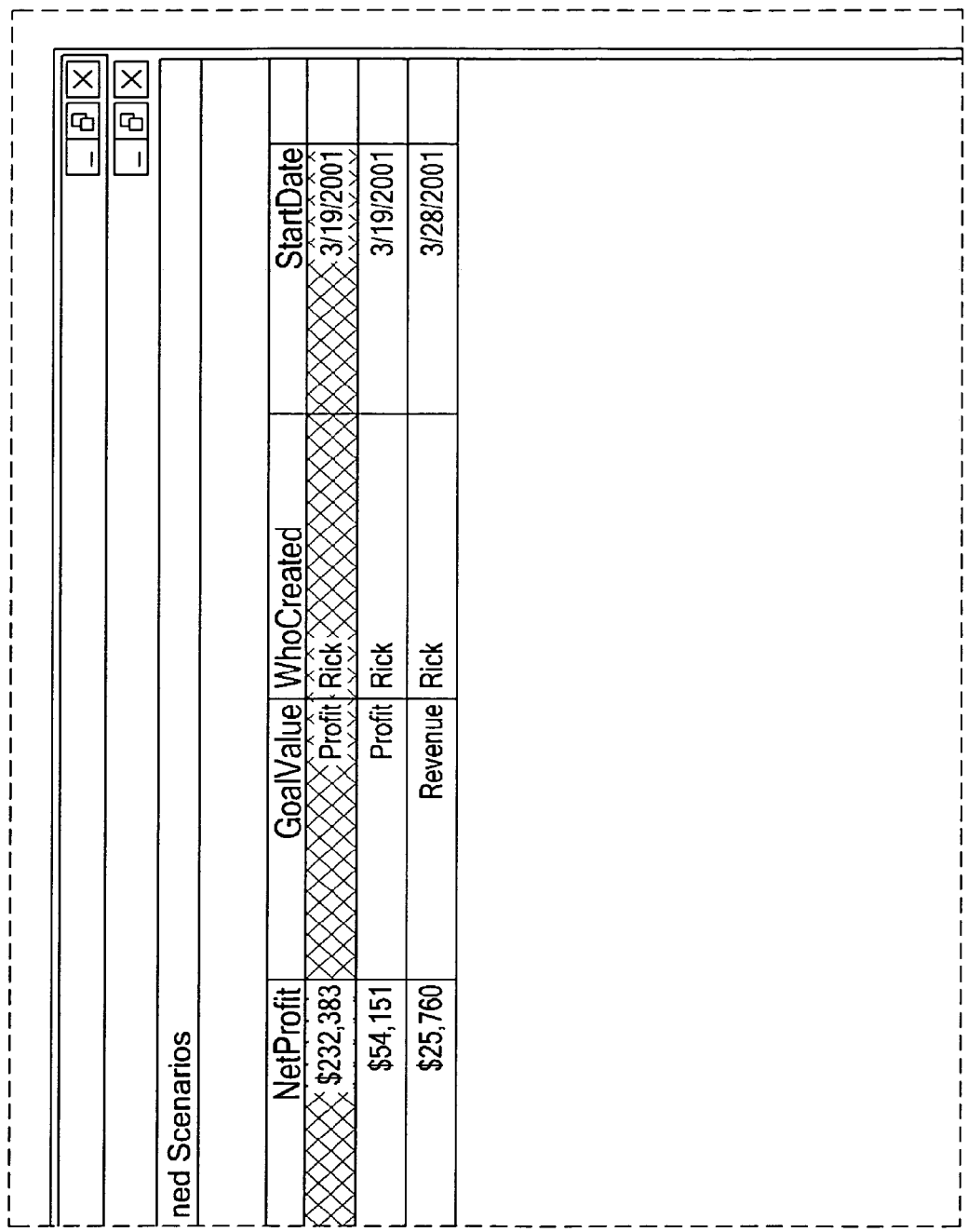
FIG. 9 is a diagram portraying an admin menu within the currently defined scenarios template of FIG. 6.
Figure 9C:
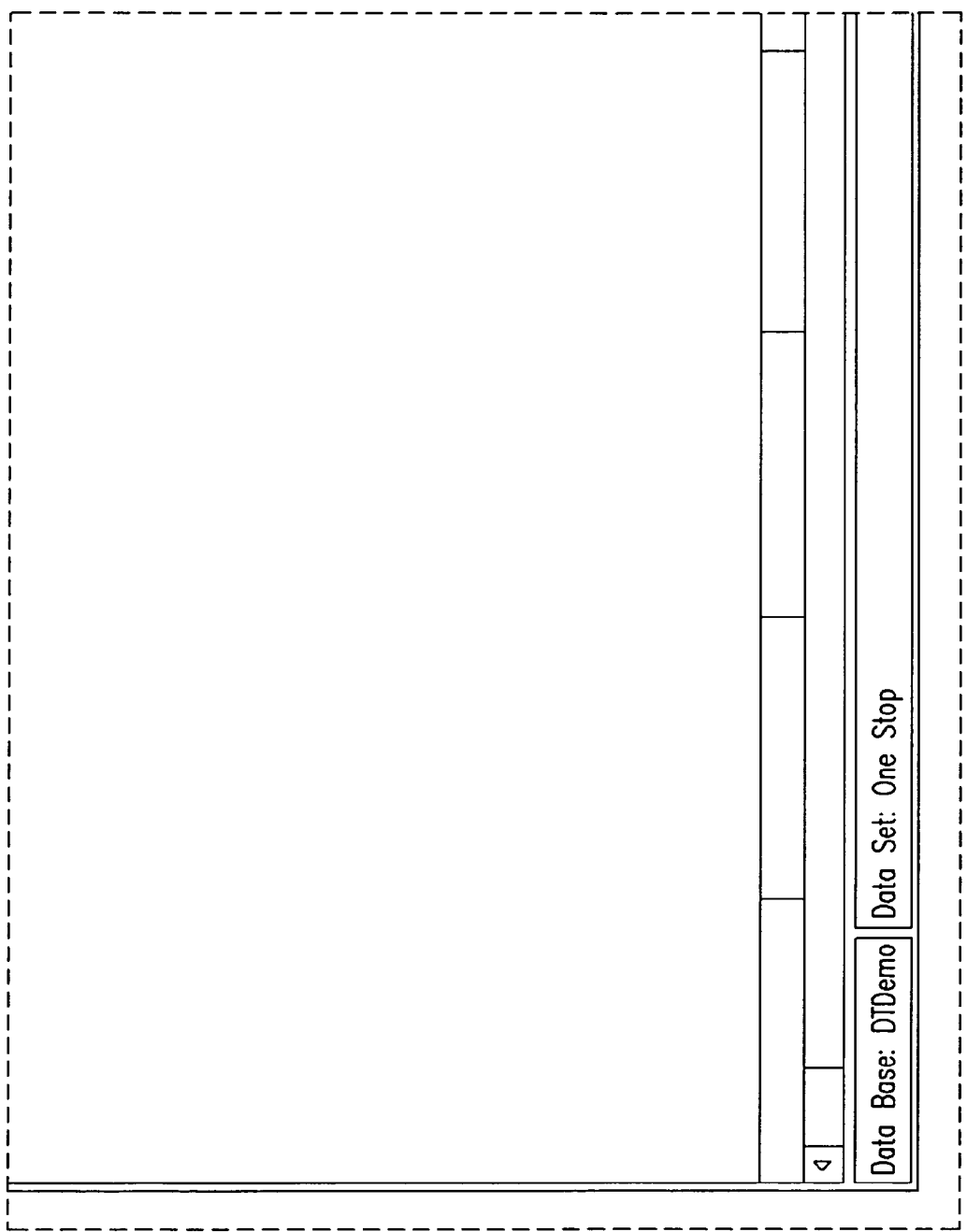
Figure 9D:
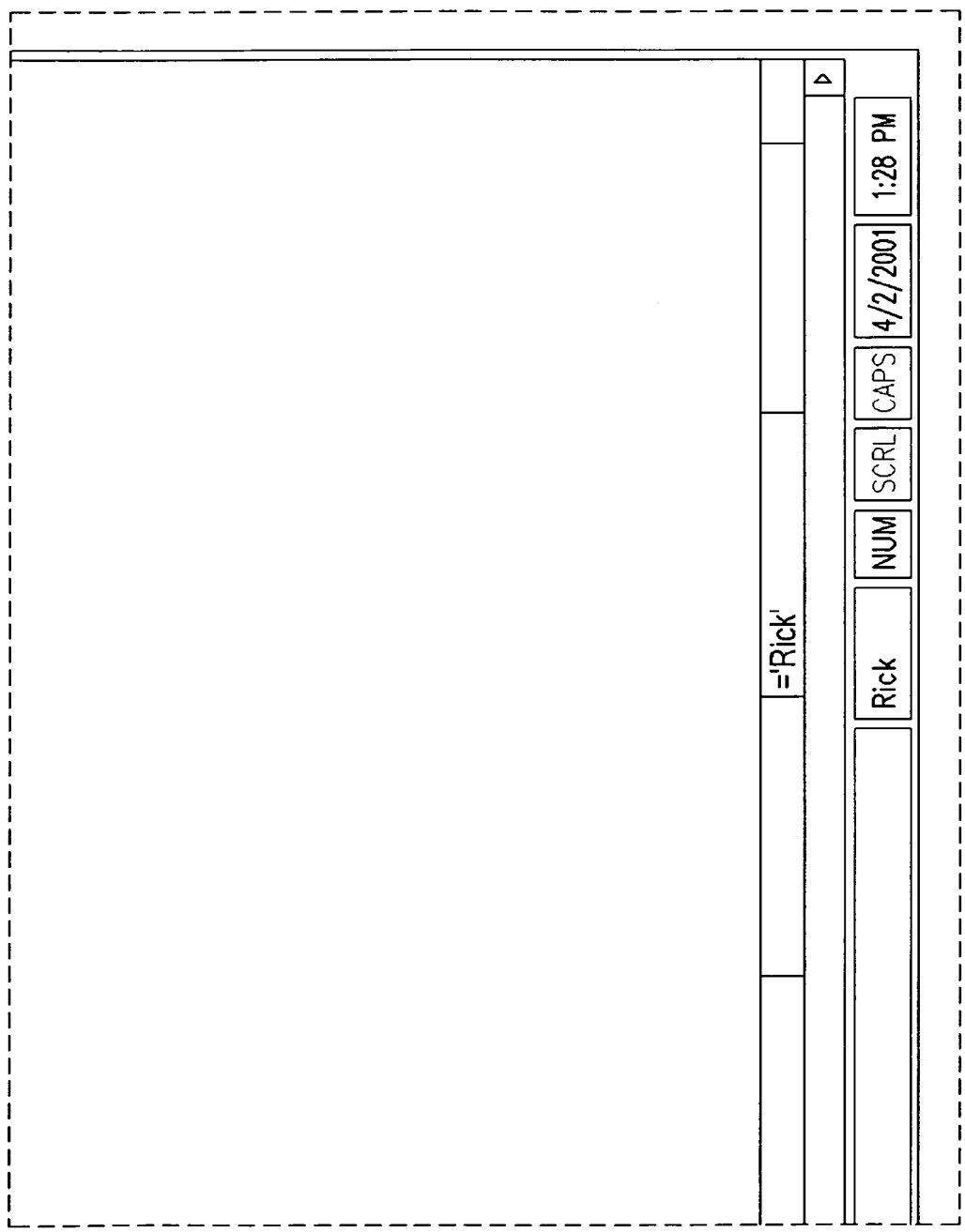

FIG. 9 is a diagram 900 portraying an admin menu within the currently defined scenarios template of FIG. 6. The admin menu provides a user with the ability to personalize how currently defined scenarios are presented (option 904) along with an option to export demand model coefficients 905 associated with product categories for a highlighted scenario 903. In addition, an exit option 906 is provided, allowing the user to exit the exemplary price optimization application.

When a user elects to create a new optimization scenario by selecting a create new scenario option 707 within the scenario menu discussed with reference to FIG. 7, a series of scenario configuration templates are provided by the exemplary embodiment for display within the user's web browser. The scenario configuration templates together comprise a new scenario wizard that enables the user to configure major scenario parameters and variables that are required to execute a price optimization. Less frequently employed parameters and variables can be configured following configuration of the major parameters and variables. The scenario configuration templates are more particularly described with reference to FIGS. 10-15.

Figure 10:
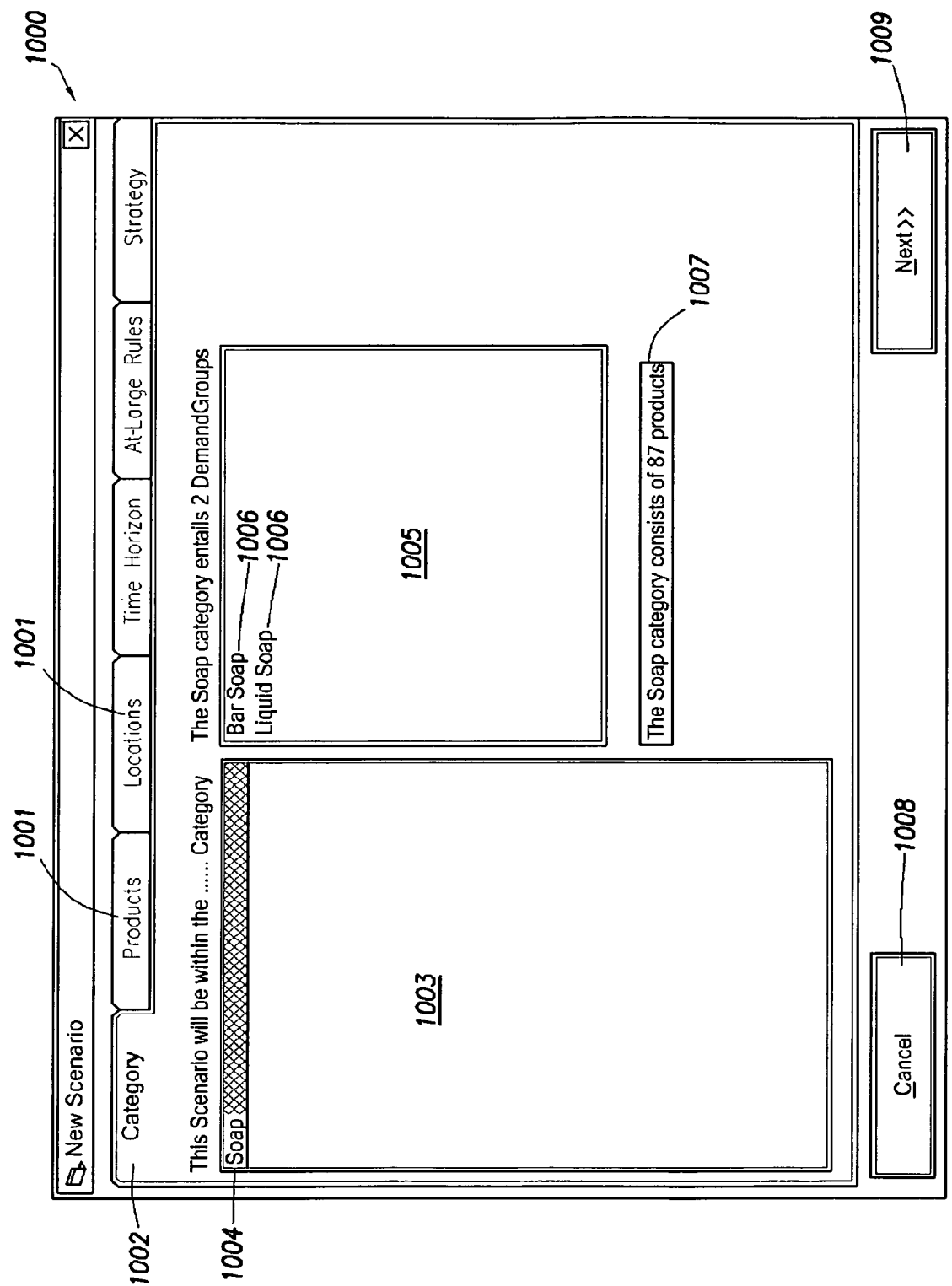
FIG. 10 is a diagram showing a category template that is part of a new scenario wizard according to an exemplary embodiment of the present invention.

Referring to FIG. 10, a diagram is presented showing a category template 1000 that is part of a new scenario wizard according to an exemplary embodiment of the present invention. The category template 1000 has a categories display field 1003, a demand groups field 1005, a products listing field 1007, a cancel button 1008, and a next template button 1009. The category template 1000 is the first of the scenario configuration templates that are provided to the user's web client upon election to configure a new scenario for optimization. In addition, during the process of new scenario configuration, tabs 1001, 1002 along the upper portion of the scenario configuration templates allow the user to return to a previously configured set of parameters/variables in order to check and/or modify the previously configured set. Those parameters/variables that are currently being configured are indicated by a bold tab 1002. Parameters/variables that are unavailable for modification are indicated by dimmed tabs 1001.

The categories field 1003 provides a listing of all product categories 1004 that are available for optimization according to the client's data set within the data base. The user selects categories 1004 for optimization within the categories field 1003. Demand groups 1006 that have been defined by the user for the selected category 1004 are displayed within the demand groups field 1005. The products listing field 1007 displays the selected category 1004 along with the number of products that are in the selected category 1004. The cancel button 1008 enables the user to exit the new scenario wizard and the next button 1009 allow the user to proceed to the next template within the wizard.

Figure 11:
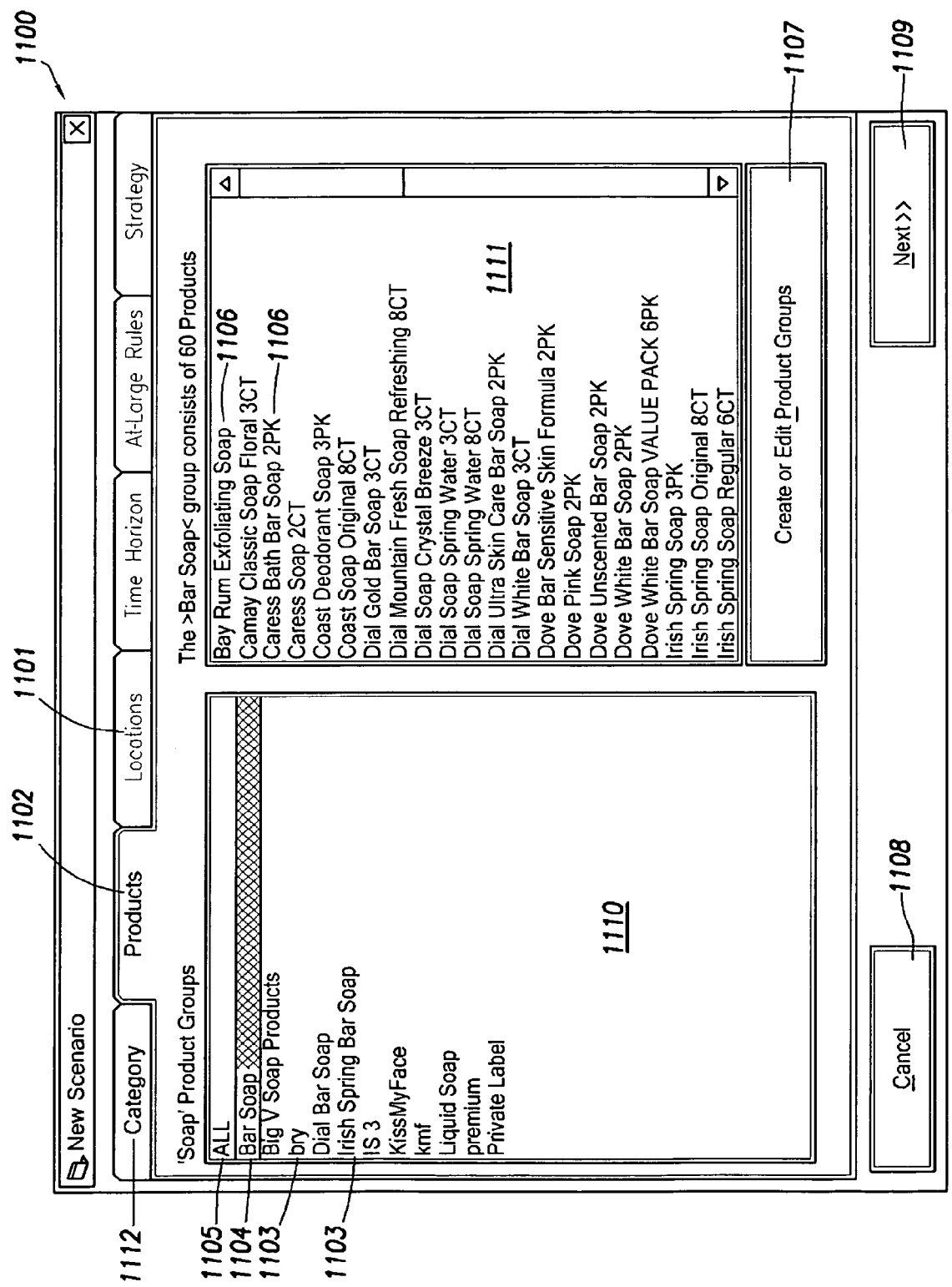
FIG. 11 is a diagram illustrating a product template that is part of the new scenario wizard.

After the user has selected categories for optimization, the new scenario wizard presents a product template 1100 to the user's web browser, a diagram of which is shown in FIG. 11. The product template 1100 indicates that the user is currently configuring products parameters/variables for a new scenario by a bold products tab 1102. Dimmed tabs 1101 indicate parameters/variables that cannot be presently configured and normal tabs 1112 designate parameters/variables that have been configured, but which may be modified. The product template 1100 has a products group field 1110 that displays all of the product groups 1103-1105 that have been established by the client as being available for optimization within the user-selected product category described with reference to FIG. 10. An all groups option 1105 is also provided to allow the user optimize prices for all products within the selected product category. Within the products group field 1110, the user selects a product group 1104 for optimization, which is indicated by highlighting. The products field 1111 displays all of the products 1106 within the selected product group 1104. A create or edit product groups button 1107 allows the user to dynamically modify product groups during configuration of the new scenario. A cancel button 1108 is provided to allow the user to exit the new scenario configuration wizard and a next button 1109 enables the user to proceed to the next template within the wizard.

Figure 12:
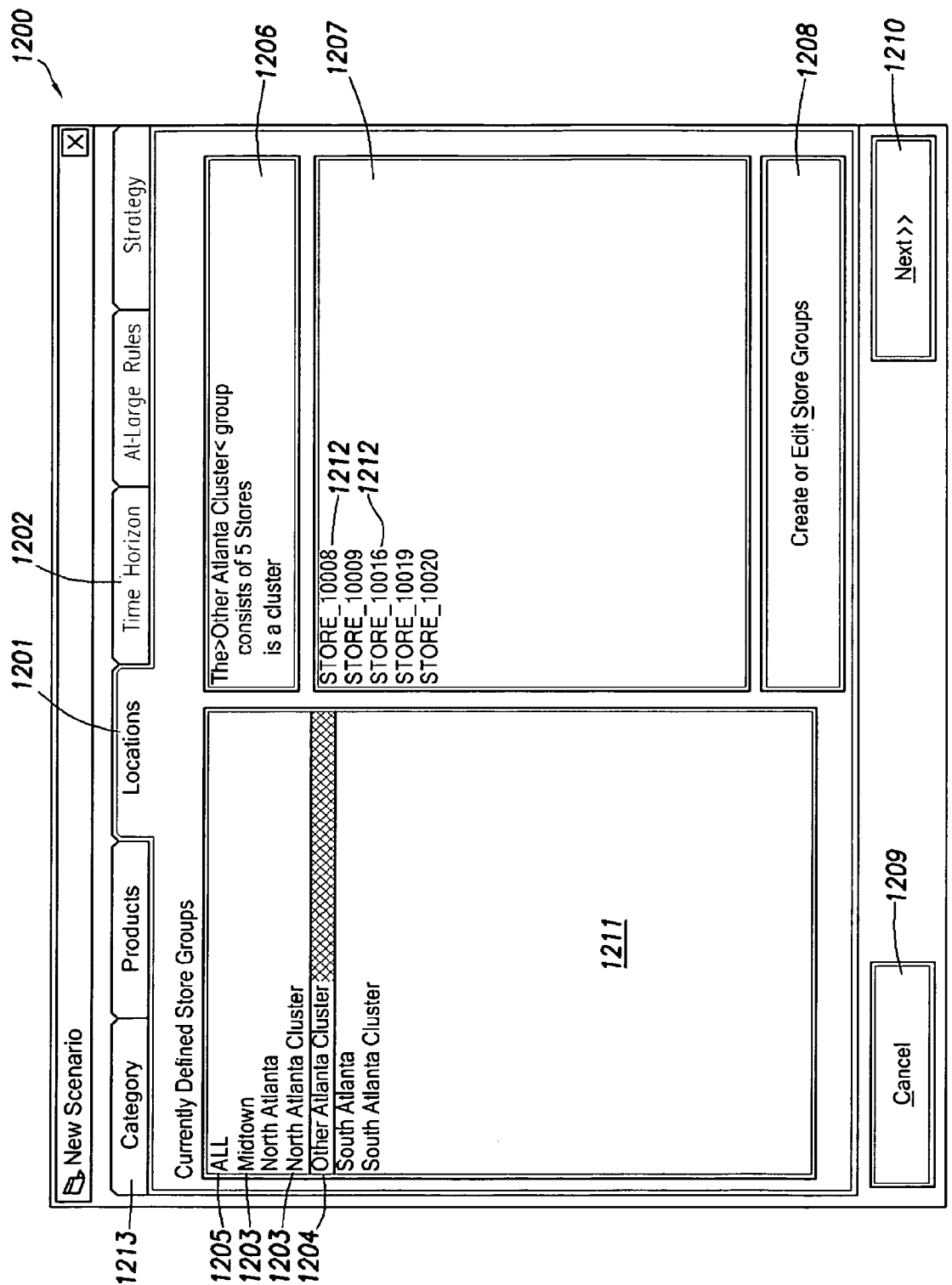
FIG. 12 is a diagram featuring a location template that is part of the new scenario wizard.

Now referring to FIG. 12, a diagram is presented featuring a location template 1200 that is part of the new scenario wizard. As with the templates 1000, 1100 or FIGS. 10 and 11, the location template 1200 indicates parameters that are presently being configured, those that have been configured, and those that have not yet been configured via bold, normal, and dimmed tabs 1201, 1213, 1202. The locations template 1200 has a store groups field 1211, a store groups description field 1206, and a stores listing field 1207. The store groups field 1211 allows the user to select from a store group 1203-1205 for which prices will be optimized. A selected store group 1204 is indicated via highlighting. In addition, and all stores option 1205 is provided to allow the user to optimize prices for all stores entered in the client's data set. The description field 1206 displays a description of the selected store group 1204 and the stores list field 1207 lists all of the client stores 1212 that are within the selected store group 1204. The user can dynamically define store groups 1203-1205 by selecting a create/edit store groups button 1208. The user can exit the wizard by selecting a cancel button 1209. And the user can proceed to the next template by selecting a next button 1210.

Figure 13:
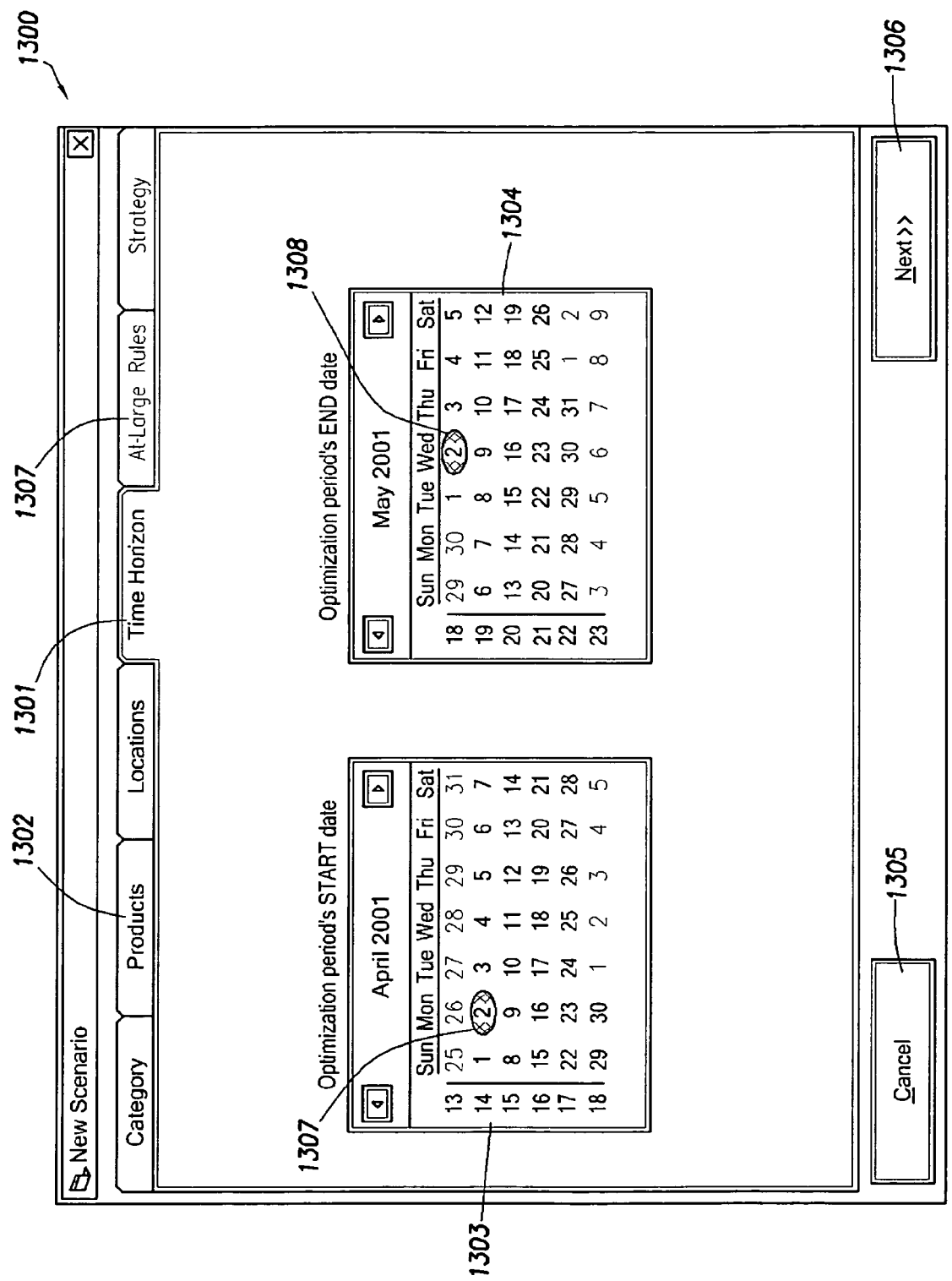
FIG. 13 is a diagram depicting a time horizon template that is part of the new scenario wizard.

Referring to FIG. 13, a diagram is presented depicting a time horizon template 1300 that is part of the new scenario wizard. The time horizon template 1300 indicates parameters that are presently being configured, those that have been configured, and those that have not yet been configured via bold, normal, and dimmed tabs 1301, 1302, 1307. The time horizons template 1300 has an optimization start date field 1303 where the user selects a start date 1307 for the new optimization scenario and an optimization end date field 1304 where the user selects an end date 1308 for the new optimization scenario. Selected start and end dates 1307, 1308 for optimizing prices are indicated within the template 1300 by highlighting. The user can exit the wizard by selecting a cancel button 1305 and the user can proceed to the next template by selecting a next button 1306.

Figure 14:
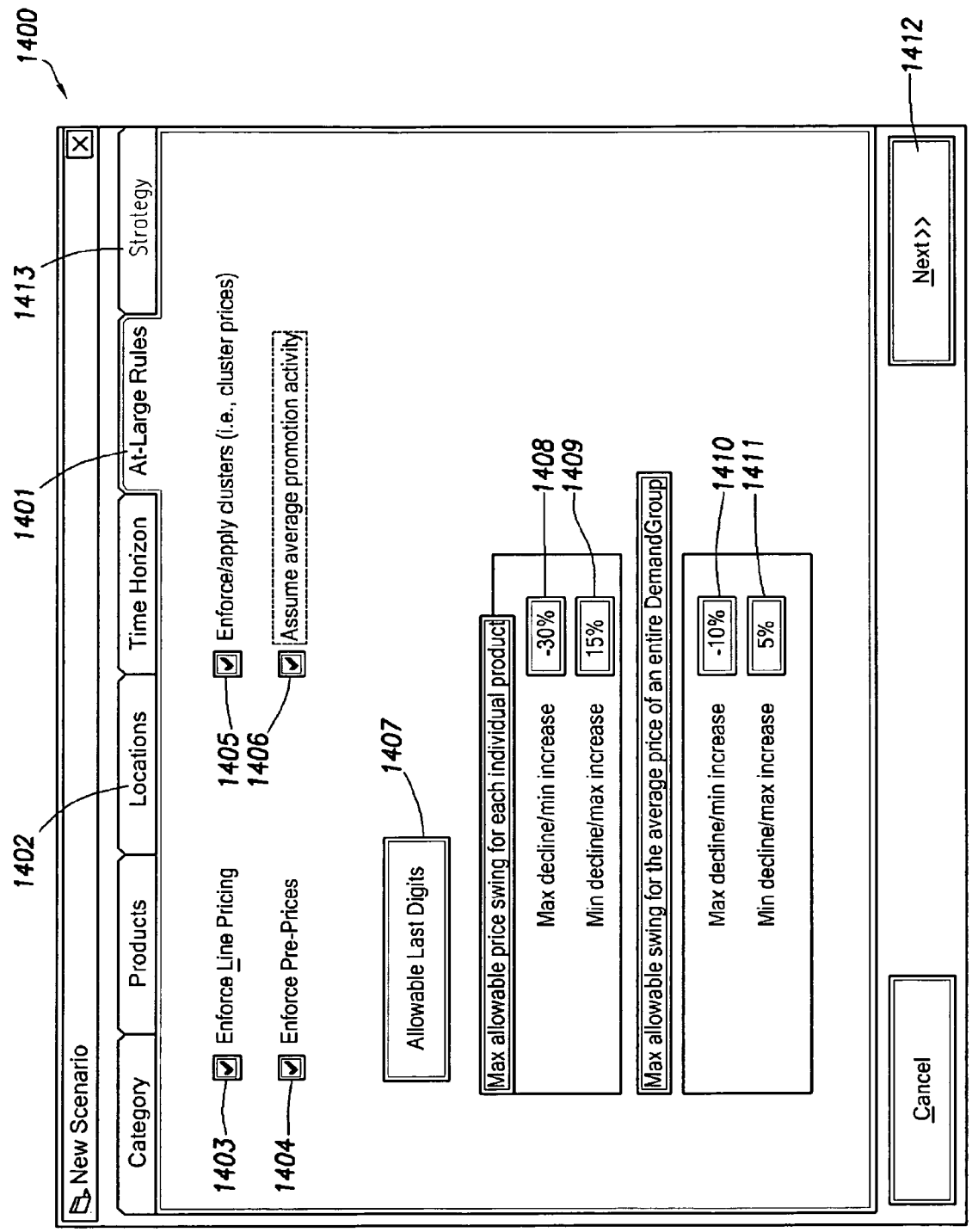
FIG. 14 is a diagram portraying an at-large rules template that is part of the new scenario wizard.

FIG. 14 is a diagram portraying an at-large rules template 1400 that is part of the new scenario wizard. The at-large rules template 1400 allows the user to specify general rules and constraints for the new optimization scenario. The at-large rules template 1400 indicates parameters that are presently being configured, those that have been configured, and those that have not yet been configured via bold, normal, and dimmed tabs 1401, 1402, 1413. The at-large rules template 1400 has an enforce line pricing rule checkbox 1403 that constrains the optimization to create the same optimized prices for all products within a given product line. The template 1400 also has an enforce pre-prices rule checkbox 1404 that enables the user to constrain the optimization such that pre-priced product prices do not change. In addition, the template has an enforce/apply clusters rule checkbox 1405 that allows the user to direct the optimization to select the same optimized prices for all stores within a given store cluster that has been prescribed by the user. The template 1400 provides an assume average promotion activity checkbox 1406 as well, that directs the price optimization system to assume average promotion activity as part of its price optimization procedure. An allowable last digits button 1407 on the template takes the user to another template that enables the selection of numerical values that are allowed/not allowed resulting from the optimization.

In addition to these general rules, the at-large rules template 1400 provides the user with an individual product max decline/min increase field 1408 and an individual product min decline/max increase field 1409. The individual product fields 1408, 1409 allow the user to enter limits for the swing of individual product prices determined by the optimization. The at-large rules template 1400 also has a demand group max decline/min increase field 1410 and a demand group min decline/max increase field 1412. The demand group fields allow the user to constrain price swings in the optimization over an entire demand group. A next button 1412 allows the user to proceed to the next template in the new scenario configuration wizard.

Figure 15:
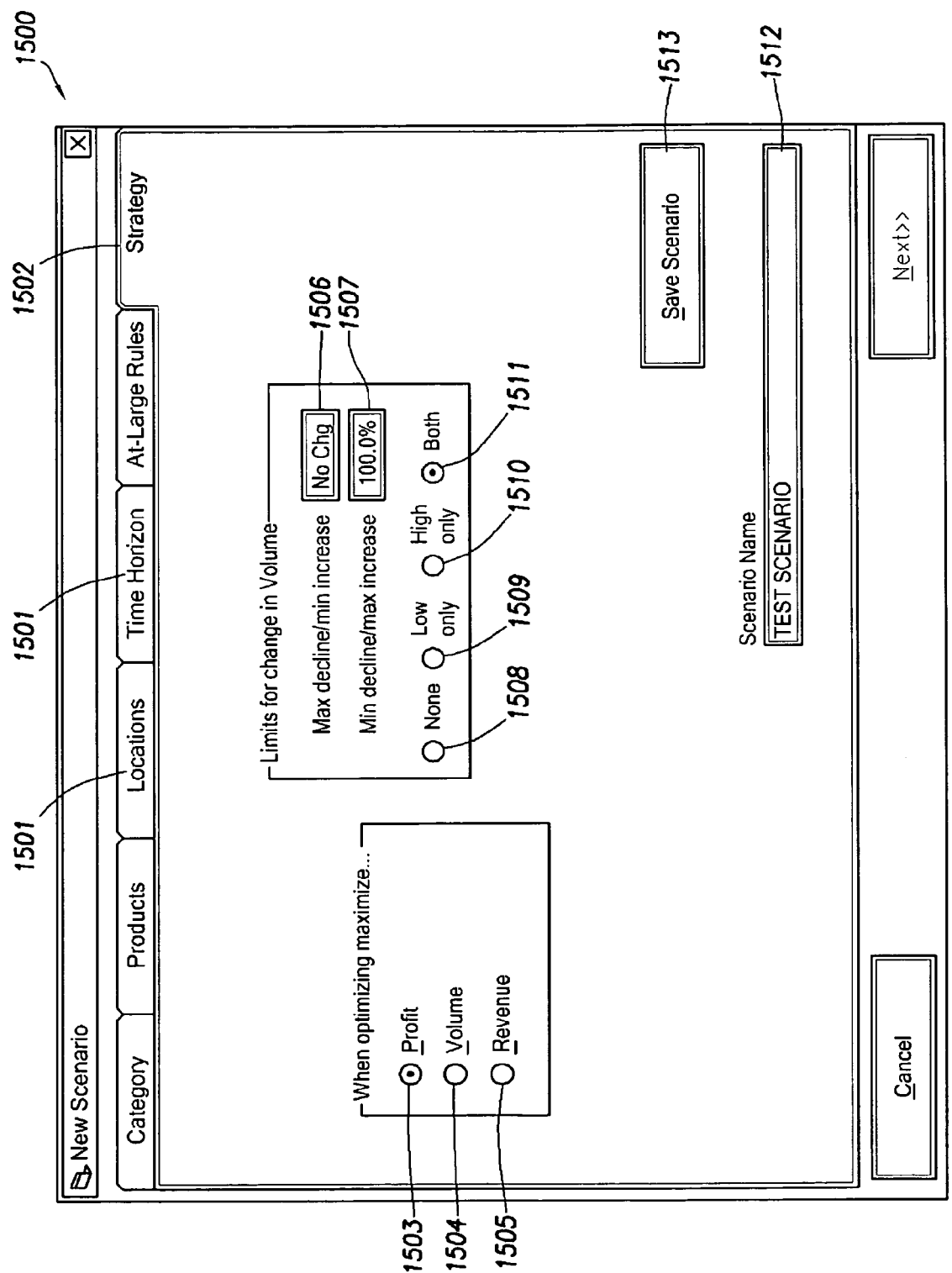
FIG. 15 is a diagram portraying a strategy template that is part of the new scenario wizard.

Now referring to FIG. 15, a diagram is presented portraying a strategy template 1500 that is part of the new scenario wizard. The strategy template 1500 indicates parameters that are presently being configured and those that have been configured via bold and normal tabs 1502, 1501. Since the strategy window 1500 is the last template 1500 in the new scenario wizard, no dimmed tabs remain. The strategy window 1500 provides overall optimization strategy buttons that enable the user to prescribe an optimization to maximize either profit 1503, volume 1504, or revenue 1505. In addition, the strategy template provides a volume max decline/min increase field 1506 and a volume min decline/max increase field 1507 that allow the user to enter values constraining the allowable volumetric swing for the optimization. In addition buttons are provided that enable the user to use both limits specified in the fields 1506, 1507 (button 1511), no limits (button 1508), only the lower limit prescribed in field 1506 (button 1509), or only the upper limit specified in field 1507 (button 1510). A scenario name field 1512 enables the user to assign a name to the configured scenario and a save scenario button 1513 allows the user to save the configured scenario and exit the new scenario wizard.

Having now described the creation of a new optimization scenario with reference to FIGS. 10-15, additional features of the exemplary price optimization system embodiment will now be discussed with reference to FIGS. 16-26. FIGS. 16-26 include a series of results templates that illustrate the various options for viewing the results of an executed optimization and configuration settings for both configured and executed optimizations.

Figure 16:
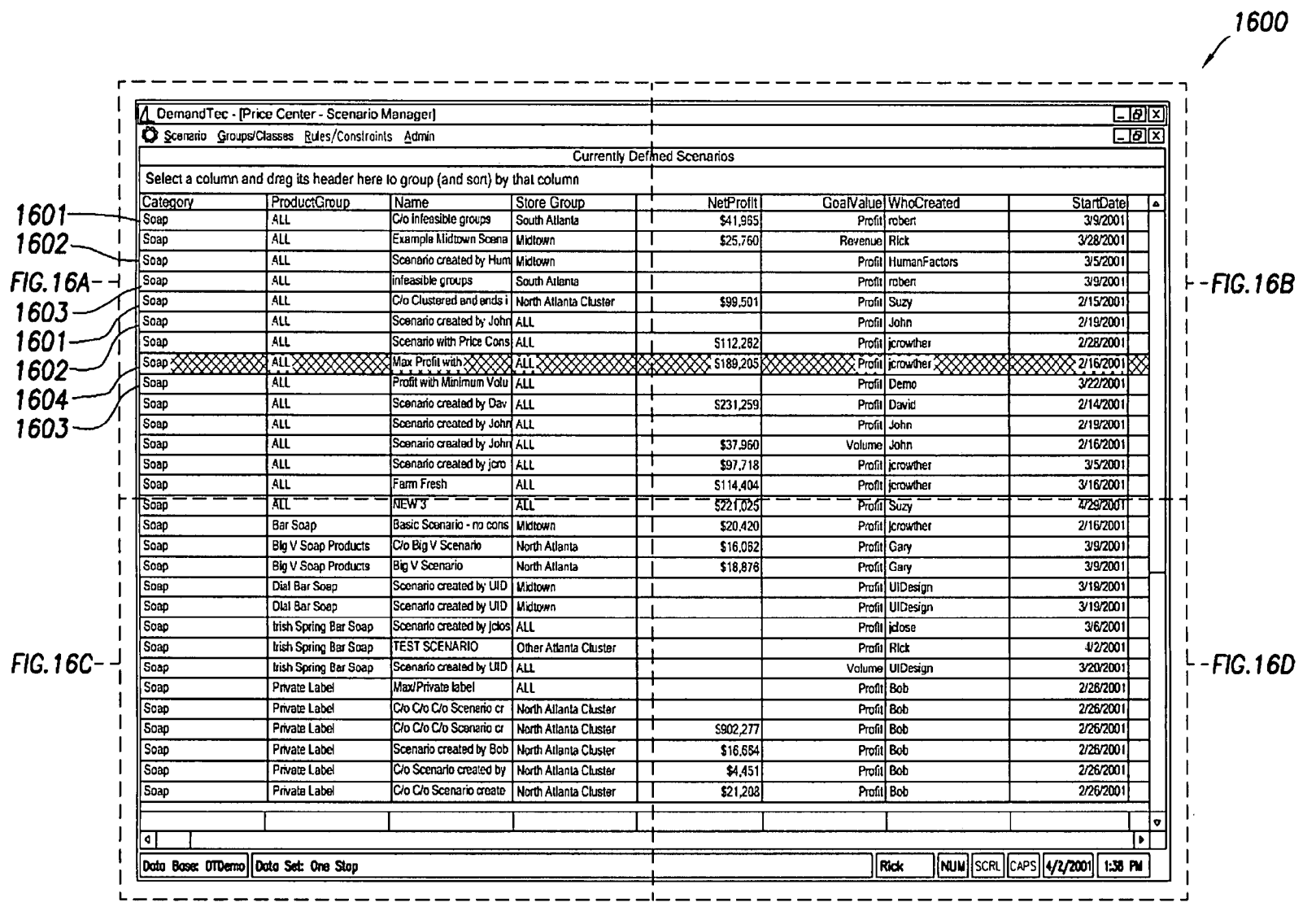

Now referring to FIG. 16, a diagram is presented showing a currently defined scenarios window 1600 according to an exemplary embodiment of the present invention that features defined scenarios 1601-1604 in various states of optimization. As described with reference to FIG. 6, highlighting and/or shading techniques are employed by the exemplary price optimization embodiment to allow the user to easily distinguish between newly created scenarios 1602, scenarios having a pending optimization 1603, scenarios that have completed optimizations 1601, and a currently selected scenario 1604. Through commands of a pointing device, or via selecting the view optimization results option 711 on the scenario menu discussed with reference to FIG. 7, means are provided for the user to view detailed results corresponding to optimized scenarios 1601. Through commands of a pointing device (e.g., double-clicking using a mouse device), means are provided to view information regarding the selected scenario 1604.

Figure 17:
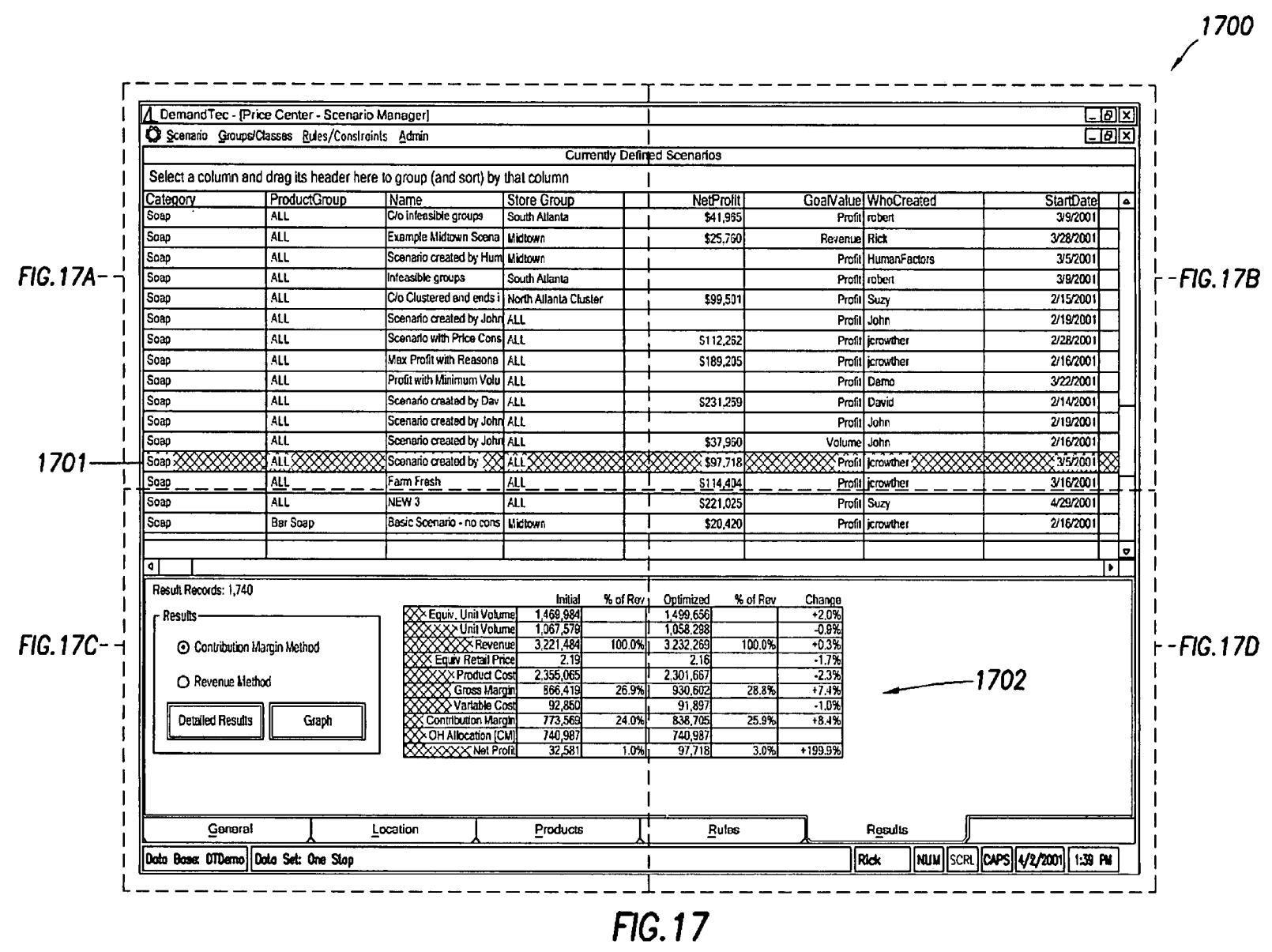
Figure 17C:
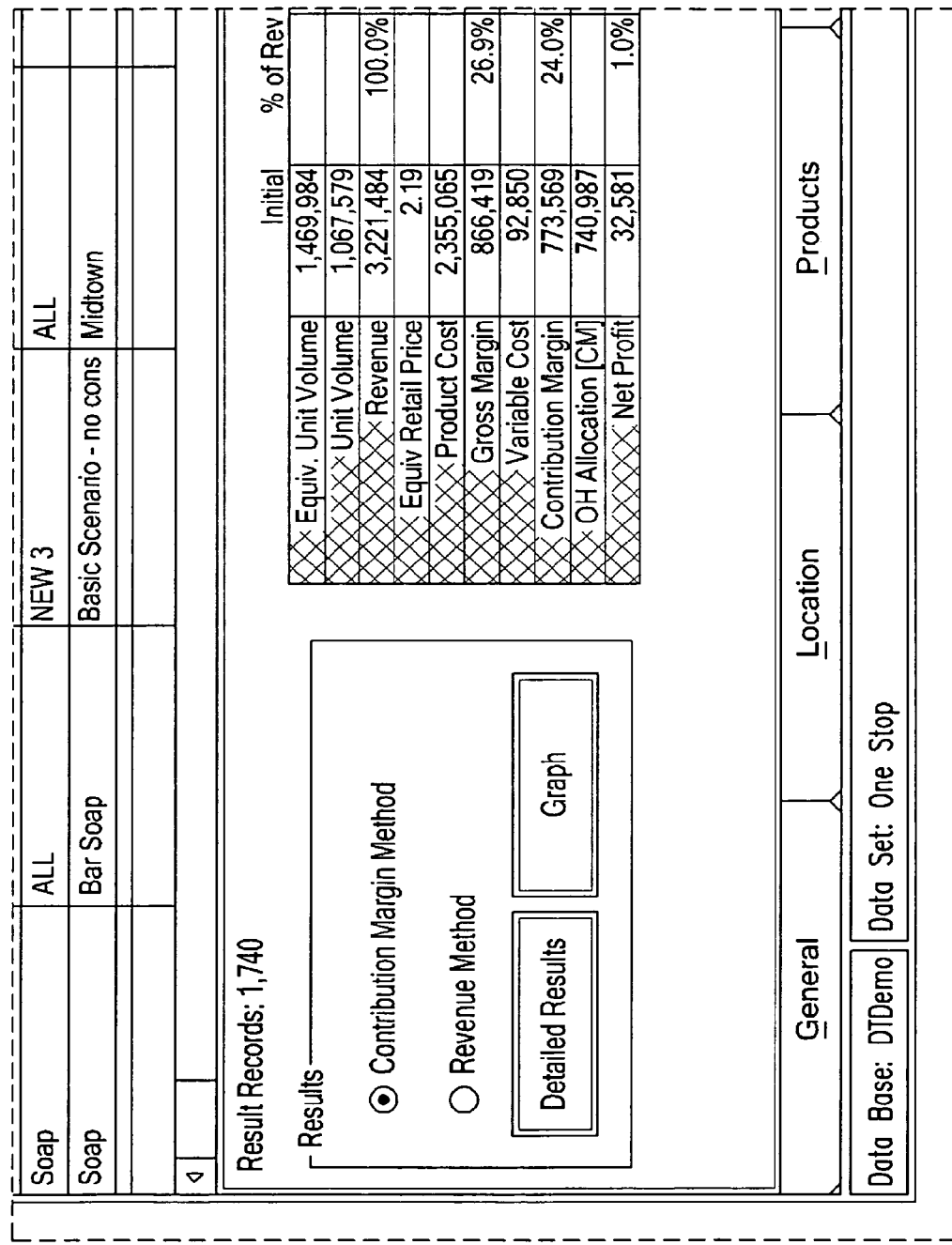
FIG. 17 is a diagram illustrating how optimization results are presented to a user within the currently defined scenarios window of FIG. 16.

FIG. 17 is a diagram 1700 illustrating how optimization results are presented to a user within the currently defined scenarios window of FIG. 16. The diagram shows a portion of a currently defined scenarios template having a selected scenario 1701 for which optimization results are available. For the selected scenario 1701, the diagram shows an optimization results template 1702 laid within the currently defined scenarios window.

Figures 18, 19:
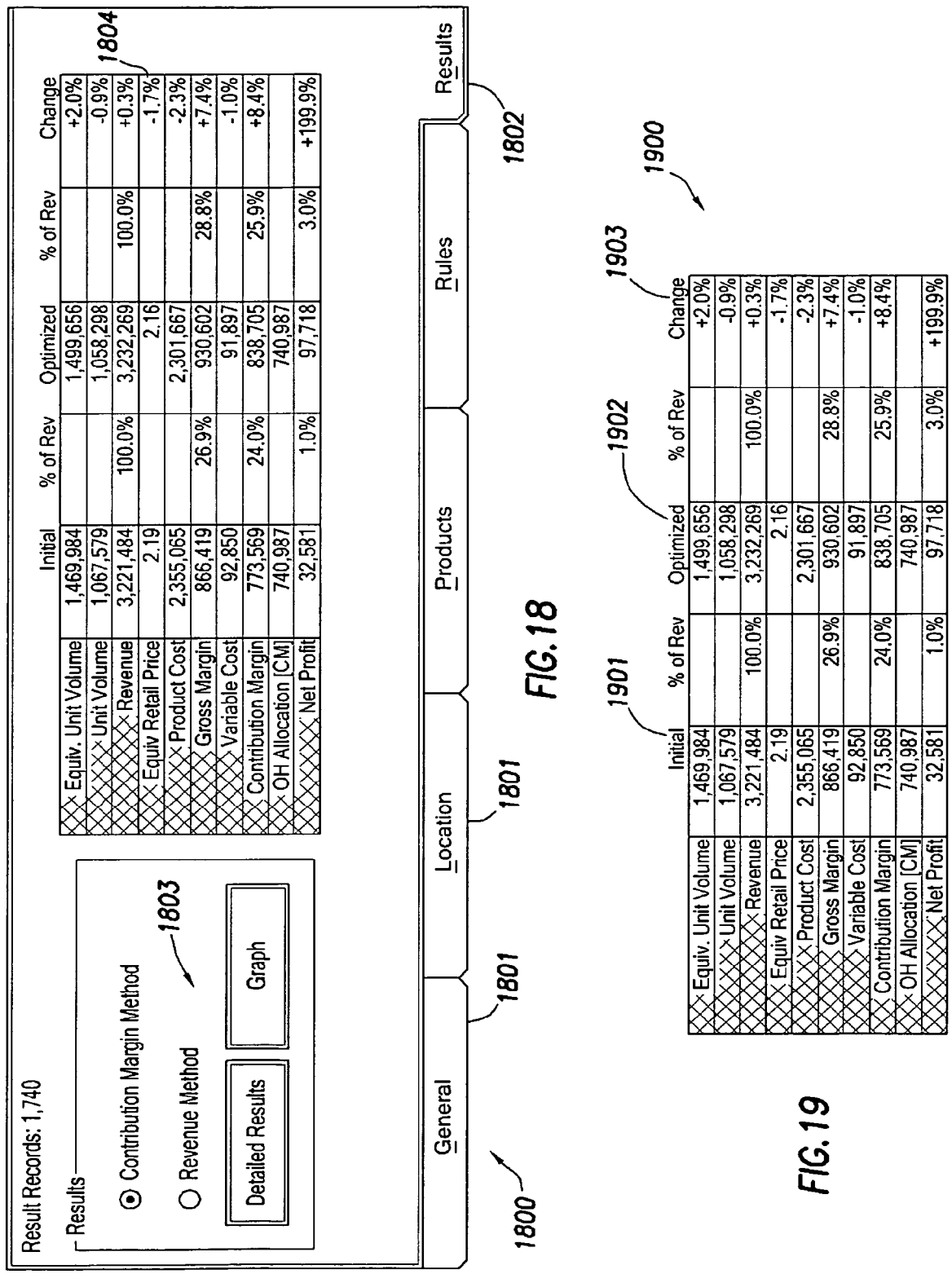
FIG. 18 is a diagram featuring an optimization results template according to the exemplary embodiment of the present invention.
FIG. 19 is a diagram depicting a contribution margin method for presenting optimization results according to the exemplary embodiment of the present invention.

FIG. 18 is a diagram featuring an optimization results template 1800 according to the exemplary embodiment of the present invention, like that shown for the selected scenario discussed with reference to FIG. 17. The results template 1800 is one of five scenario information templates that are provided for a selected scenario via tabs 1801, 1802. A results tab 1802 is highlighted indicating that the user is viewing optimization results for a selected optimization scenario. The results template 1800 has a results summary field 1804, presenting summarized results of the optimization for the selected scenario, along with controls 1803, providing selectable options for viewing additional aspects of the result data for the selected scenario.

Now referring to FIG. 19, a diagram is presented depicting a contribution margin method for presenting optimization results within an optimization results summary field 1900, like that shown in FIG. 18. The results summary field 1900 includes an initial value column 1901, an optimized value column 1902, and a percent change column 1903. The columns 1901-1903 present summarized result data for a selected optimization scenario according to a contribution margin method of viewing the data. Initial, optimized, and percent change values are provided for such attributes of an optimization as equivalent unit volume, unit volume, revenue, equivalent retail price, product cost, gross margin, variable cost, contribution margin, overhead allocation, and net profit.

Figure 20:
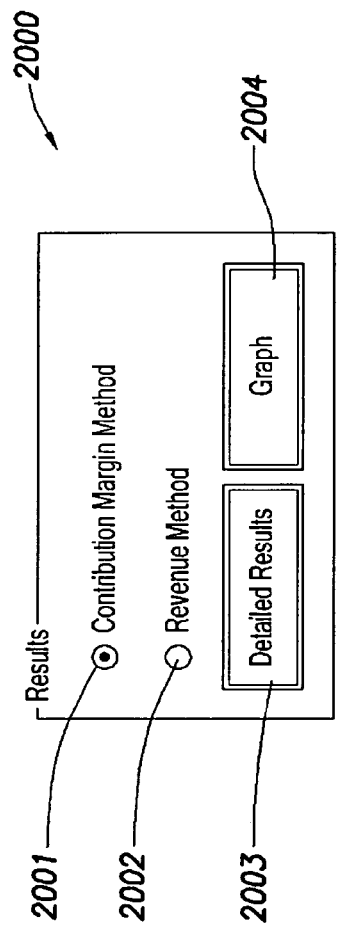
FIG. 20 is a diagram portraying scenario results display options within the optimization results template of FIG. 18.

Referring to FIG. 20, a diagram is presented portraying scenario results display options 2000 within the optimization results template of FIG. 18. Options that are provided to the user for viewing result data include a contribution margin method option 2001, a revenue method option 2002, a detailed results option 2003, and a graphical results option 2004.

Figure 21:
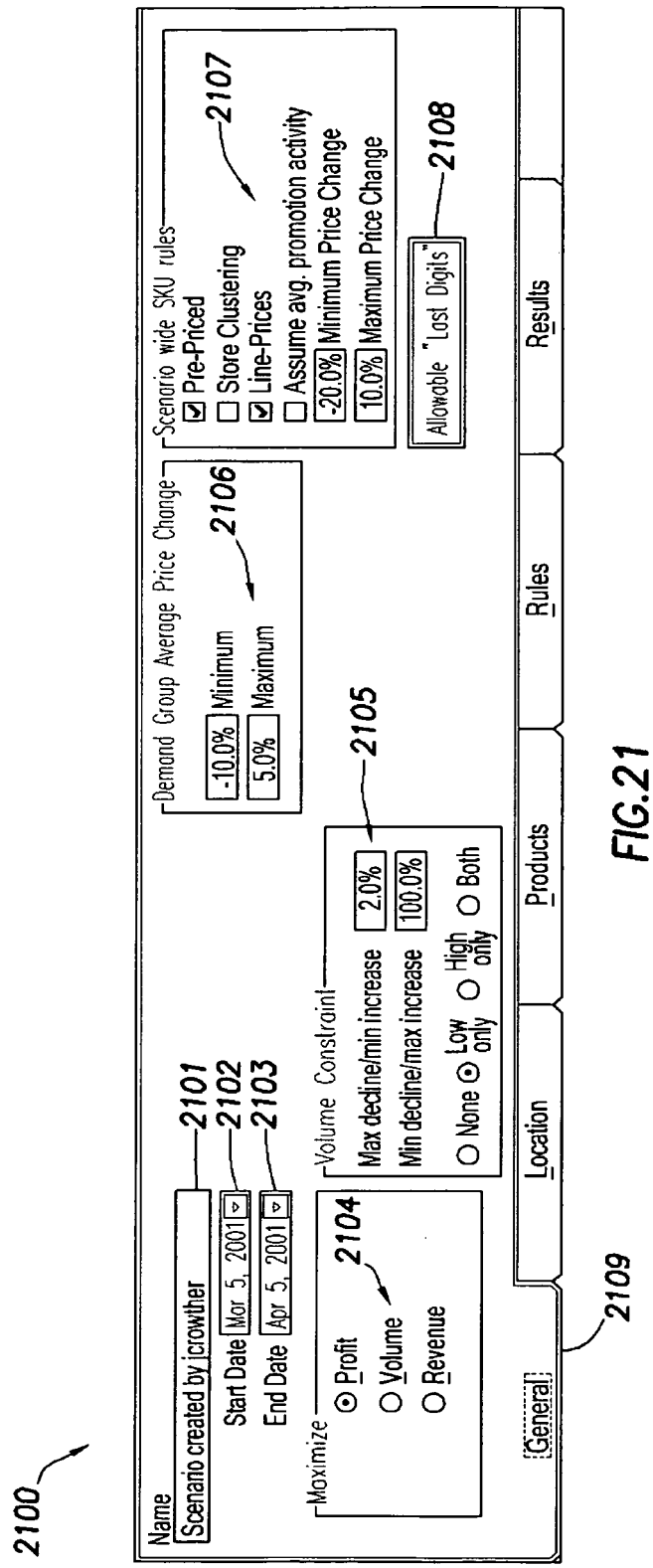
FIG. 21 is a diagram showing a general information window pertaining to a particular optimization scenario that has been selected within the currently defined scenarios window of FIG. 16.

The user can also view general information associated with a selected optimization scenario by selecting a general information tab 2109 within a currently defined scenarios window having an inlaid results template, like that discussed with reference to FIG. 18. FIG. 21 is a diagram showing a general information window 2100 pertaining to a particular optimization scenario that has been selected within the currently defined scenarios window of FIG. 16. The general information window 2100 provides a scenario name field 2101 depicting a name given for the selected scenario, a start date field 2102 showing the configured optimization start data, an end date field 2103 showing the configured optimization end date, a strategy area 2104 showing the merchandising figure of merit that is maximized by the optimization, a volume constraint field 2105 depicting user-provided volume change constraint, a demand group average price change constraints field 2106 showing user-provided demand group price change constraints, a scenario-wide rules field 2107 showing other scenario-wide rules provided for the optimization, and an allowable last digits button 2108 providing a link to an allowable last digits configuration template. For selected scenarios that have already completed optimization, the fields and buttons 2101-2108 are dimmed to indicate that their contents cannot be modified.

Figure 22:
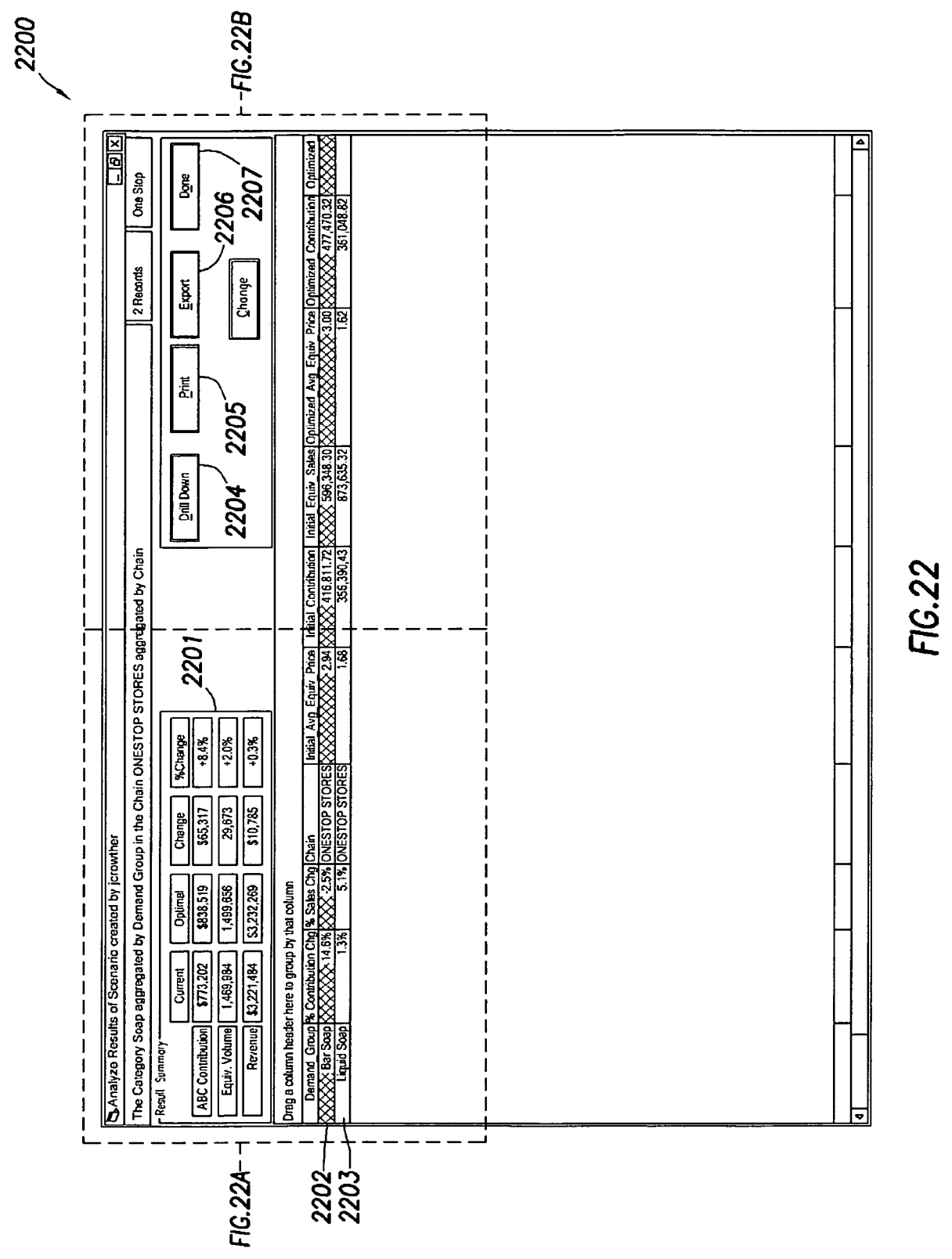
Figure 22B:
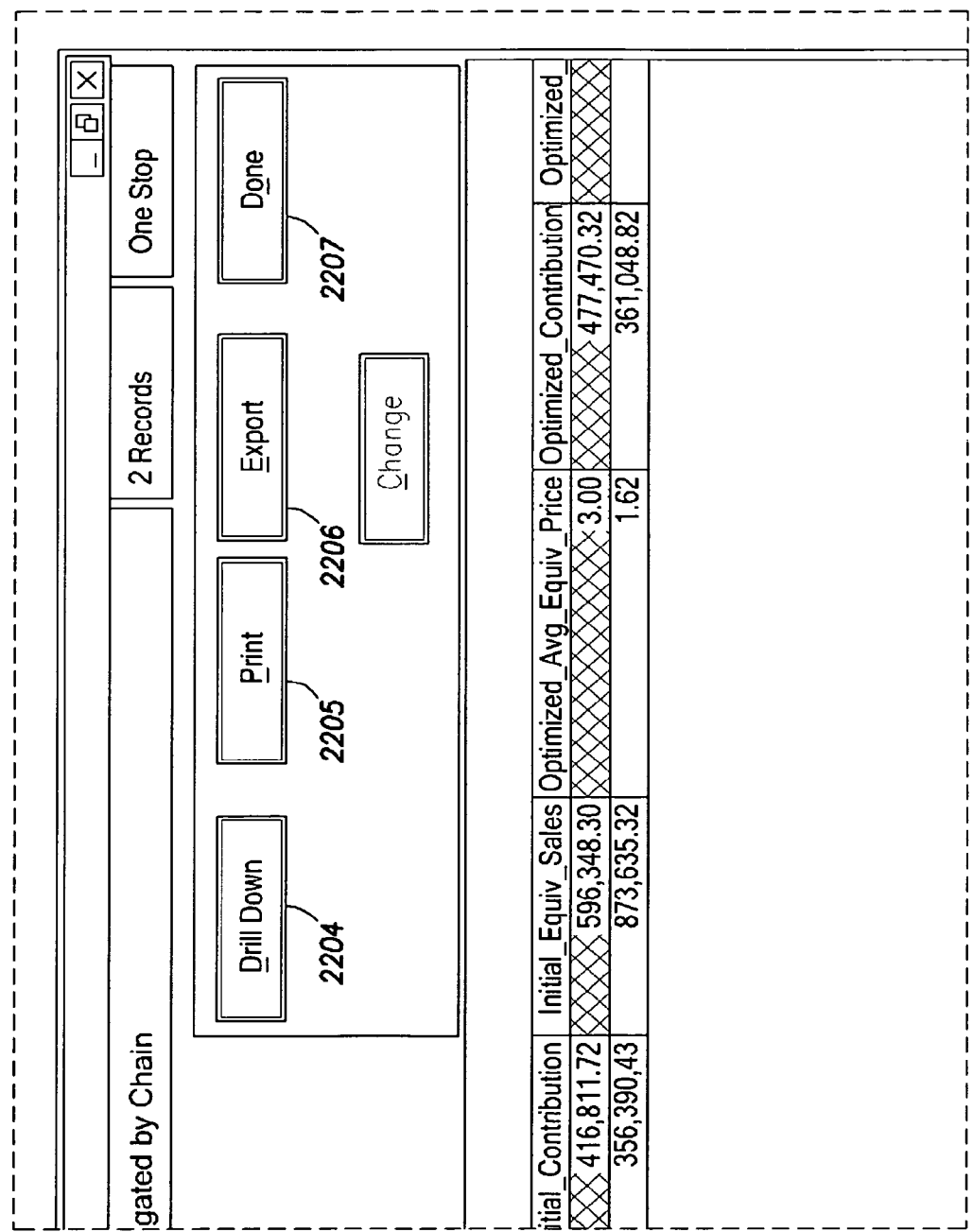
FIG. 22 is a diagram illustrating an analyze scenario results template that is provided to a user who selects to view detailed scenario results according to the display options of FIG. 20.

Now referring to FIG. 22, a diagram is presented illustrating an analyze scenario results template 2200 that is provided to a user who selects to view detailed scenario results according to the display options of FIG. 20. The analyzed scenario results template 2200 has a results summary field 2201, a listing of scenario sub-items 2202, 2203, a drill down button 2204, a print results button 2205, an export results button 2206, and a done button 2207. The results summary field 2201 depicts a results summary pertaining to a selected scenario sub-item 2202, as indicated by highlighting in FIG. 22. The drill down button 2204 enables the user to prescribe how results pertaining to sub-items are presented for review. The print results button 2205 directs the exemplary embodiment to produce a printed result report at the user's client machine. The export results button 2206 directs the exemplary embodiment to download a results file to the client machine. The done button 2207 enables the user to exit the analyze results window 2200 and to return to the currently defined scenarios window.

Figure 23:
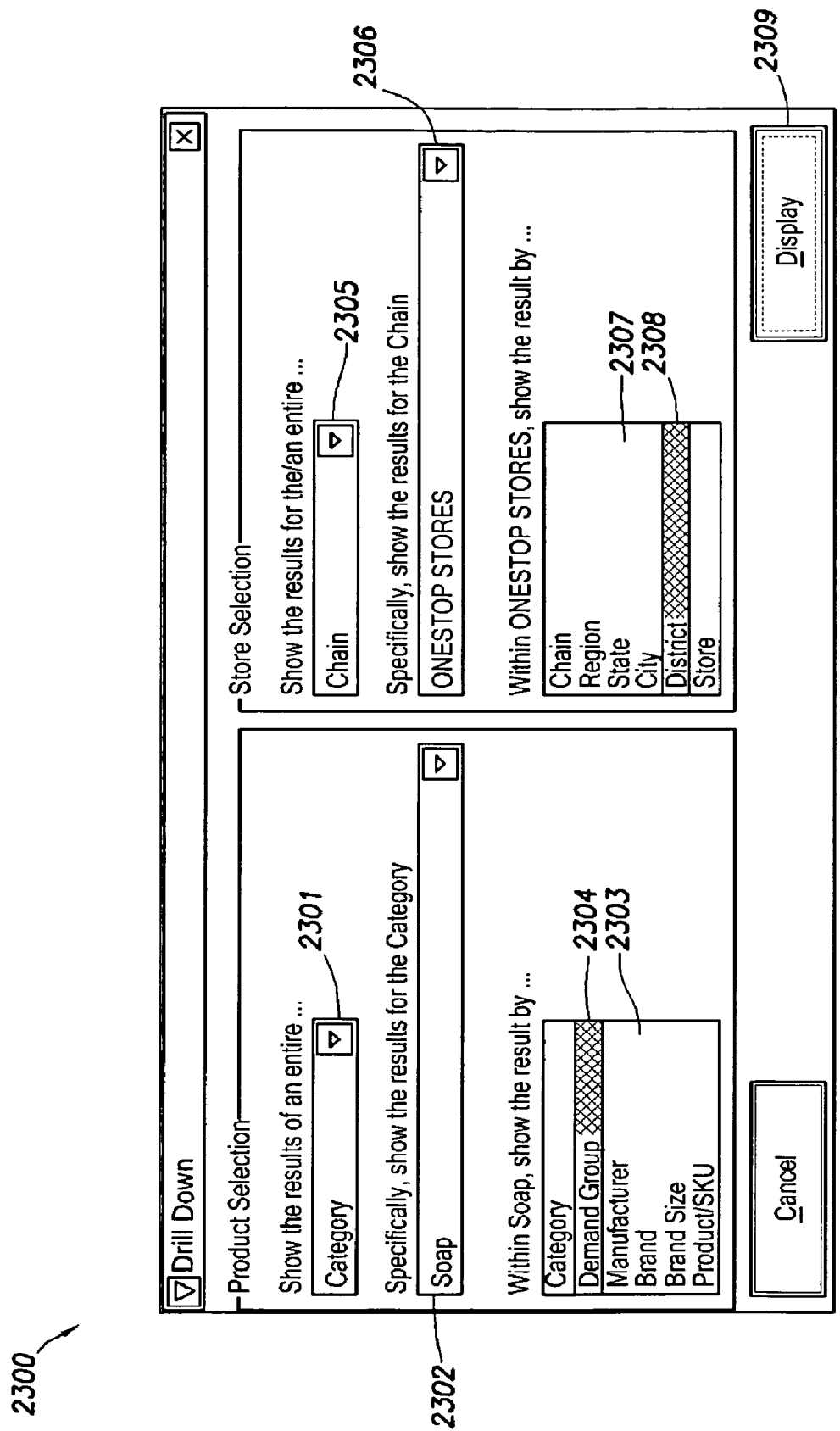
FIG. 23 is a diagram featuring a drill down configuration template for prescribing display options for scenario results.

By selecting the drill down button 2204, the user is taken to a results drill down configuration template 2300 shown in the diagram of FIG. 23. The results drill down configuration template 2300 allows the user to prescribe sub-items and groupings of sub-items for display within the analyze results window 2200 of FIG. 22. The drill down configuration template 2300 has a product selection field 2301, a specific product selection field 2302, a product show result by field 2303, a store selection field 2305, a specific store selection field 2306, and a store show result by field 2307. Via the product selection field 2301, the user can tailor a results display all the way from the product category level down to the individual product level. The options available for selection via the specific product selection field 2302 and the product show result by field 2303 change based upon the user's selection of field 2301. For example, if the user selects to show result data for an entire demand group, field 2302 allows the user specify which demand group and field 2303 provides options 2304 according to the user's selections in fields 2301 and 2302 by which result sub-items are grouped in the analyze results window of FIG. 22. Similarly, via the store selection field 2305, the user can tailor the results display all the way from the chain level down to the individual store level. The options available for selection via the specific store selection field 2306 and the store show result by field 2307 change based upon the user's selection of field 2305. For example, if the user selects to show result data for an entire chain, field 2306 allows the user specify which chain and field 2307 provides options 2308 according to the user's selections in fields 2305 and 2306 by which result sub-items are grouped in the analyze results window of FIG. 22. the configuration template 2300 also provides a display button 2309 that produces an analyze results window like that shown in FIG. 22 having result sub-items and groupings as defined by the user's selections in fields 2301-2303 and 2305-2307.

Figure 24:
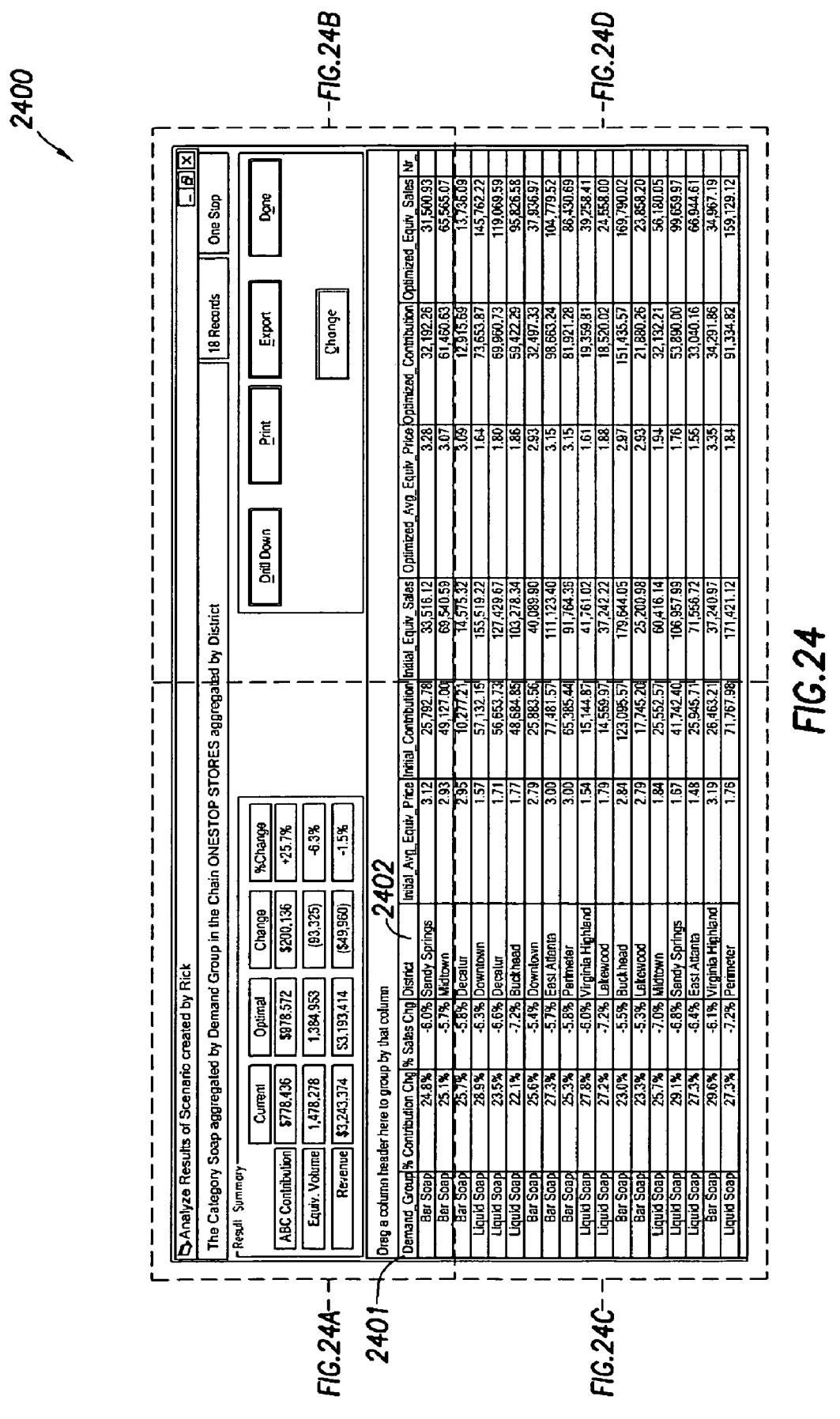

Referring to FIG. 24, a diagram is presented depicting an analyze scenario results template 2400 that corresponds to display options selected within the drill down configuration template of FIG. 23. The user has selected to display optimization results for an entire product category, broken down into demand group sub-items that are grouped by demand group and store districts. Demand group column header 2401 and district column header 2402 indicate that results sub-items are grouped by demand group and store districts.

Figure 25:
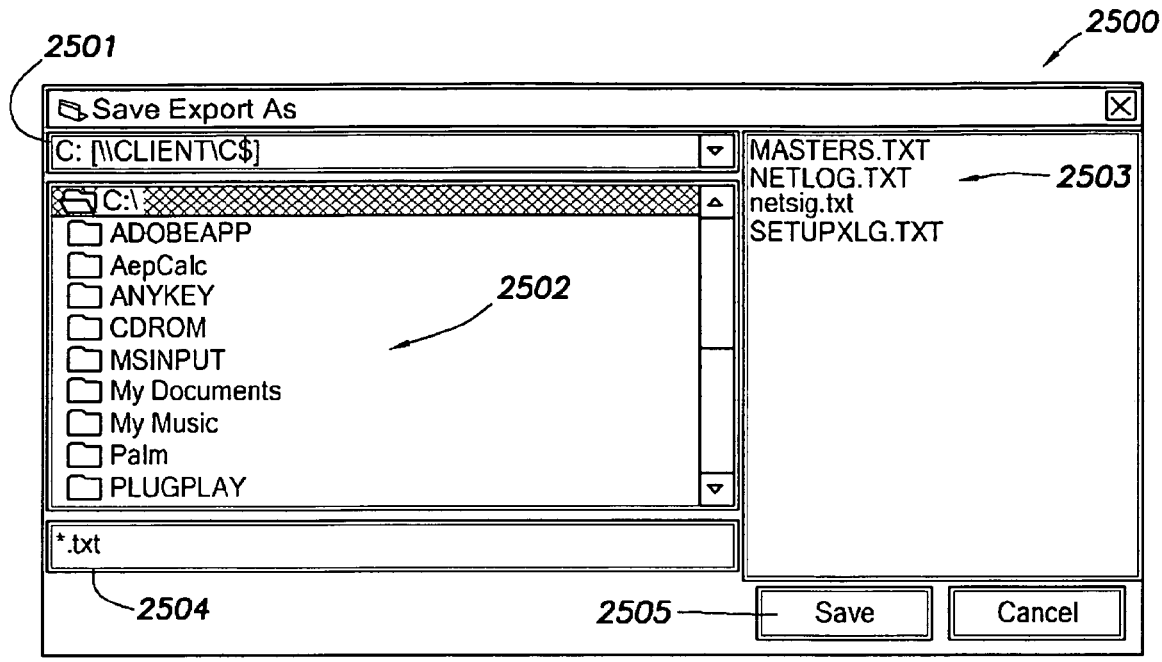
FIG. 25 is a diagram depicting a file location designation window according to an exemplary embodiment of the present invention.

FIG. 25 is a diagram depicting a file location designation window 2500 according to the exemplary embodiment. The file designation window 2500 is provided to the user's web browser when the user selects to export results to a file or when upload of data is required to configure an optimization.

The file designation window 2500 has a disk designation field 2501, a directory designation field 2502, a filename field 2504, and a file listings field 2503. The user designates a file for download/upload by selecting a disk, directory, and filename for the file to be downloaded/uploaded to/from the client machine via fields 2501, 2502, and 2504. Field 2503 allow the user to view active filenames within a selected directory. FIG. 25 displays a save button 2505 allowing the user to initiate a file export operation to store result data on the client machine. In an upload scenario, the save button 2505 is replaced by an open button (not shown) directing the exemplary embodiment to initiate the upload of data.

Figure 26:
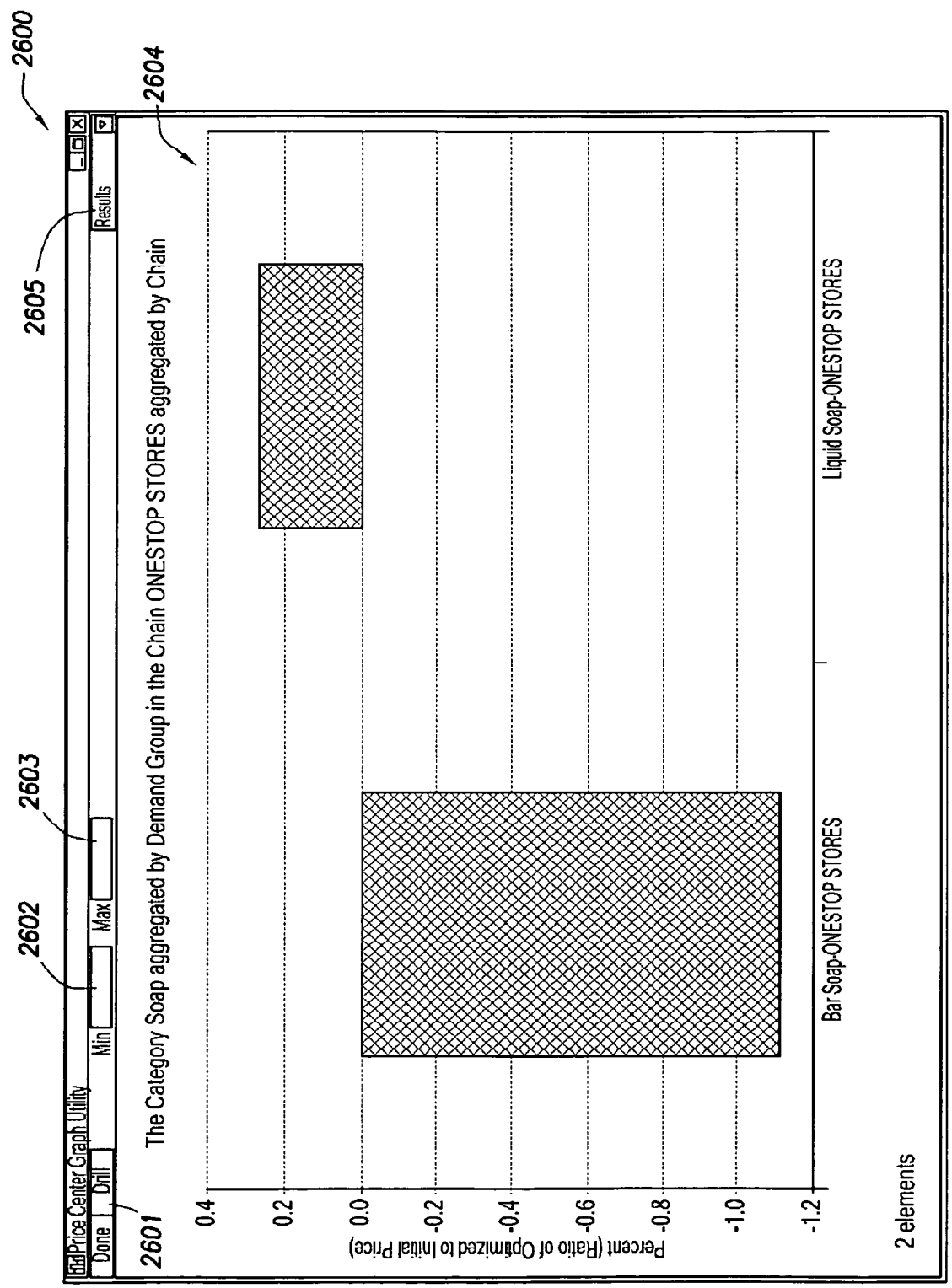
FIG. 26 is a diagram portraying a graph utility window for graphically presenting scenario results.

FIG. 26 is a diagram portraying a graph utility window 2600 for graphically presenting scenario result data. The graph utility window 2600 is provided to the user's web client via selection of the graph button 2004 within the results display options template 2000. The graph utility window 2600 has a results presentation area 2604, within which results of a selected optimization are displayed. The graph utility window also has drill button 2601, a min field 2602, a max field 2603, and a results selection chooser 2605. The drill button 2601 allows the user to configure sub-item options for presentation in the results presentation area 2604 like the options for list presentation described with reference to FIG. 23. The min and max fields 2602, 2603 allow the user to define boundaries for and ordinate axis displayed within the results presentation area. And the results selection chooser 2605 enables the user to specify graphical display of results within the presentation area 2604 according to either price or volume.

Figure 27:
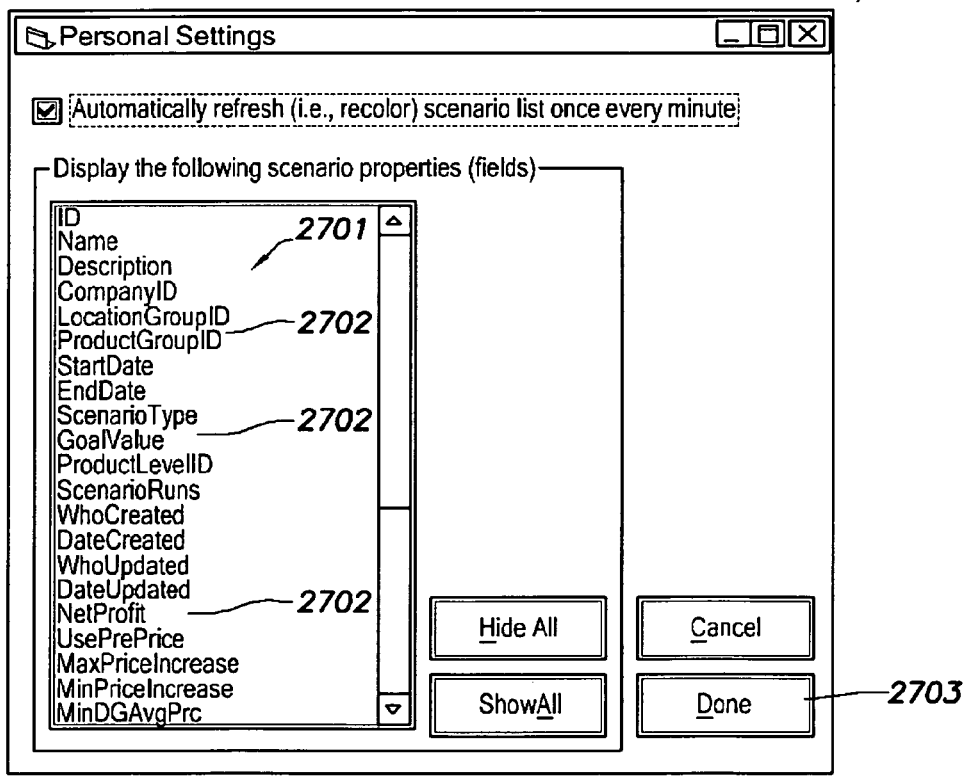
FIG. 27 is a diagram showing a personal settings template for configuring scenario properties for display within a currently defined scenarios window according to an exemplary embodiment of the present invention.

Now referring to FIG. 27, a diagram is presented showing a personal settings template 2700 for configuring scenario properties for display within a currently defined scenarios window according to an exemplary embodiment of the present invention. The personal settings template 2700 is provided to the user's thin client application when the user select the personal settings option 904 within the admin menu described with reference to FIG. 9. The personal settings window 2700 enables the user to personalize his/her presentation of the currently defined scenarios window within the exemplary embodiment. The personal settings window 2700 has a scenario properties field 2701, within which is displayed a number of scenario properties (i.e., descriptors) 2702 such as scenario ID, scenario name, description, company (i.e., client) ID, optimization start and end dates, scenario type, creator identification, and optimized net profit. The user may select multiple scenario properties 2702 within the personal settings window 2700 to provide only those descriptors 2702 of each scenario that the user requires. A done button 2703 enables the user to implement the personalized settings.

Figure 28:
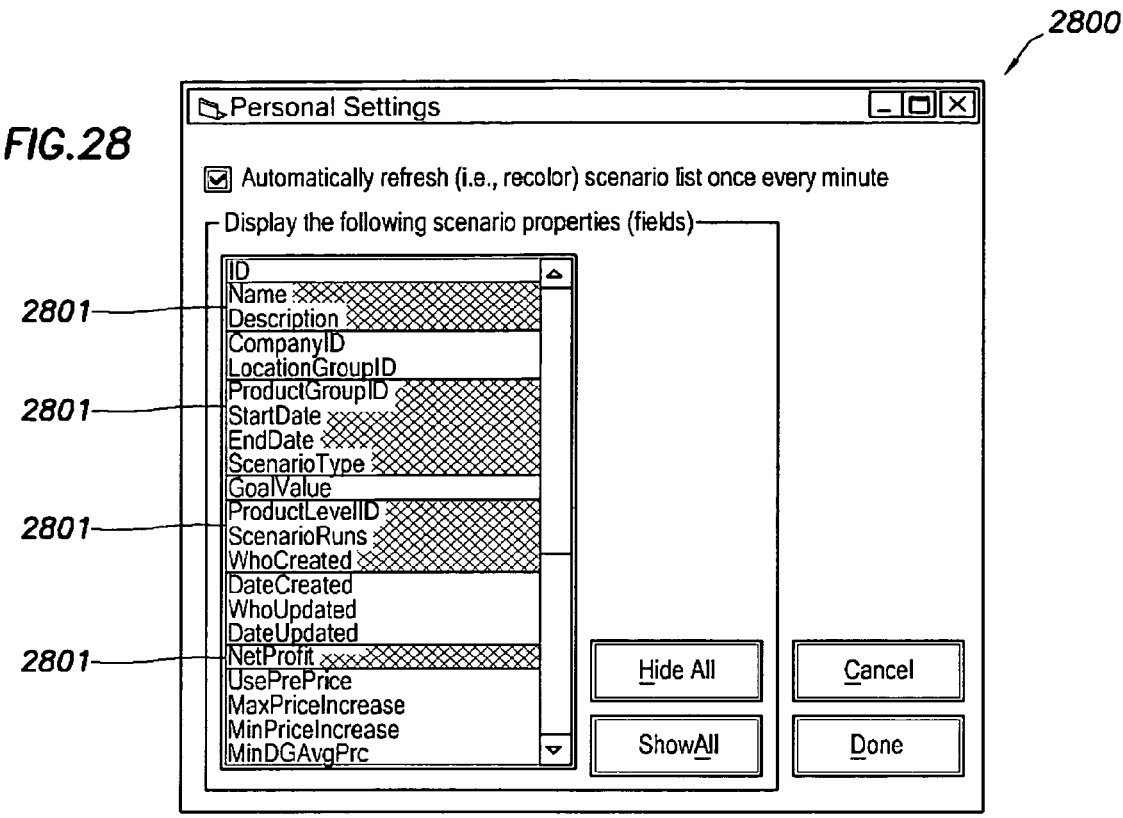
FIG. 28 is a diagram illustrating the personal settings template of FIG. 27 having a group of scenario properties selected for display within a currently defined scenarios window according to an exemplary embodiment of the present invention.

FIG. 28 is a diagram illustrating the personal settings template 2800 of FIG. 27 having a group of scenario properties 2801 selected for display within a currently defined scenarios window according to an exemplary embodiment of the present invention. The selected group of scenario properties 2801 is designated by highlighting. Selection is enabled via a standard pointing device such as a mouse.

FIG. 29 is a diagram featuring a currently defined scenarios window 2900 corresponding to the display properties 2801 selected in the personal settings template 2800 of FIG. 28. A plurality of column headers 2901 within the currently defined scenarios template 2900 are provide that comport with the scenario properties 2801 selected for display by the user. Each listed scenario within the window 2900 is identified by its data corresponding to the column headers 2901.

Figure 30:
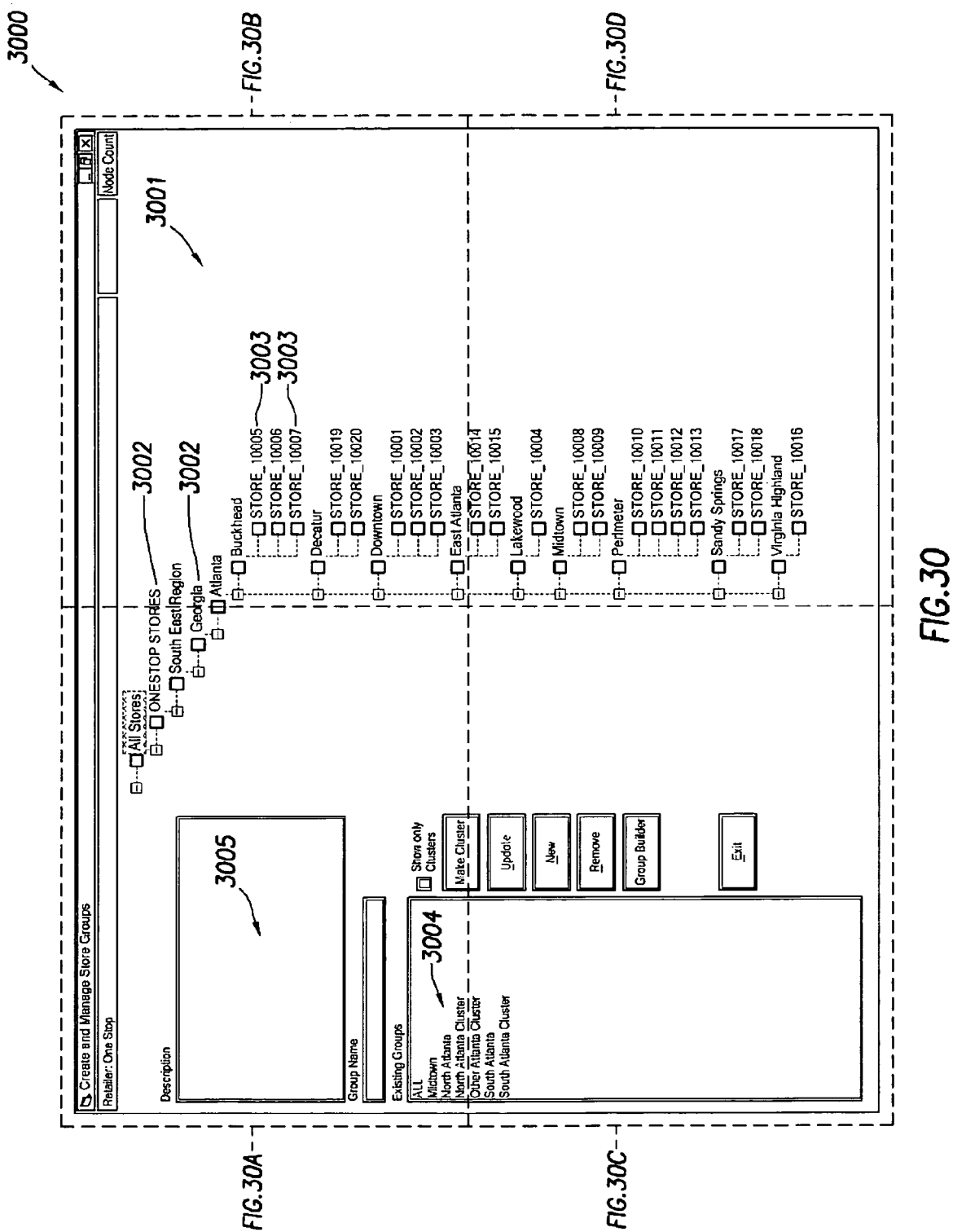
FIG. 30 is a diagram depicting a create and manage store groups template according to an exemplary embodiment of the present invention.
Figure 30A:
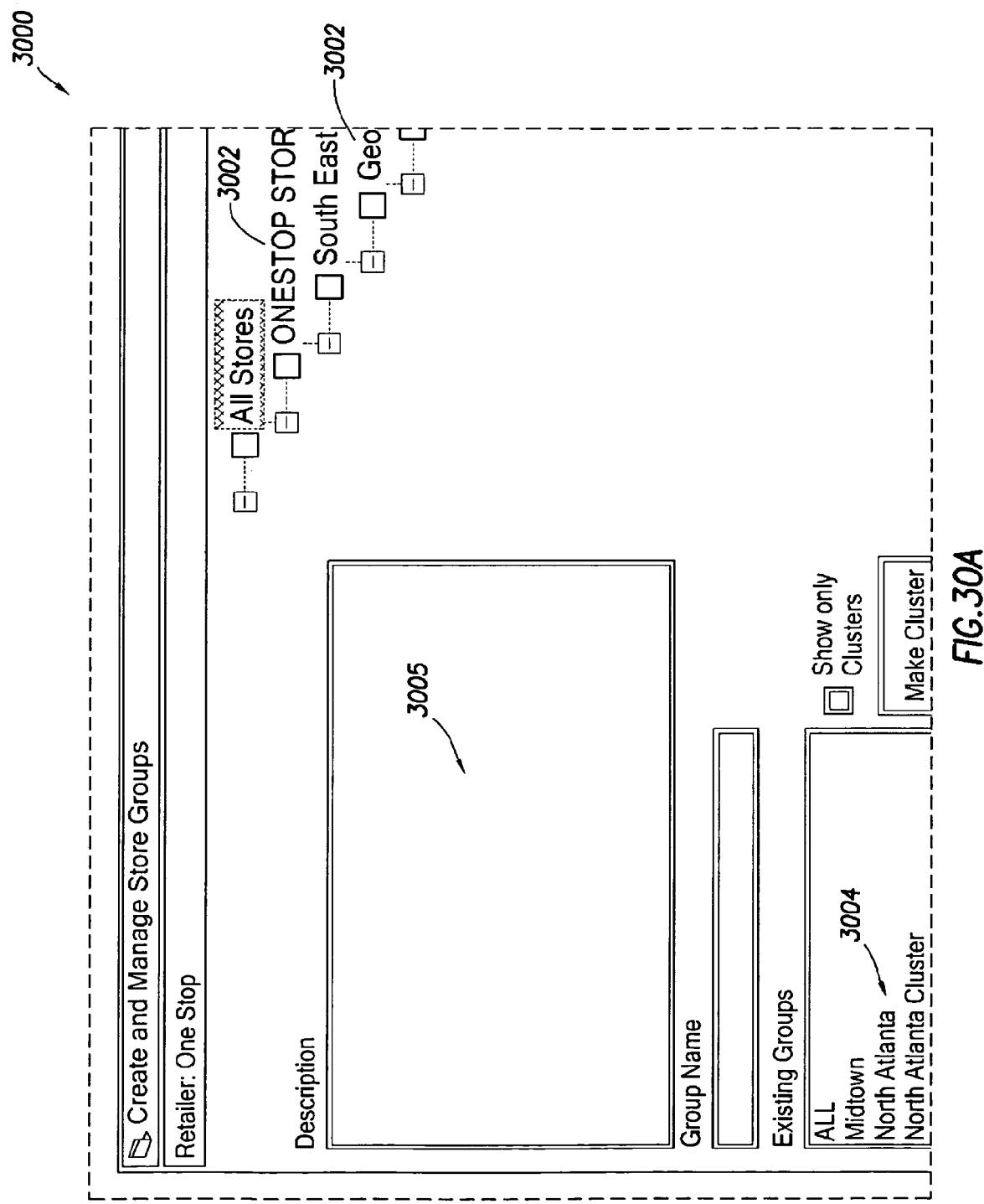
Figure 30B:
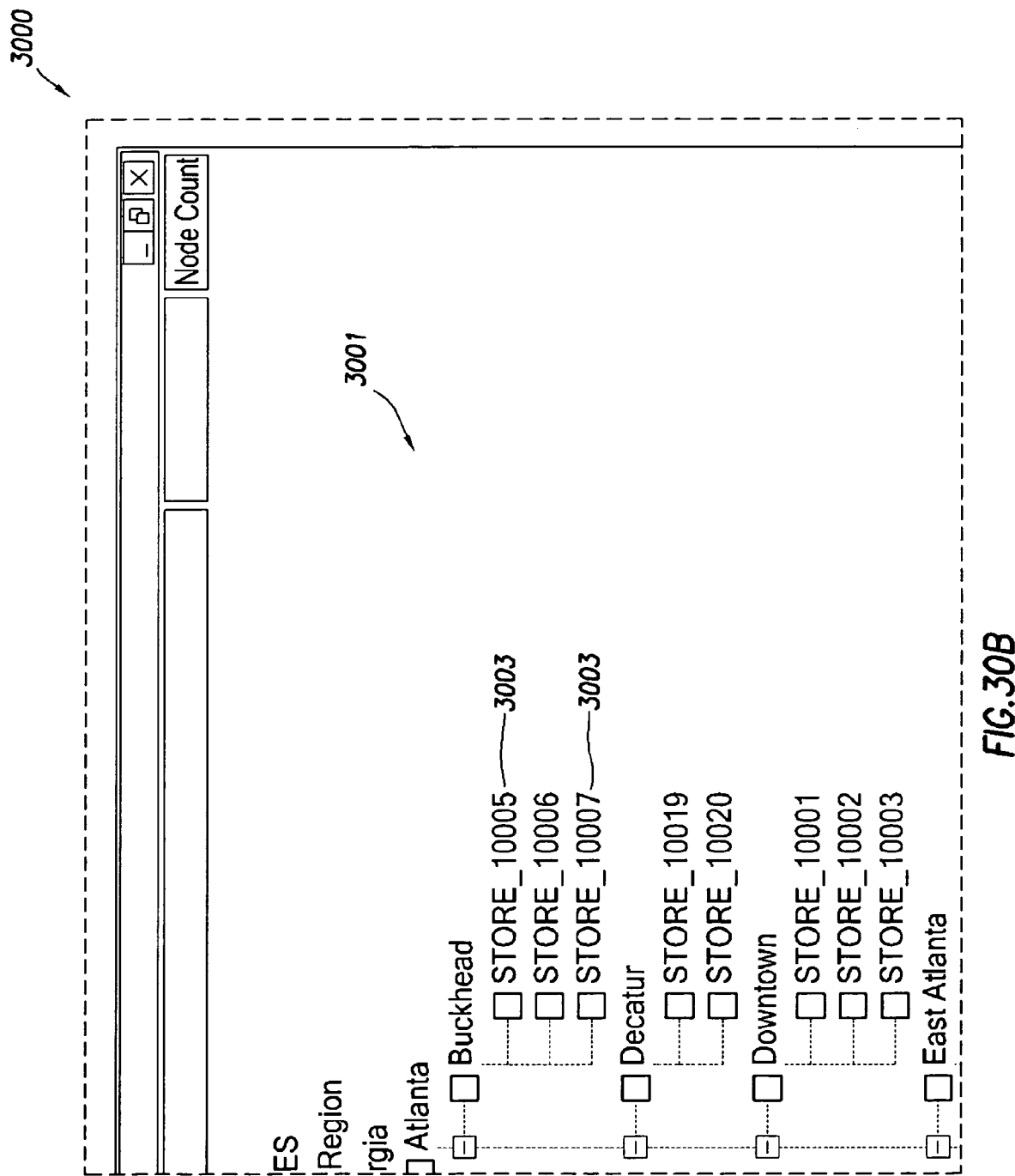
Figure 30D:
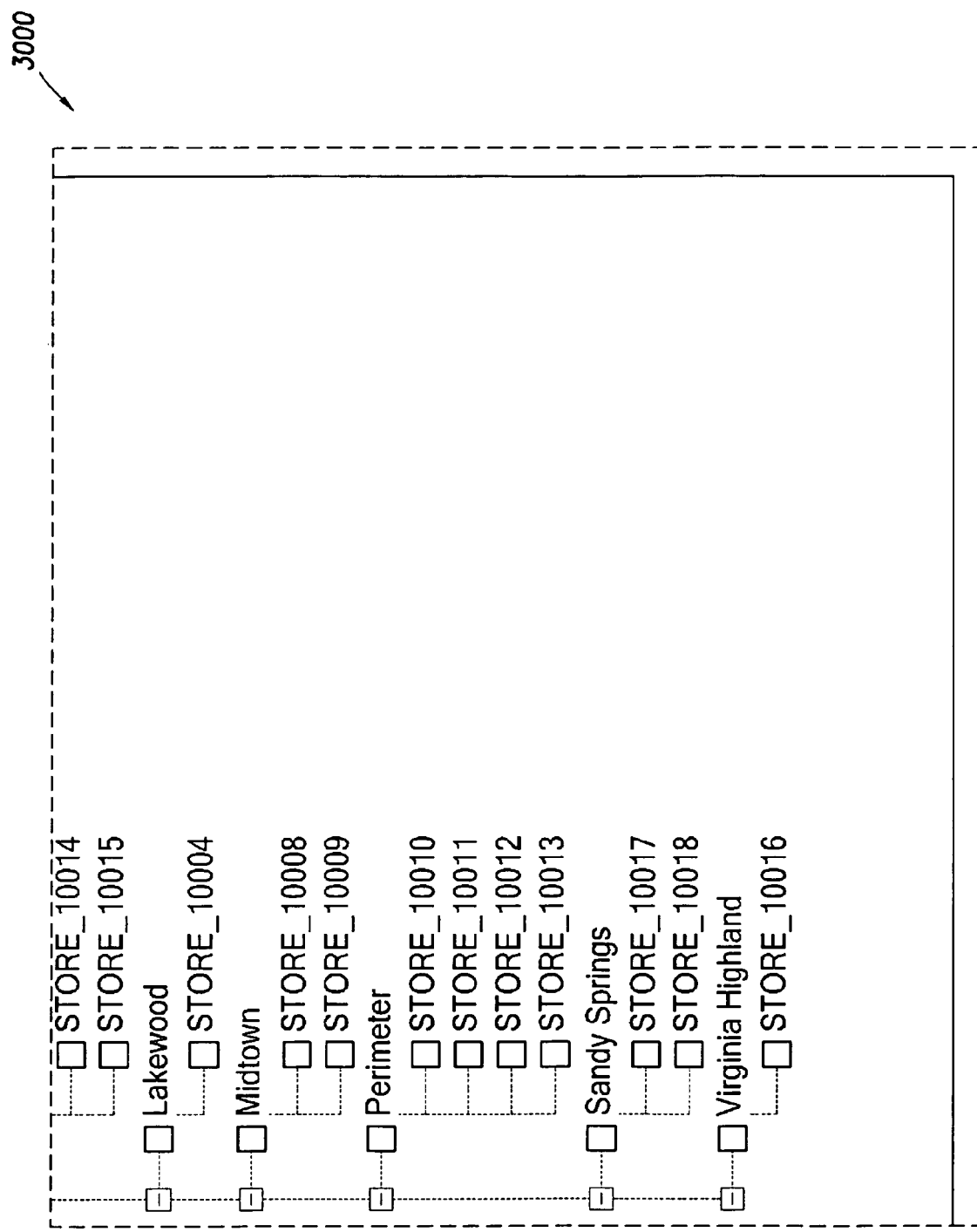

Now referring to FIG. 30, a diagram is presented depicting a create and manage store groups template 3000 according to the exemplary price optimization embodiment. The create and manage store groups template 3000 is provided to the user's web browser when the user selects the store groups option 804 within the groups/classes menu discussed with reference to FIG. 8 or when the user selects the create or edit store groups button 1208 within the new scenario location template 1200 discussed with reference to FIG. 12. The create and manage store groups template 3000 enables the user to create and/or manipulate groups of stores for the purposes of optimization. Two types of "groupings" are provided for by the template 3000: a group and a cluster. Both groupings are an aggregate of stores whose price history and sale data will be employed (if selected) within a price optimization. However, optimizations that prescribe store groups are allowed to determine different prices for the same product according to each different store within a store group. If the user prescribes a cluster of stores for an optimization, and if the user selects the enforce/apply cluster prices checkbox 1405 within the at-large rules template 1400 described with reference to FIG. 14, then optimized prices for each of the stores within the cluster are constrained to be the same for each product carried by the stores within the cluster.

Uploaded or interactively provided store organization data for each client are stored within a data base according to the present invention. The store groups template 3000 displays hierarchical store organization data 3002 within a store organization field 3001 and provides a list of stores 3003 at the lowest level of hierarchy. Example hierarchical attributes include chain, region, district, city, etc. The store groups template 3000 also has an existing groups field 3004 and a description field 3005. The existing groups field 3004 lists currently defined store groups and clusters and the description field 3005 provides descriptive information for a selected store group/cluster.

Figure 31A:
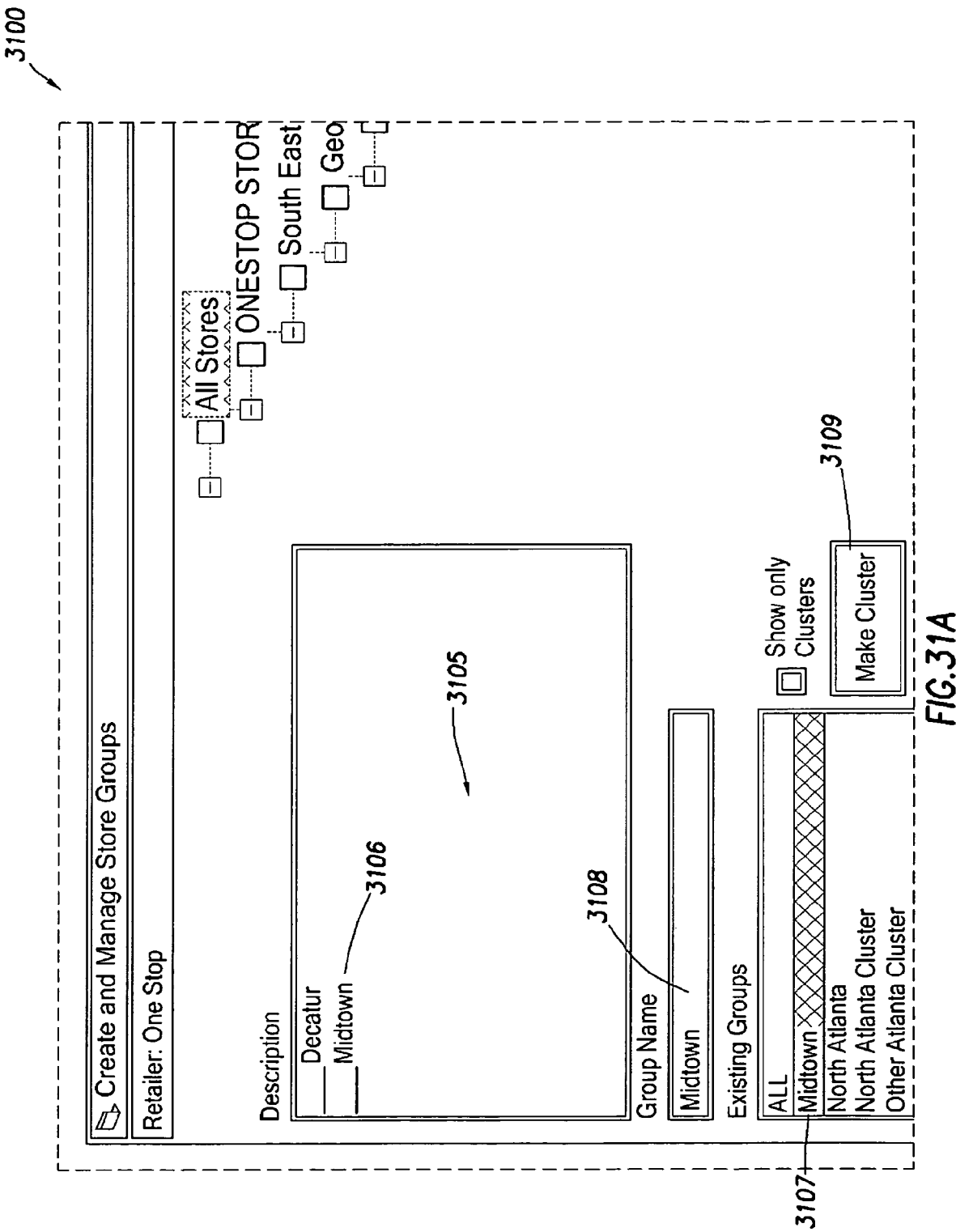
FIG. 31 is a diagram portraying the create and manage store groups template of FIG. 30 indicating those stores within a store group entitled "Midtown."
Figure 31B:
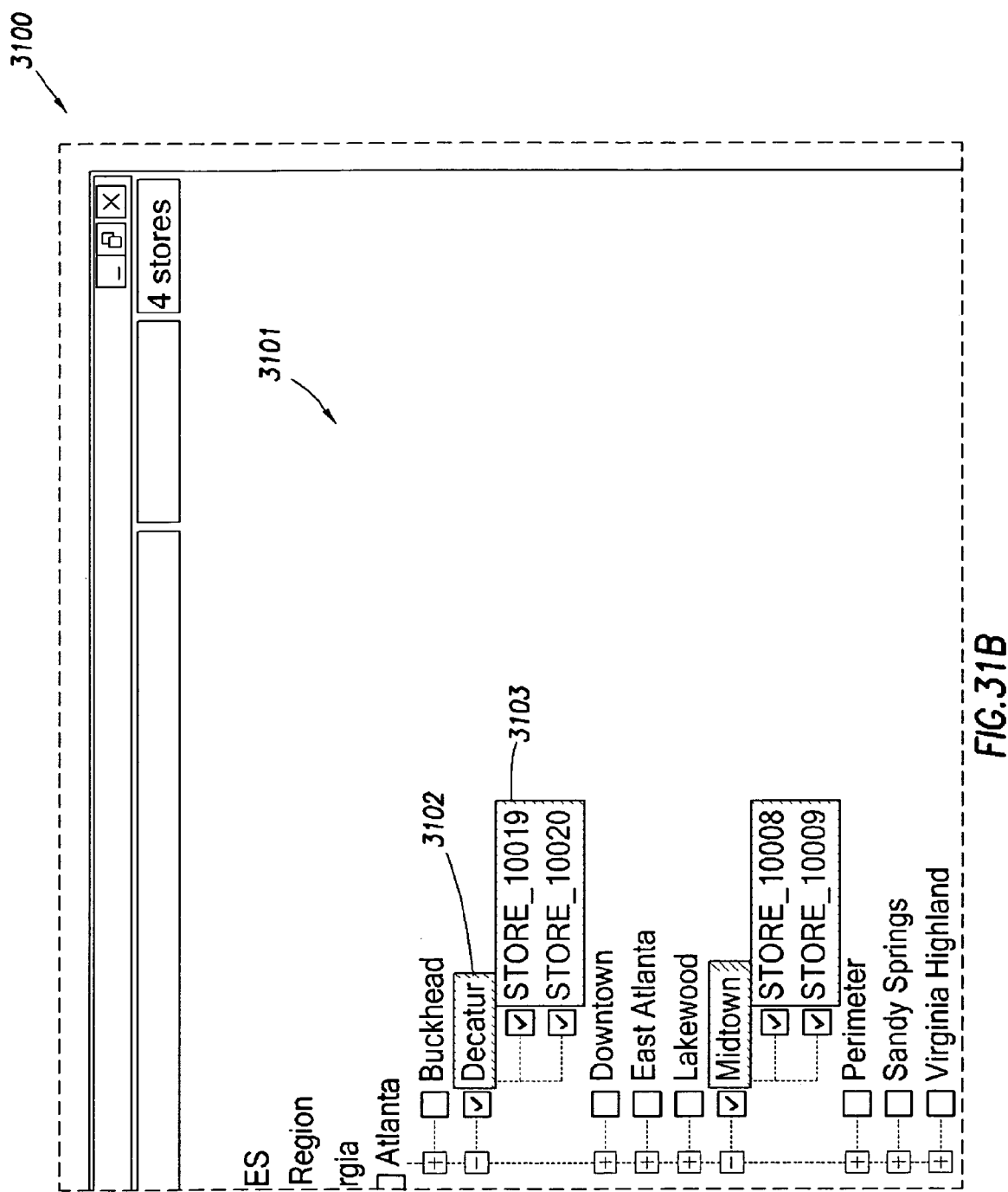

FIG. 31 is a diagram portraying the create and manage store groups template 3100 of FIG. 30 indicating those stores within a store group entitled "Midtown." The store organization field 3101 highlights all of the stores 3103 of the midtown group 3107 within their existing hierarchy fields 3102, which are highlighted as well. Checkboxes in the organization field 3101 enable the user to select/deselect stores 3103 or hierarchy fields 3102 to add a new group/cluster. Descriptive data 3106 is shown within the description field 3105 for a selected store group 3107 within the store group field 3104. A make a cluster button 3109 allows the user to create a cluster from the selected store group 3107. A new button 3110 allow the user to create a new store group whose name is entered within a group name field 3108. A remove button 3111 is provided to enable the user to delete a selected store group/cluster 3107. And a group builder button 3112 enables the user to utilize a Boolean logic tool for configuring more complex store groupings. The user exits the create and manage store groups window 3100 by selecting an exit button 3113.

Figure 32:
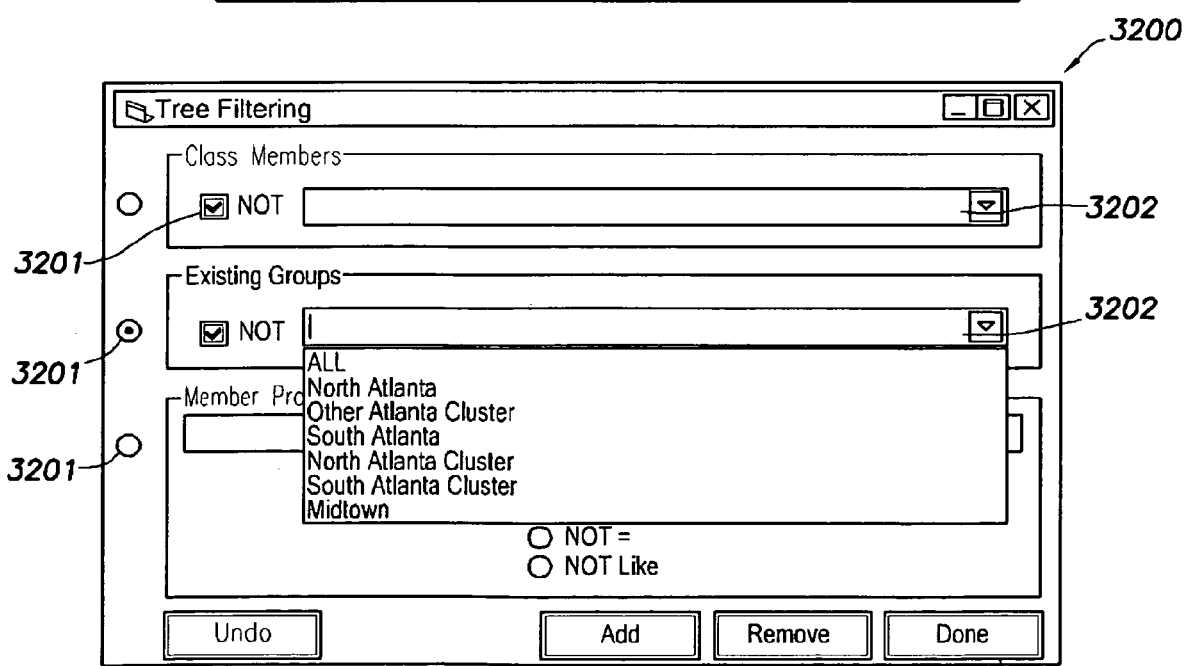
FIG. 32 is a diagram showing a tree filtering window for building a store group according to the exemplary embodiment.

FIG. 32 is a diagram showing a tree filtering window 3200 for building a store group according to the exemplary embodiment. The tree filtering window 3200 is provided in response to the user's selection of the group builder button 3112 within the create and manage store groups template 3100 of FIG. 31. The tree filtering, or group builder, window 3200 provides the user with a plurality of selection buttons/Boolean controls 3201 along with a plurality of choosers 3202 to enable the configuration of store groups having a complex relationship. The group builder tool 3200 is useful for client data sets that comprise thousands of stores where it is difficult to prescribe grouping relationships simply by selection. A done button 3203 enables the user to exit the tree filtering template 3200 and to return to the create and manage store groups template 3100.

Figure 33:
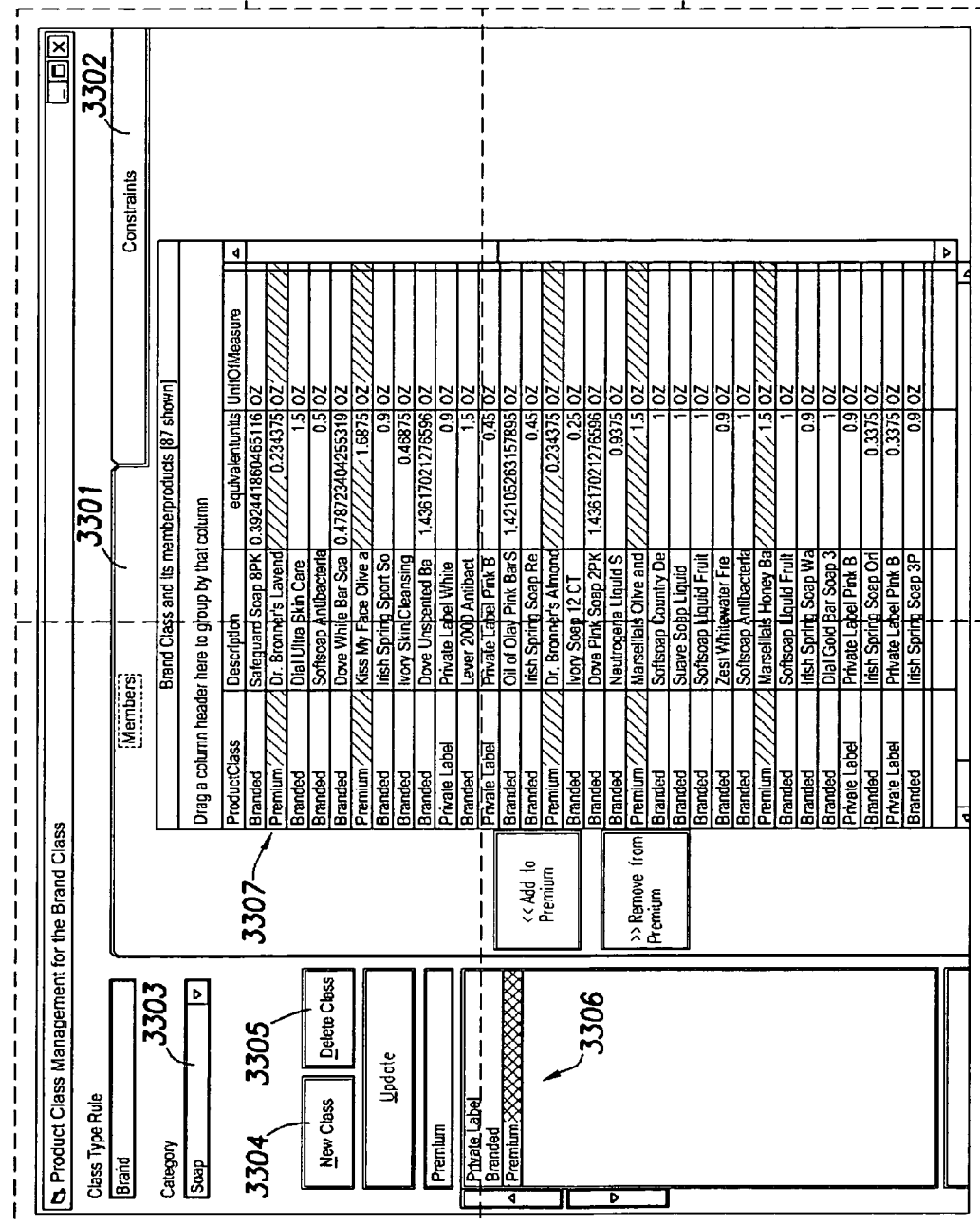
FIG. 33 is a diagram illustrating a product class management window according to the exemplary embodiment highlighting products within a premium product class.
Figure 33A:
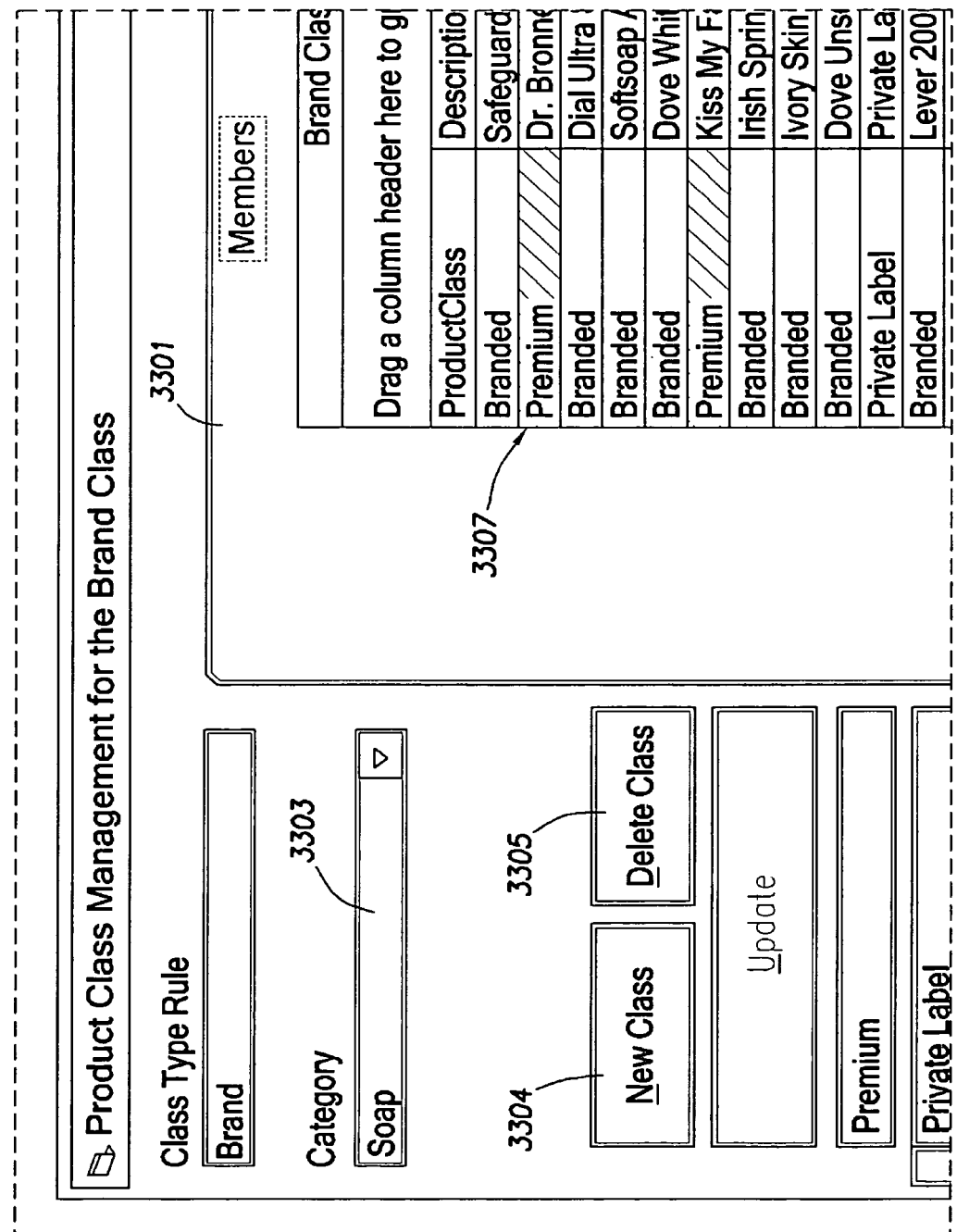
Figure 33C:
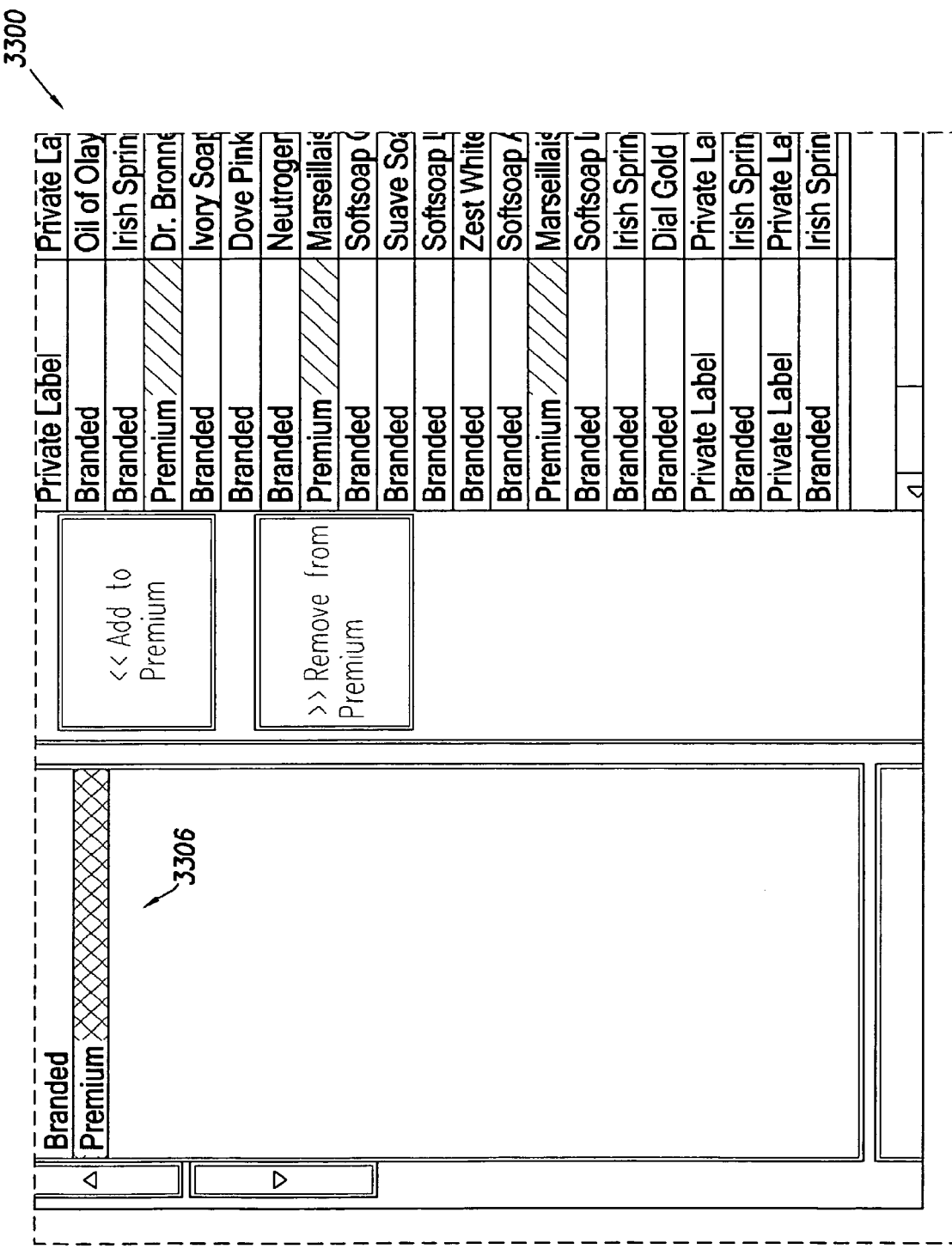

Now referring to FIG. 33, a diagram is presented illustrating a product class management window 3300 for brand class according to the exemplary embodiment highlighting products within a premium product class. The product class management window 3300 is accessed via a user's selection of the brand class management option 806 within the groups/classes menu discussed with reference to FIG. 8. The product class management window 3300 exemplifies how the user establishes and categories groupings of products within user-defined classes of products for the purposes of imposing product-level rules and constraints and for the purposes of viewing detailed optimization results. Product classes are analogous to store groups. The product class management window 3300 provides a members tab 3301 depicting highlighted members of a particular product class within a member products display field 3307. The template 3300 also provides a constraints tab 3302 allowing the user to prescribe additional member constraints for product class groups. The template 3300 provides a category chooser 3303 for the user to select a product category for display within display field 3307. Existing brand product classes are displayed within field 3306. A new class button 3304 enables the user to specify a new brand product class and a delete class button allows the deletion of a highlighted brand product class within field 3306.

Figure 34D:
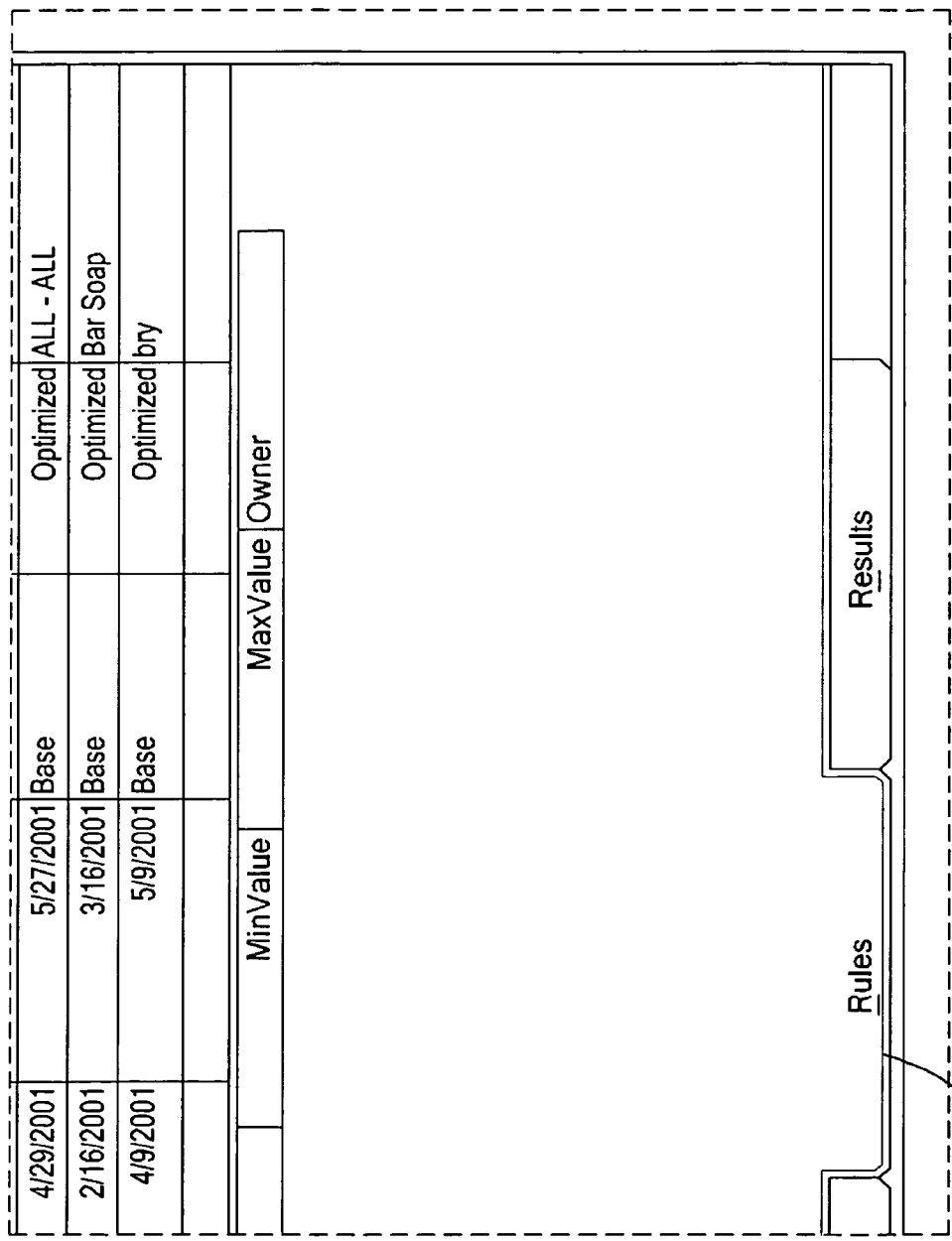
FIG. 34 is a diagram featuring a rules summary window for an optimization scenario that is highlighted within a currently defined scenarios window.

Now referring to FIG. 34, a diagram is presented featuring a rules summary window 3400 for an optimization scenario that is highlighted within a currently defined scenarios window. Selection of a rules table 3401 enables the user to prescribe additional rules and constraints for configured scenarios that employ product classes described with reference to FIG. 33.

Figure 35A:
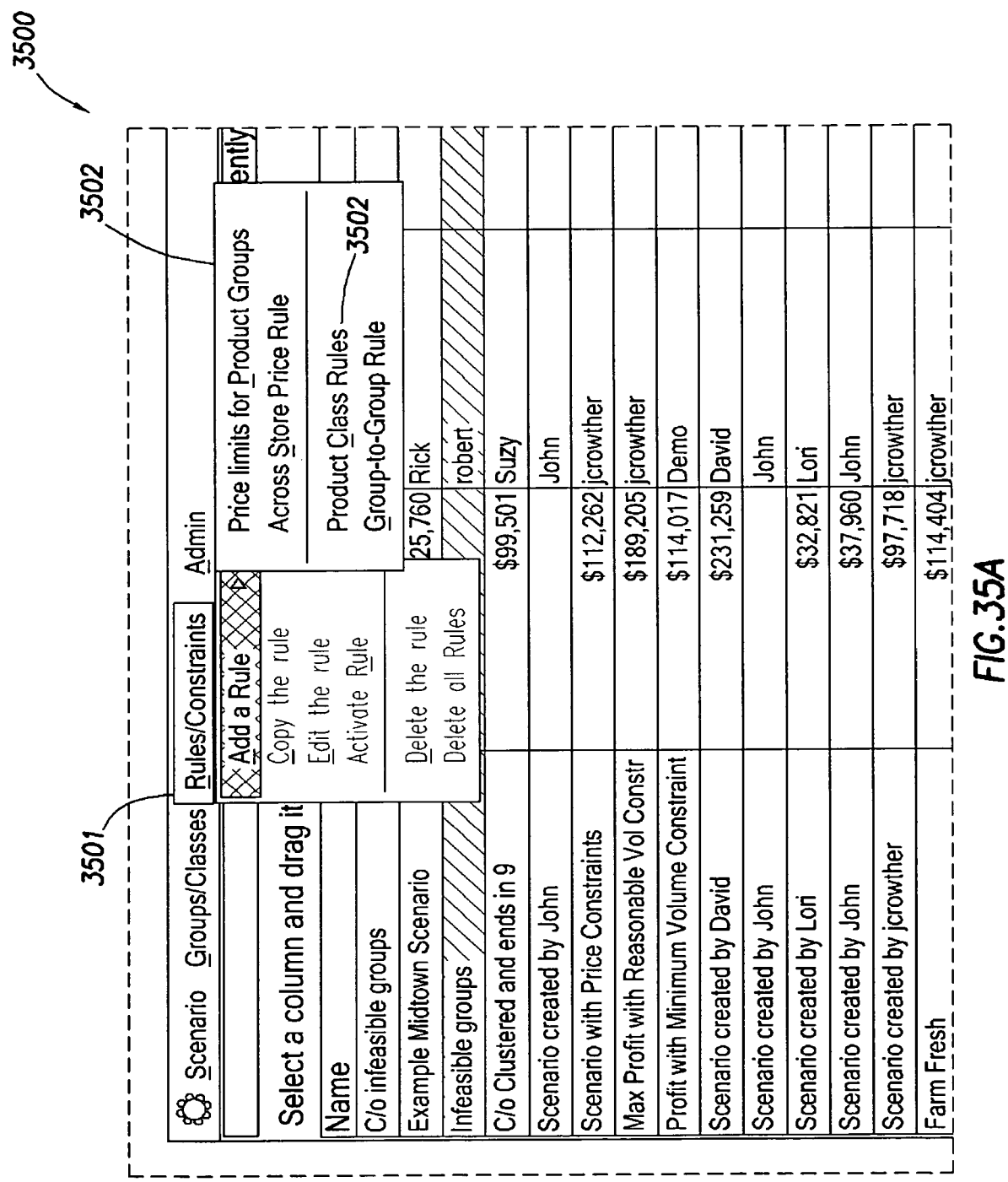
FIG. 35 is a diagram depicting contents of a rules/constraints menu within the currently defined scenarios window of FIG. 34.
Figure 35D:
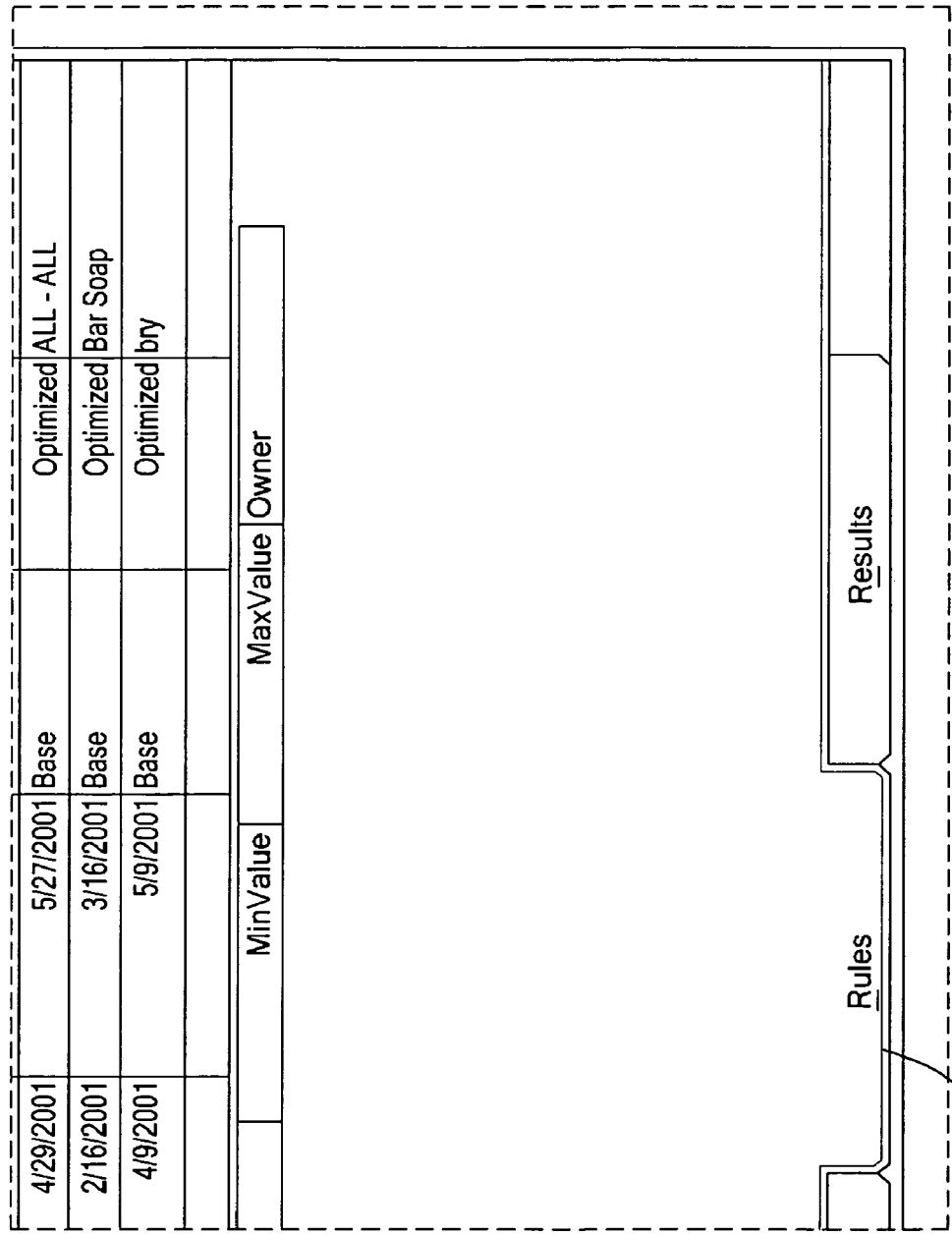

Selecting the rules tab 3401 also enables the rules/constraints menu 3501 shown in the diagram of FIG. 35. The rules/constraints menu 3501 provides a plurality of options 3502 that enable the user to prescribe optimization rules and constraints according to product classes as well as across store rules and group-to-group rules. Such rules, being at levels much lower that those specified according to the at-large rules template 1400 of FIG. 14, are more readily prescribed by selecting a configured scenario and then enabling the rules/constraints menu 3501.

Figure 36:
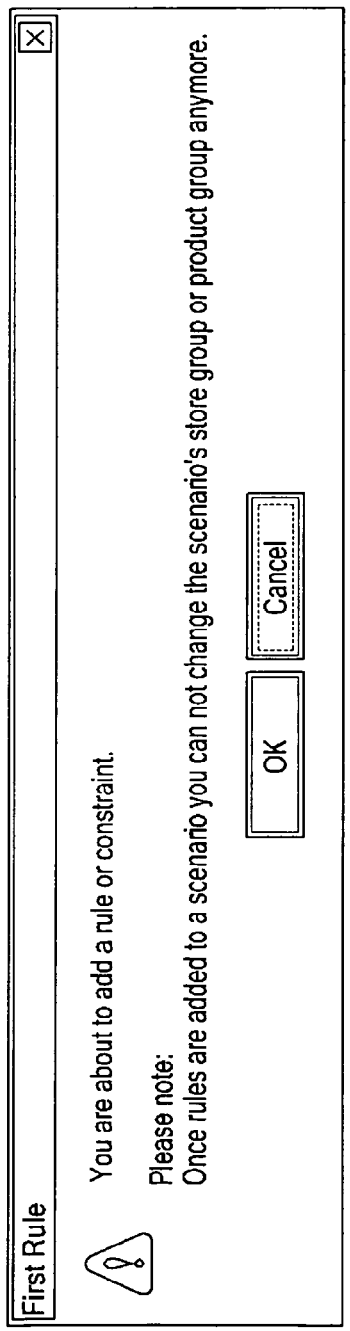
FIG. 36 is a diagram portraying a first rule warning window according to the exemplary embodiment.

When the user first adds a rule or constraint to a configured scenario, a first rule warning window 3600 according to the exemplary embodiment is displayed as shown in the diagram of FIG. 36. The warning window 3600 instructs the user that once the rule/constraint is added, then the user is henceforth prohibited from further modifying store and/or product groups because rules and constraints specified by the selection of options 3502 within the rules/constraints menu 3501 are based upon the existing organization of stores and products. Any subsequent changes to the existing organization will invalidate previously specified rules for a selected scenario, thus changes to the existing organization is henceforth prohibited following configuration of the first rule/constraint.

Figure 37:
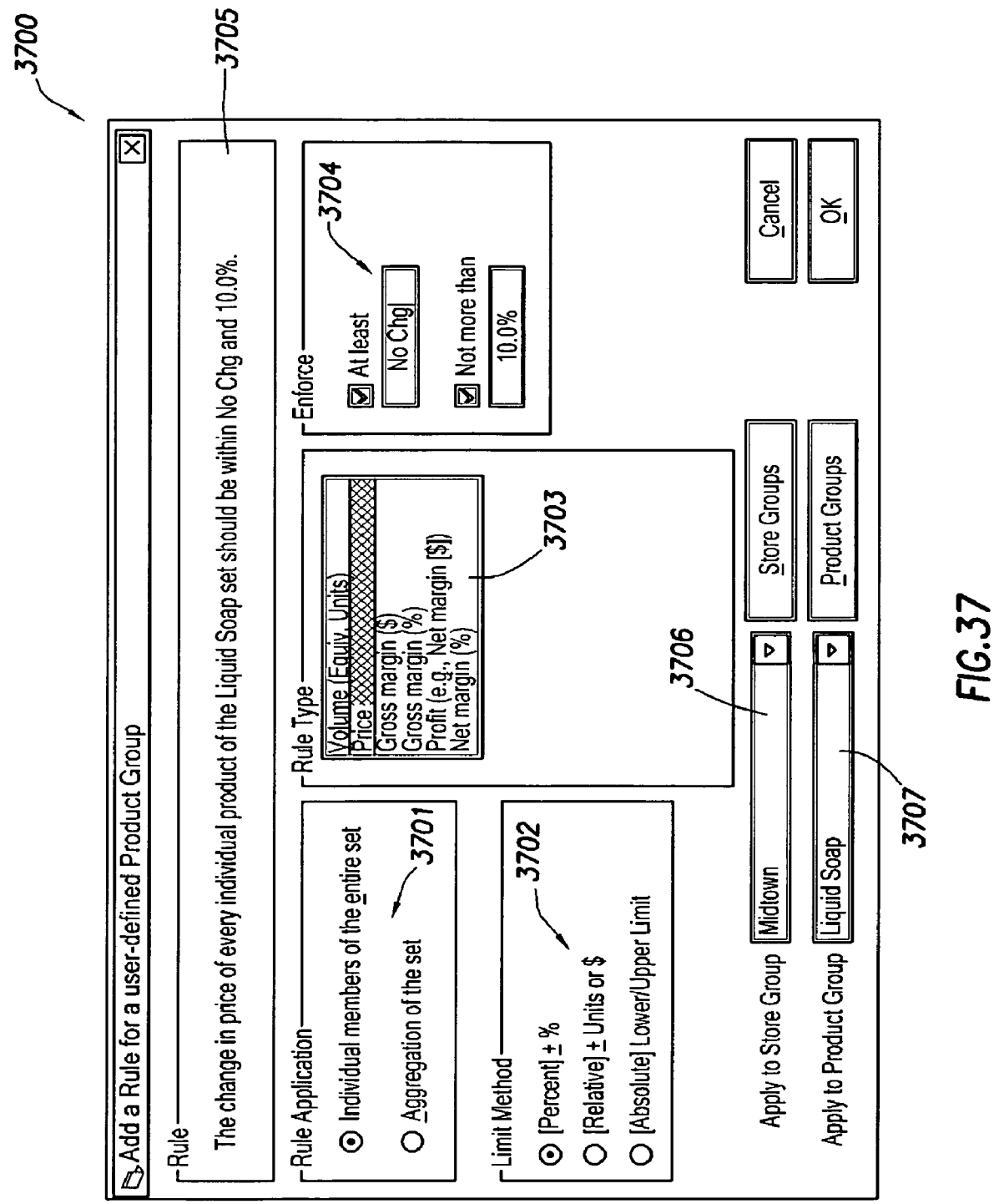
FIG. 37 is a diagram showing an add a rule for product group template according to the exemplary embodiment.

Now referring to FIG. 37, a diagram is presented showing an add a rule for product group template 3700 according to the exemplary embodiment. The add a rule for product group template 3700 exemplifies features provided by the present invention that allow a user to constrain a price optimization at levels below those covered by the at-large rules template 1400 described with reference to FIG. 14. The add a rule template 3700 has a rule application area 3707, a limit method area 3702, a rule type area 3703, an enforce rule area 3704, a rule description area 3705, an applicable store group chooser 3706, and an applicable product group chooser 3707. The rule application area 3701 allows the user to apply the added rule either to individual members of an entire set or to an aggregation of the set, where the "set" is defined by store and product group selections in choosers 3707 and 3707. The limit method area 3702 provides the user with options to prescribed the added rule in terms of a percentage, relative limits, or absolute limits. The rule type area 3703 enables the user to select from a plurality of rule types that include volume, price, gross margin, profit, net margin, etc. The enforce rule area 3704 allow the user to prescribe limits for the rule which are interpreted according to user selections within the limit method area 3702. The rule description area 3705 provides a description of a configured rule in narrative form.

Figure 38:
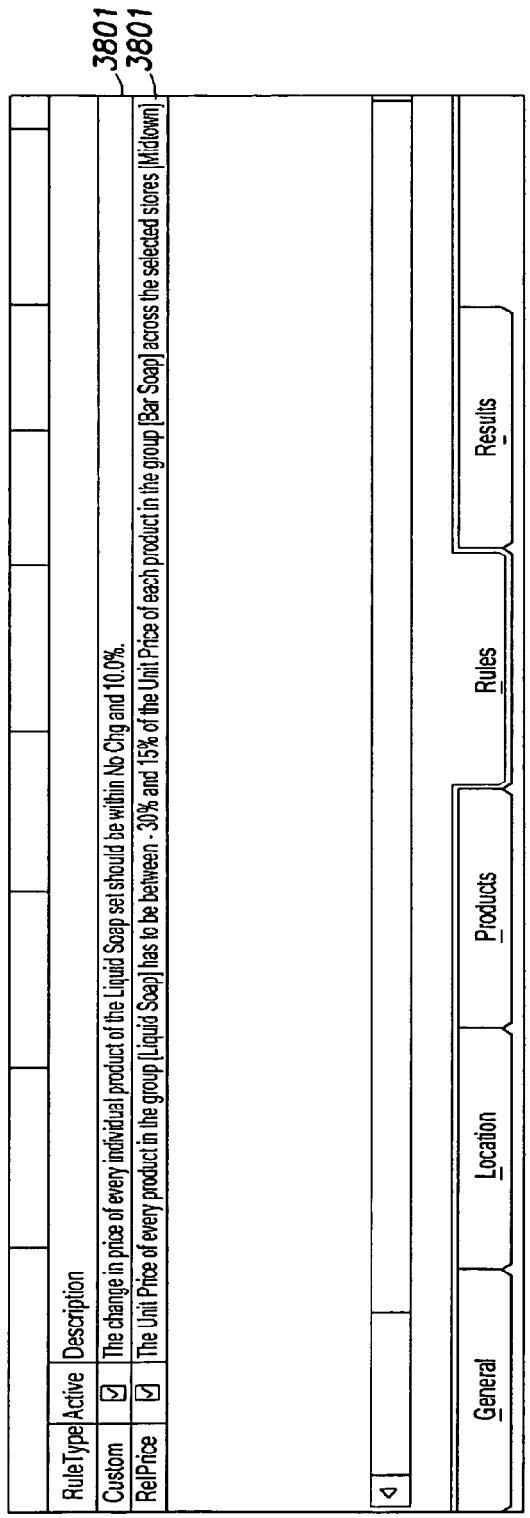
FIG. 38 is a diagram portraying added rules within a rules summary window according to the exemplary embodiment.

Once additional rules/constraints have been configured for a selected scenario within a currently defined scenarios window, the rules summary window 3800 will display a narrative description of all applied rules 3801, as depicted by FIG. 38. Within the rules summary window 3800, the user can activate/deactivate selected rules prior to optimization of the selected scenario.

Figure 39:
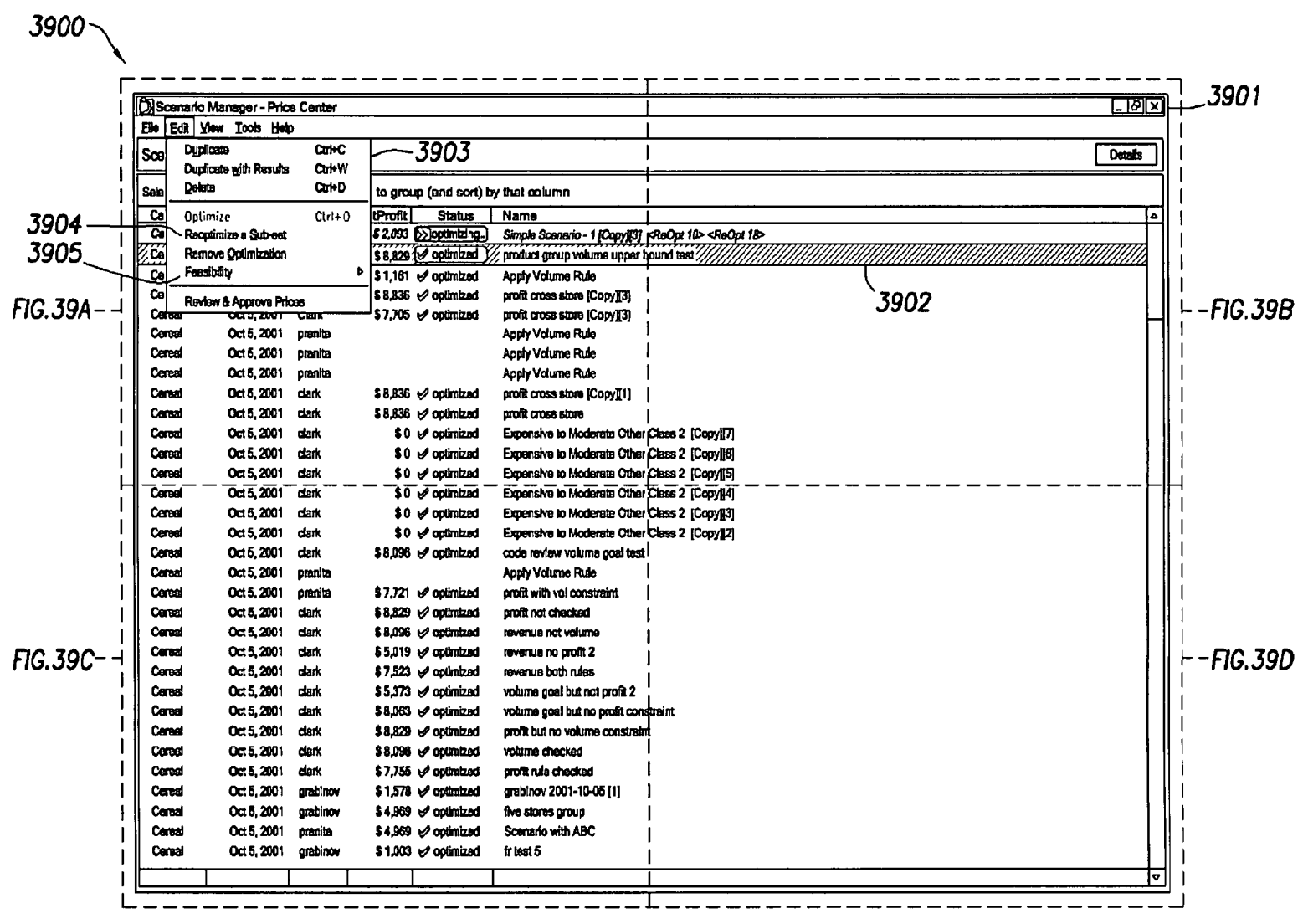
Figure 39B:
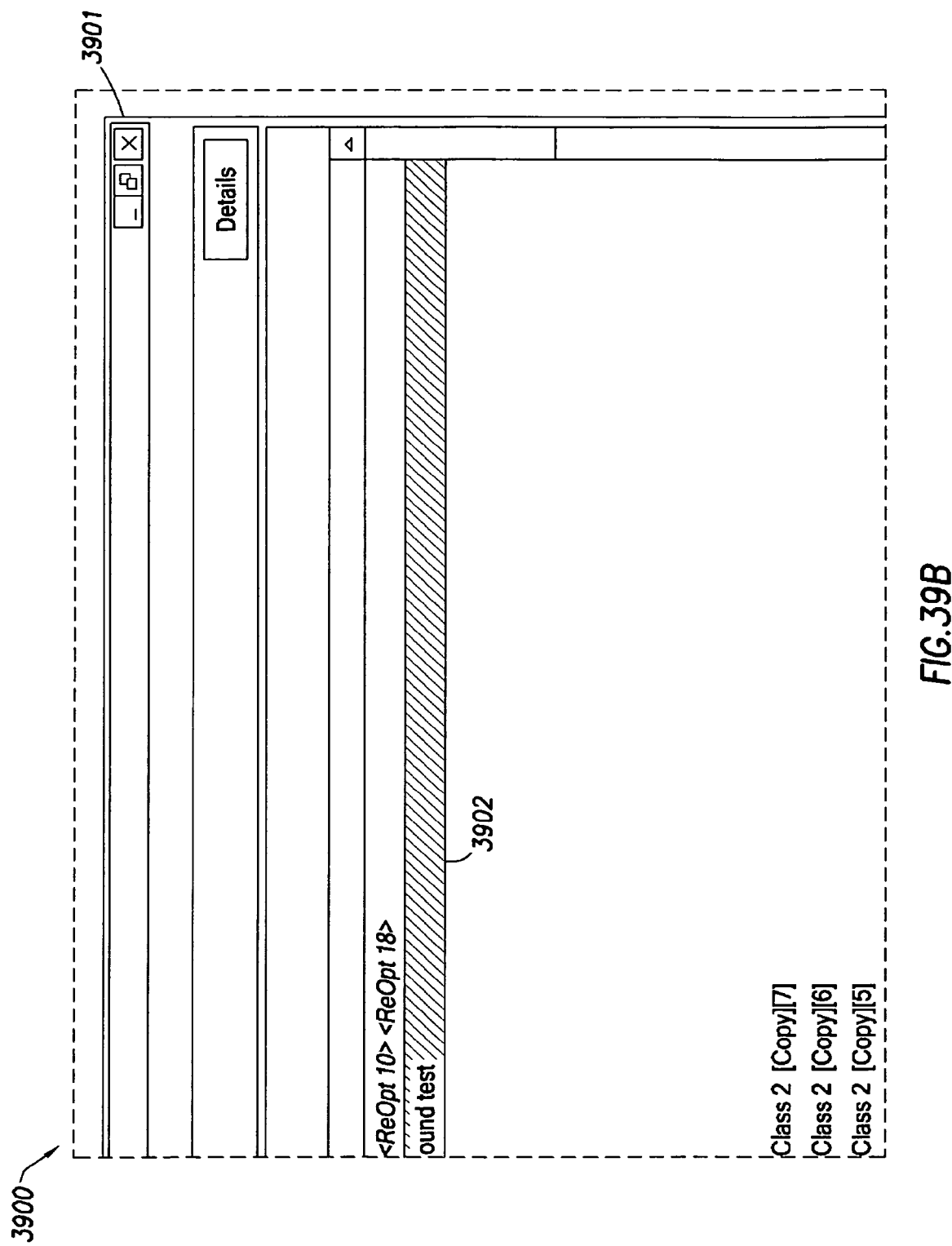
FIG. 39 is a diagram illustrating selection options within a currently defined scenarios template that allow a user to re-optimize a product subset and to perform an optimization feasibility analysis.
Figure 39D:
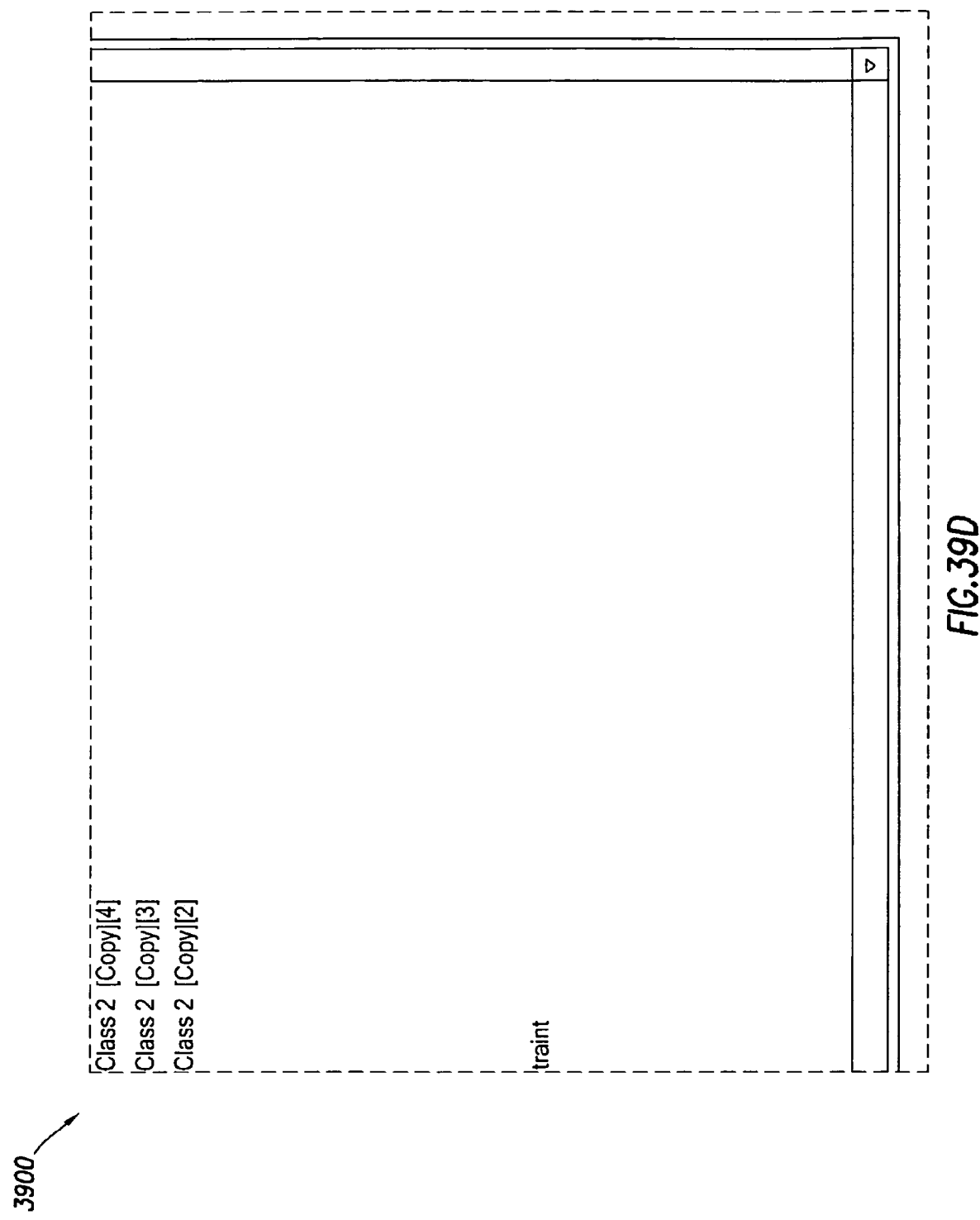

Now turning to FIG. 39, a diagram 3900 is presented illustrating selection options within a currently defined scenarios template 3901 that allow a user to re-optimize a product subset and to perform an optimization feasibility analysis. The currently defined scenarios template 3901 depicts a number of scenarios 3902, one which has been highlighted. The template 3901 also shows, within an edit window 3903, a re-optimize a subset option 3904 along with a feasibility option 3905. The re-optimize a subset option 3904 is selected by the user following the incorporation of new and/or changed product data into the customer data base. The purpose of subset re-optimization is to allow an optimization of the highlighted scenario 3902 to incorporate the effects of the new and/or changed product data, yet at the same time providing a constraint on the number of attribute changes (i.e., product prices, locations, etc.) that will result from the re-optimization. In a price optimization embodiment, re-optimization constrains the number of price tag changes that must be made. The feasibility option 3905 is selected by the operator to invoke a feasibility analysis of the highlighted scenario 3902 prior to performing an optimization.

Figure 40:
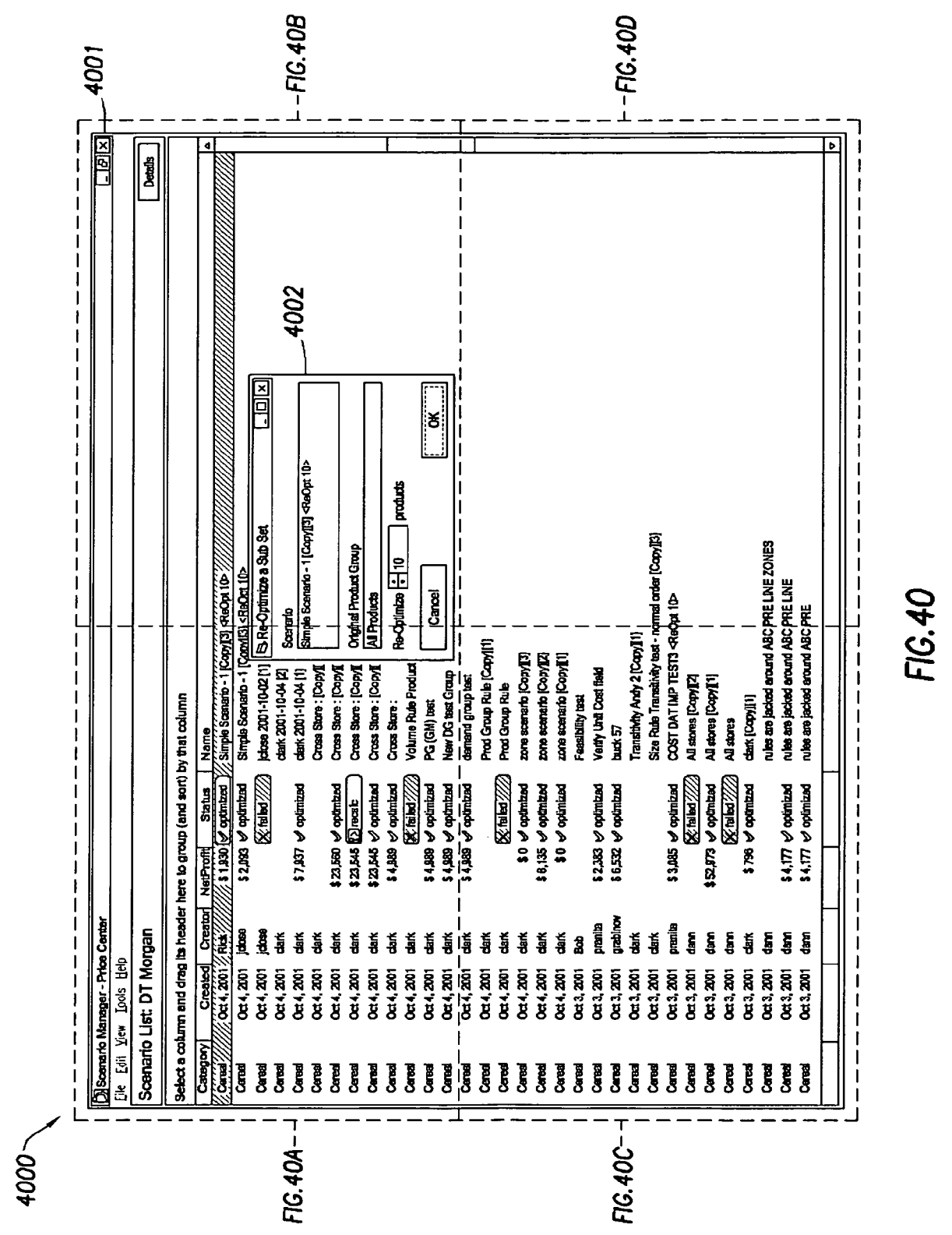
Figure 40B:
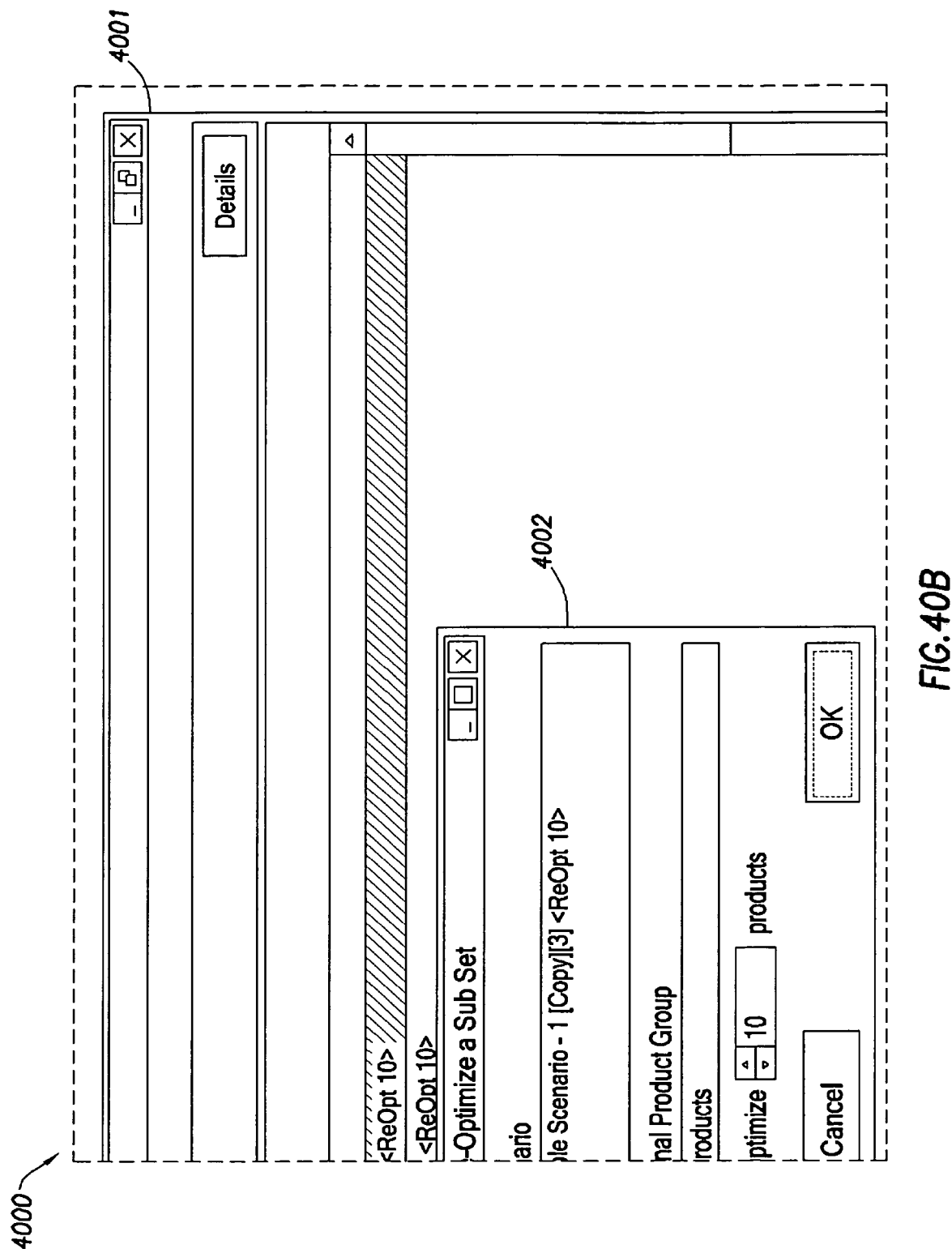
FIG. 40 is a diagram depicting a re-optimize a subset template within a currently defined scenarios window according to the exemplary embodiment.
Figure 40D:
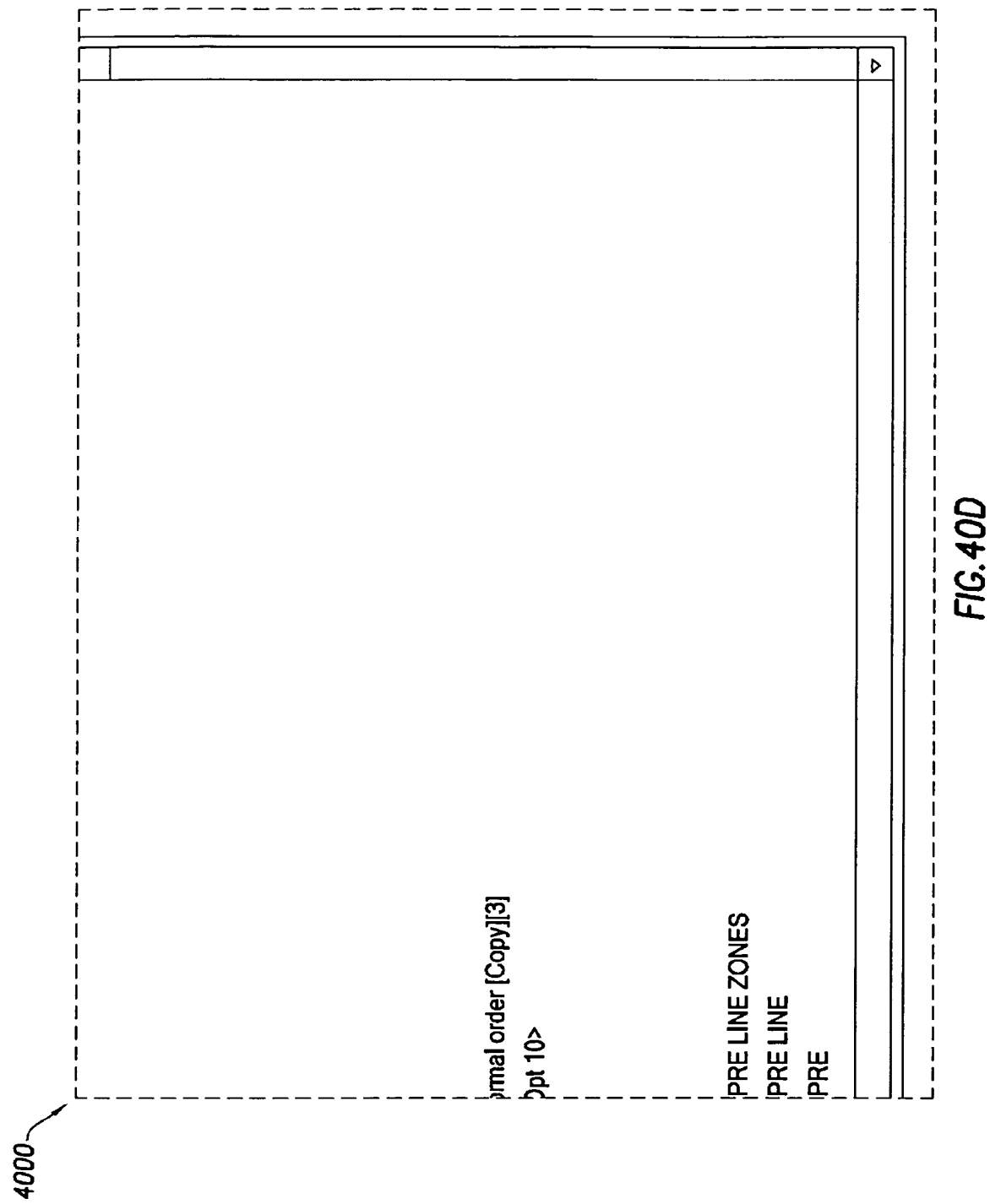

If the user selects the re-optimize option 3904 of FIG. 39, he/she is then presented with a re-optimize a subset template 4002 as is shown in the diagram 4000 of FIG. 40. The diagram 4000 depicts the re-optimize a subset template 4002 within a currently defined scenarios window 4001. The re-optimize a subset template 4002 is provided to allow the user to prescribe attribute change constraints for a re-optimization to be performed.

Turning to FIG. 41, a detailed diagram of a re-optimize a subset template 4100 according to the exemplary embodiment is presented. The re-optimize template 4100 identifies the applicable scenario for re-optimization within an applicable scenario field 4101 and the product group of the original optimization within an original product group field 4102. A maximum changes field 4103 displays a default maximum number of attribute changes that will be allowed in an ensuing re-optimization. The user may change the default value of this field 4103, thus increasing or decreasing the number of attribute changes that will be allowed in the re-optimization.

Figure 42:
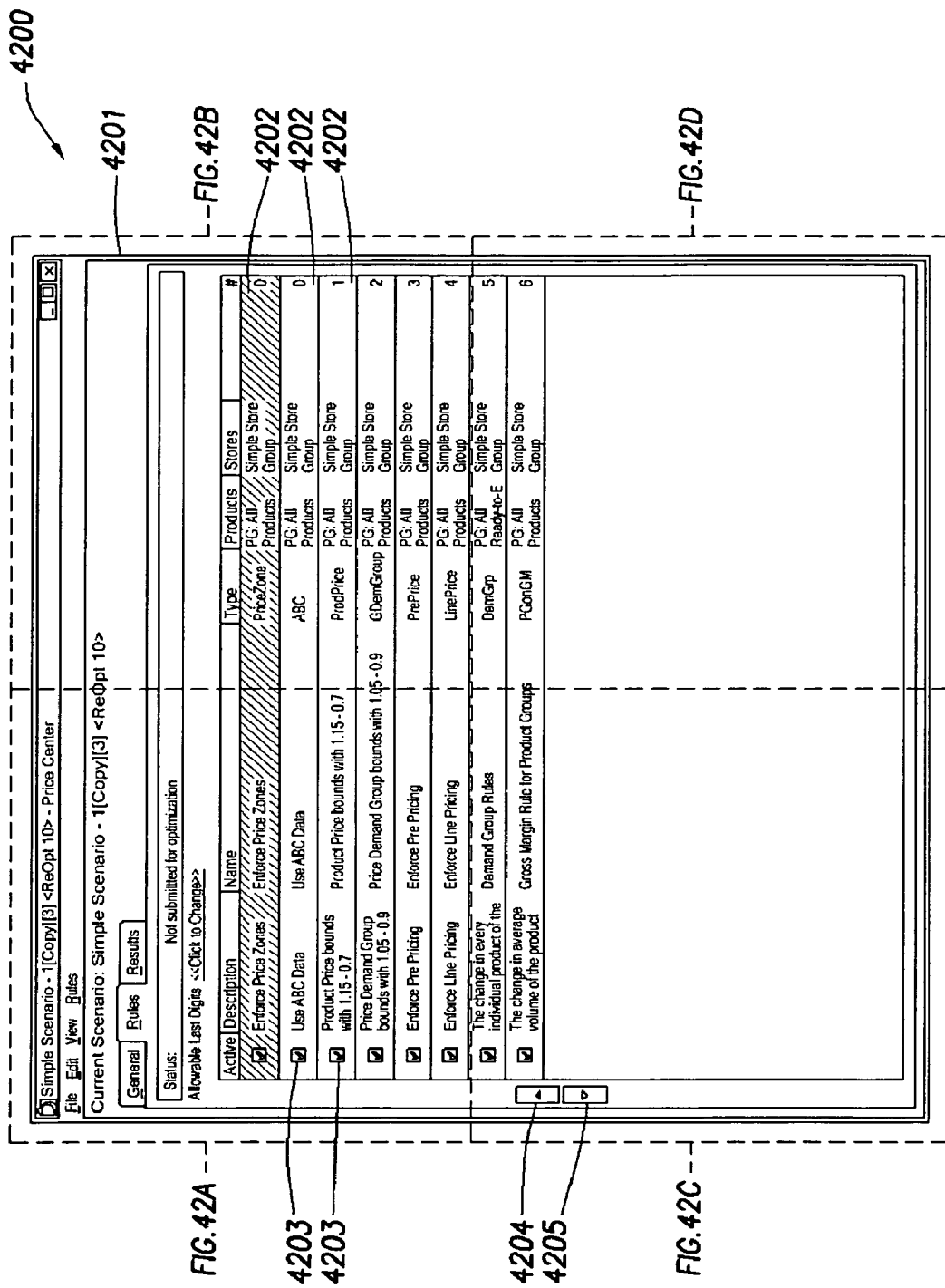
FIG. 42 is a diagram showing a rules summary template that features controls for prioritizing optimization rules according to the exemplary embodiment.
Figure 42A:
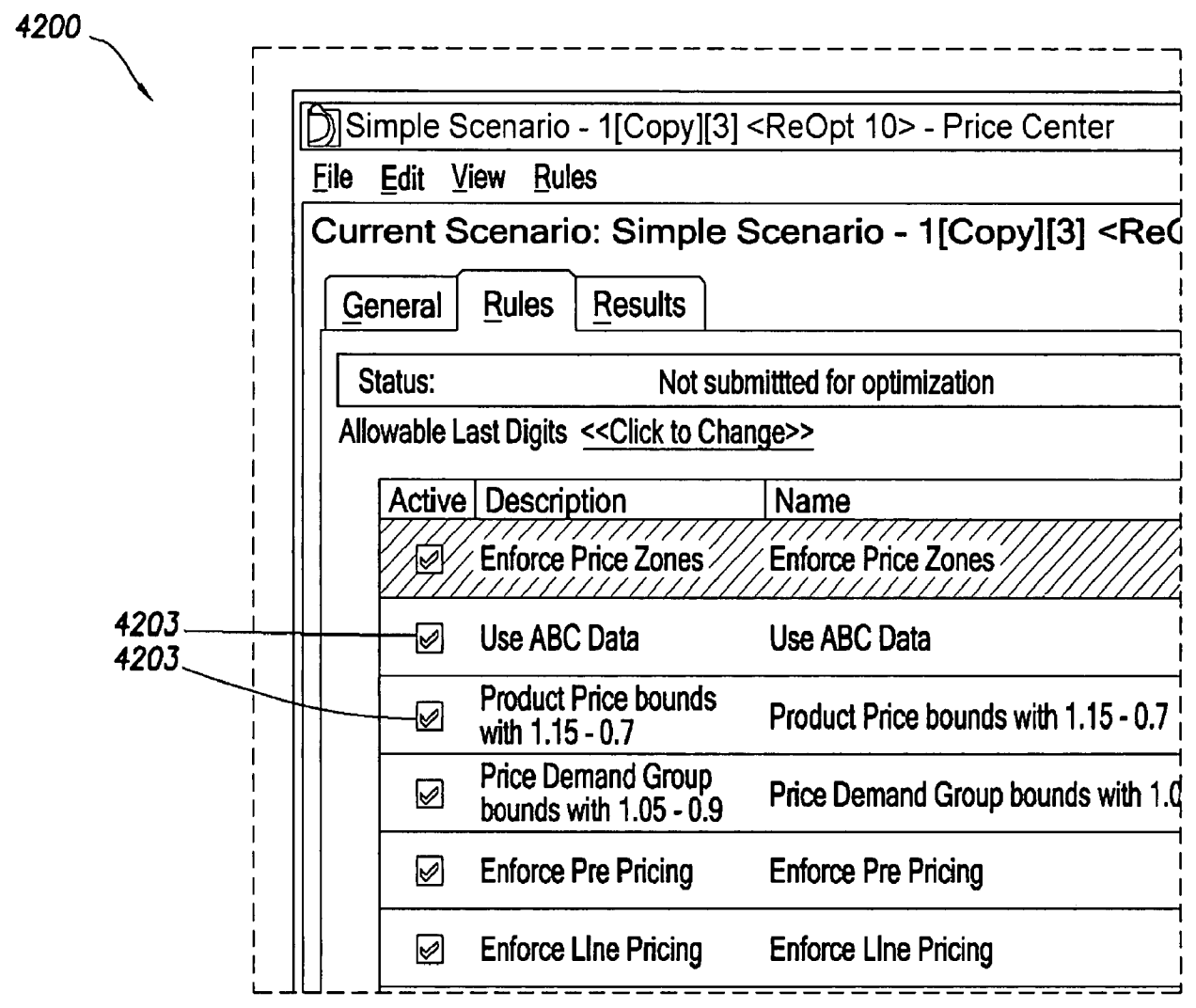
Figure 42B:
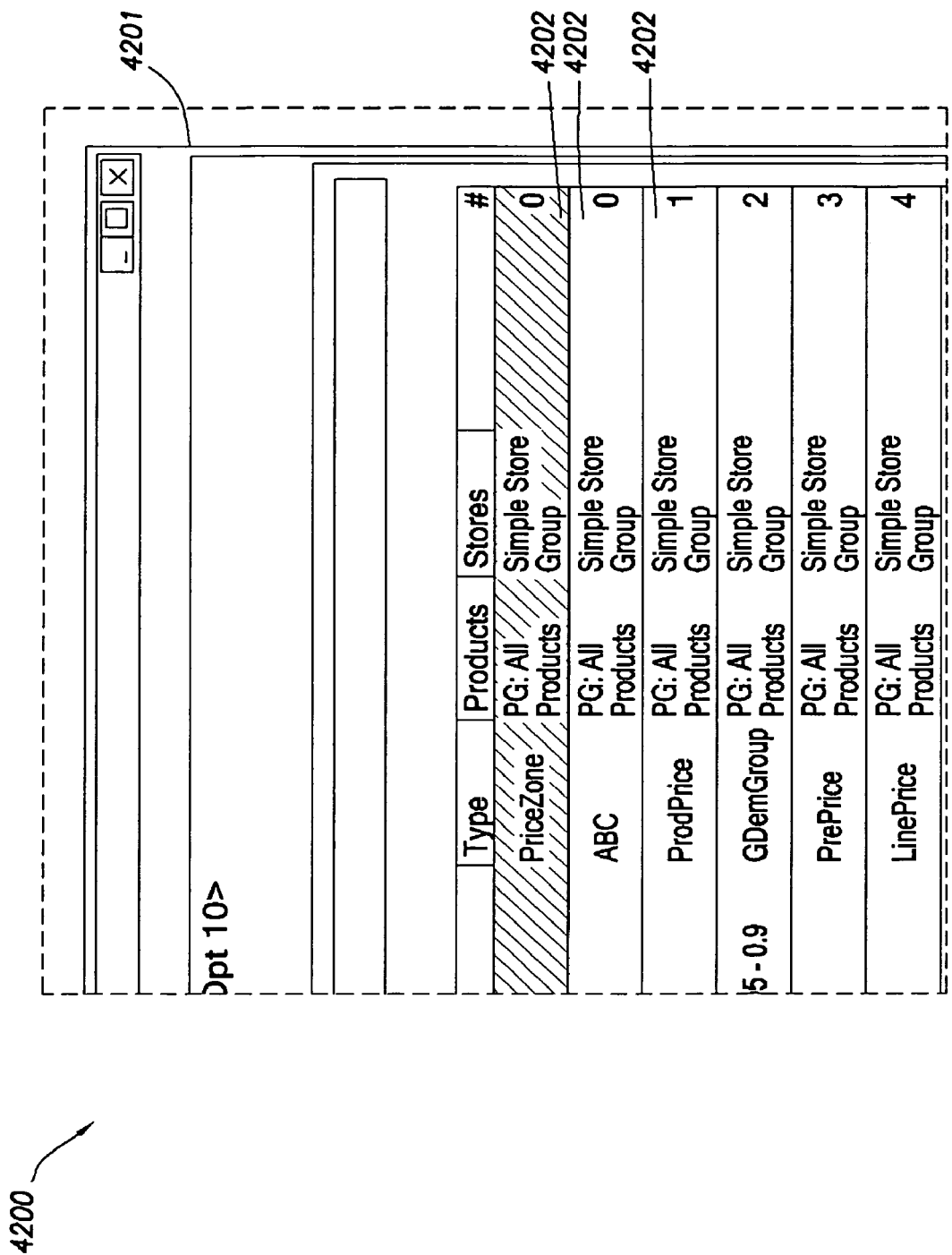
Figure 42C:
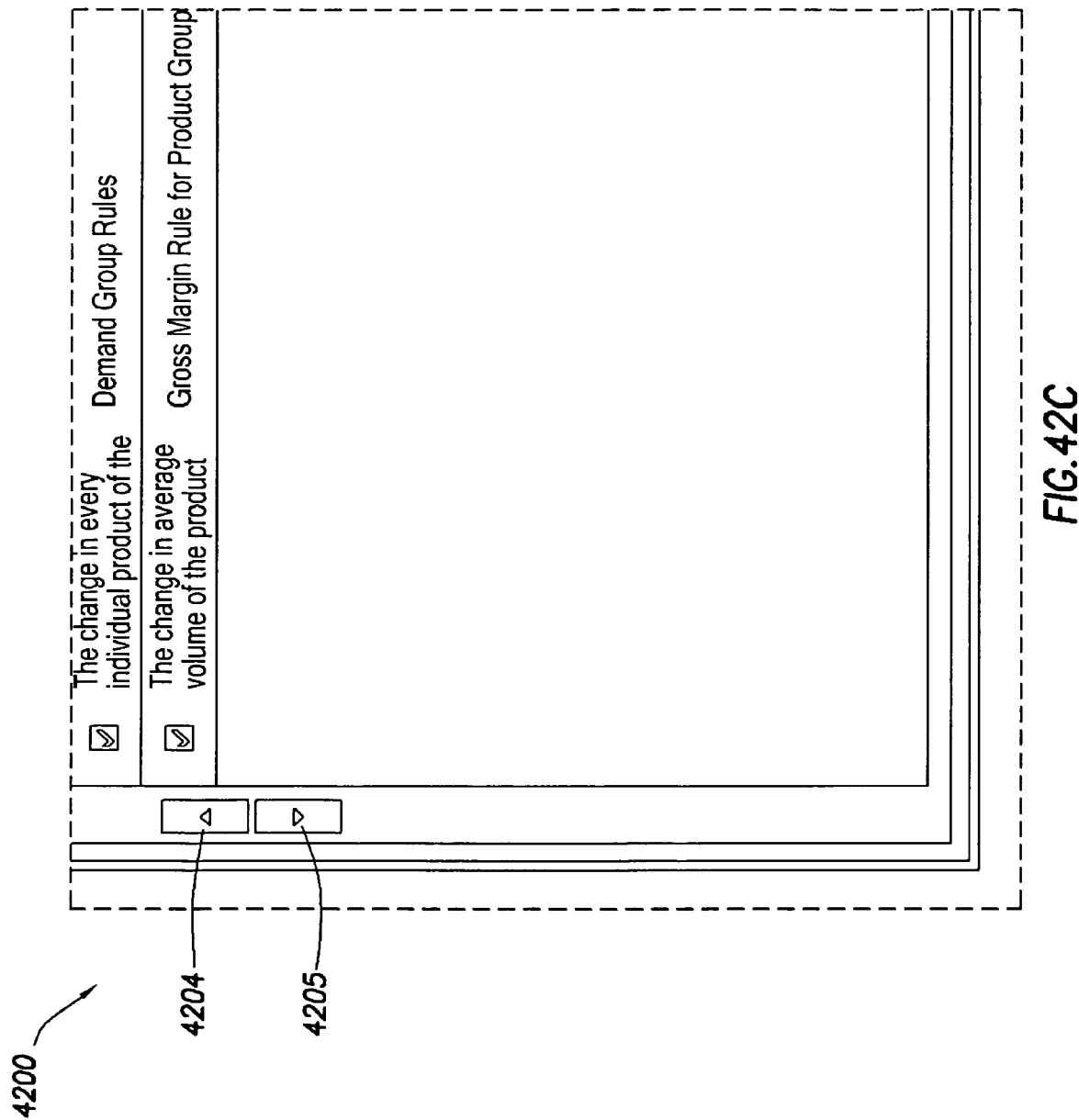
Figure 42D:
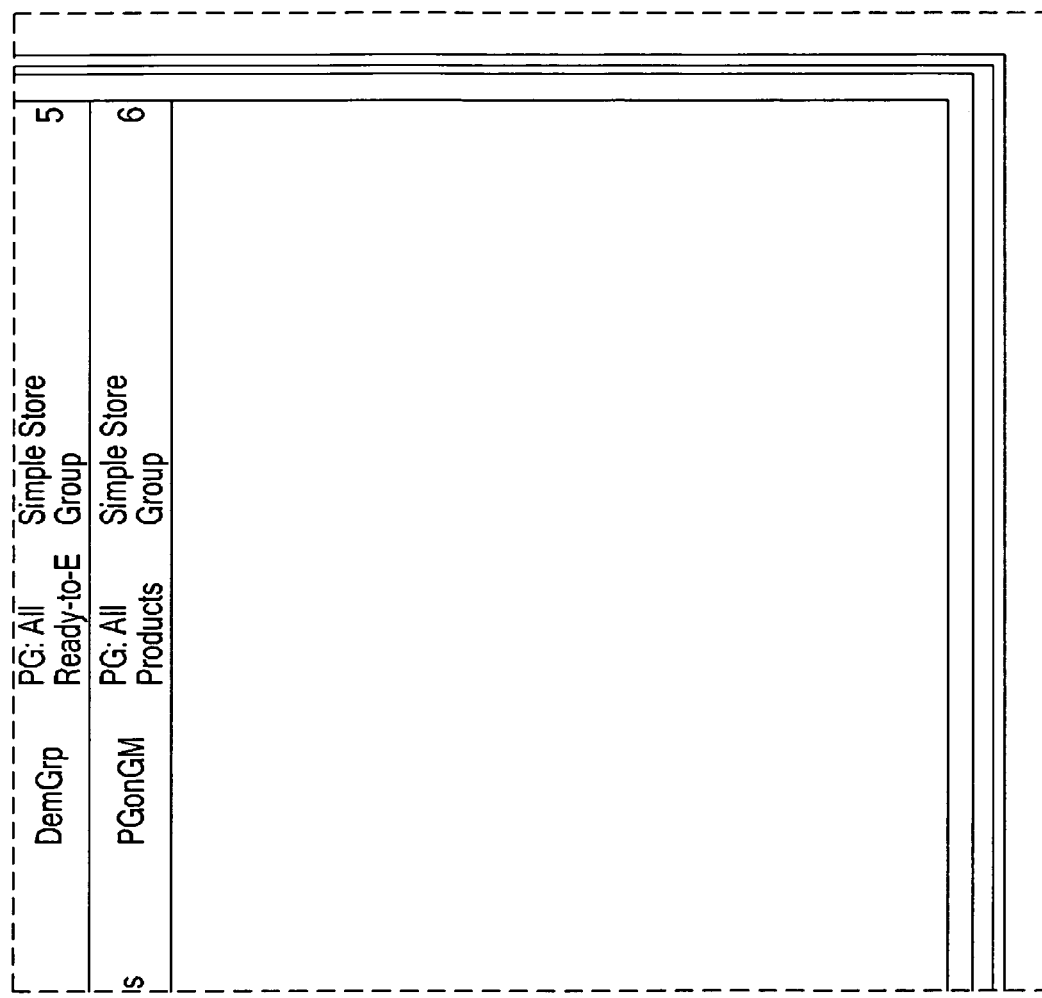

Now referring to FIG. 42, a diagram 4200 is presented showing a rules summary template 4201 that features controls 4203-4205 for prioritizing optimization rules 4202 according to the exemplary embodiment. A summary of each rule 4202 is displayed within the template 4201. The summary includes an indication of each rule's priority relative to the other rules 4202. The relative priority of a highlighted rule 4202 is increased by selecting an up control 4204 and decreased by selecting a down control 4205. In addition each rule 4202 activated/de-activated by selecting the corresponding activate/de-activate control 4203. De-activating a configured rule 4202 removes the constraint dictated by the rule 4202 altogether from an optimization. Rule relaxation, as described above, is employed to progressively relax the constraints of a lower-priority conflicting rule 4202 in the case of a conflict with a higher-priority active rule 4202 to render an optimization feasible that has bee previously determined to be infeasible.

Figure 43:
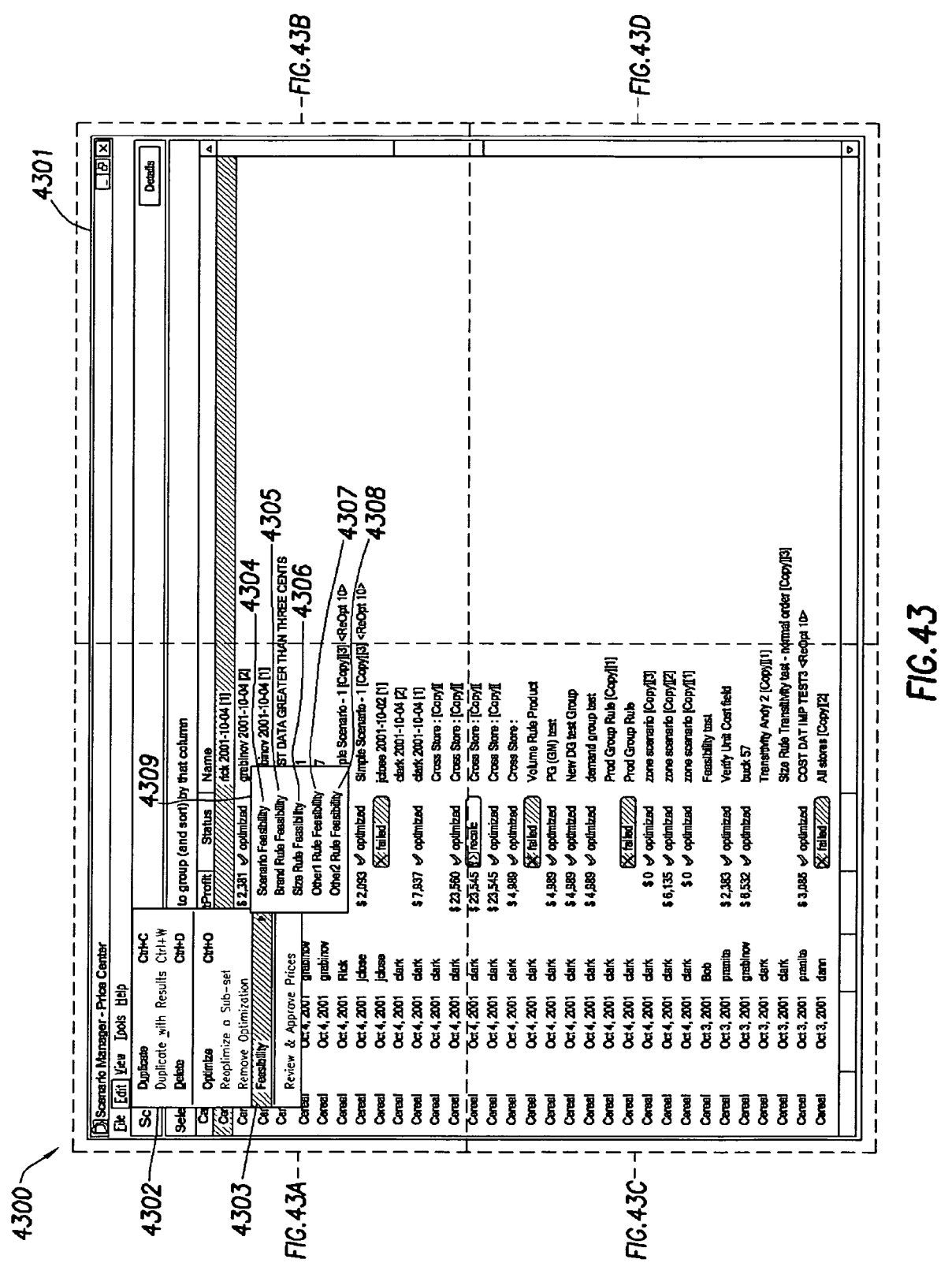
Figure 43A:
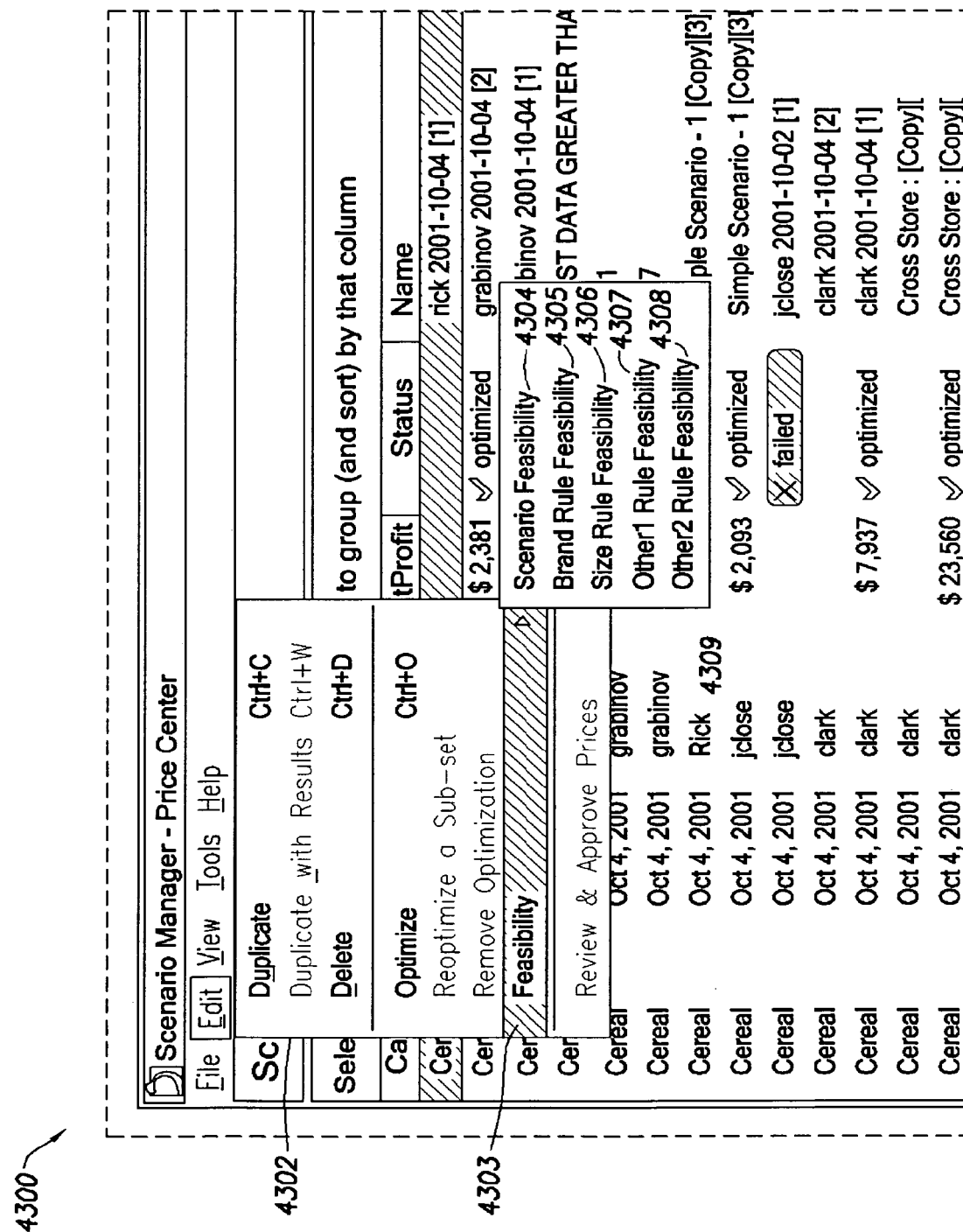
FIG. 43 is a diagram illustrating a feasibility analysis options template according to the exemplary embodiment.
Figure 43B:
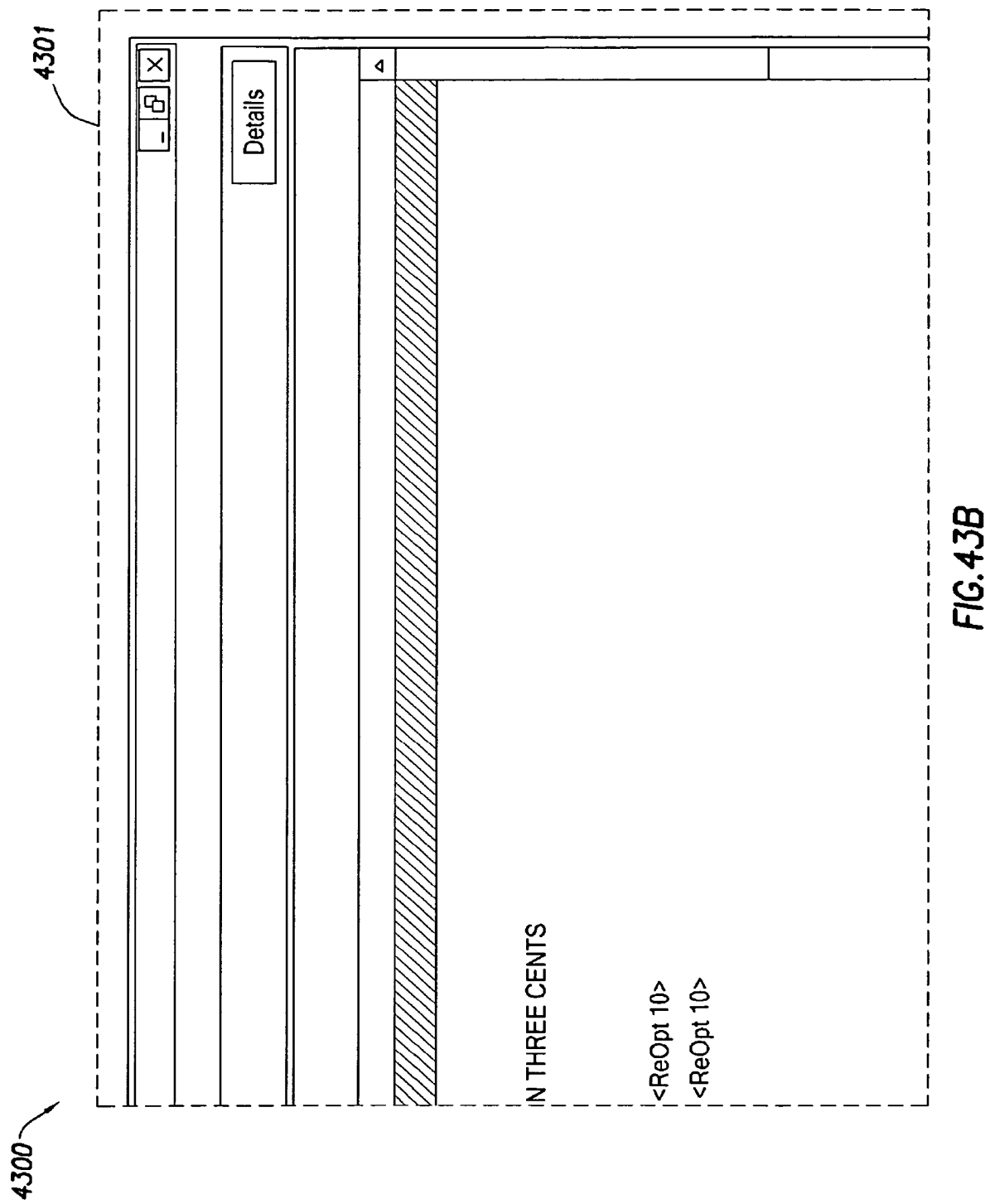

FIG. 43 is a diagram 4300 illustrating a feasibility analysis options template 4309 according to the exemplary embodiment. The feasibility analysis options template 4309 is provided to the user when the user selects a feasibility analysis option 4303 within an edit options window 4302 according to the exemplary embodiment. The edit options window 4302 is provided within a currently defined scenarios template 4301. In the exemplary embodiment options are provided for the user to select to perform a feasibility analysis at the scenario level (scenario feasibility option 4304) or the user can perform an analysis to determine conflicting rules for any of four different product classes. A brand rule feasibility option 4305 will invoke a feasibility analysis of configured brand class rules. A size rule feasibility option 4306 invokes an analysis of configured size class rules. An other 1 rule feasibility option 4307 invokes an analysis of configured other 1 class rules. And an other 2 rule feasibility option 4307 invokes an analysis of configured other 2 class rules.

Once a feasibility analysis option has been prescribed by the operator, a feasibility analysis configuration template 4401 is presented, as shown in the diagram of FIG. 44. The configuration template 4401 provides a detailed output selection button 4402, a summary output selection button 4403, and a show all items selector 4404. The detailed and summary output selection buttons 4402, 4403 enable the user to tailor the level of analysis result data that is presented following the feasibility analysis. The show all items selector 4404 enables the operator to prescribe the level of details that are presented within the analysis results.

Although the present invention and its objects, features, and advantages have been described in detail, other embodiments are encompassed by the invention as well. For example, the present invention has been particularly characterized as a web-based system whereby clients access a centralized network operations center in order to perform optimizations. However, the scope of the present invention is not limited to application within a client-server architecture that employs the Internet as a communication medium. Direct client connection is also provided for by the system according to the present invention.

In addition, the present invention has been particularly characterized in terms of servers, controllers, and management logic for optimization of various merchandising parameters. These elements of the present invention can also be embodied as application program modules that are executed on a Windows NT®- or Unix®-based operating system.

Furthermore, the present invention has been presented in terms of several merchandising levers, and specifically in terms of a price lever, whereby prices are optimized to maximize a user-selected figure of merit. Price is a well understood lever, but scope of the present invention is not constrained to price. Any well understood merchandising lever, the manipulation of whose attributes can be quantified and estimated with respect to consumer demand and whose associated costs can be determined via an activity based cost model are contemplated by the present invention. Such levers include space, assortment, logistics, and promotion.

Those skilled in the art should appreciate that they can readily use the disclosed conception and specific embodiments as a basis for designing or modifying other structures for carrying out the same purposes of the present invention, and that various changes, substitutions and alterations can be made herein without departing from the spirit and scope of the invention as defined by the appended claims.

What is claimed is:

1. An interface enabling a user to determine optimum prices of products for sale, comprising:
    a scenario/results processor, configured to enable a user to prescribe an optimization scenario, and configured to present the optimum prices to said user, wherein the optimum prices are determined by execution of said optimization scenario by an optimization engine coupled to said scenario/results processor, and wherein said optimum prices are determined based upon product demand estimated by said optimization engine and calculated activity based costs, said scenario/results processor comprising:
        an input/output processor, configured to acquire data corresponding to said optimization scenario from said user, and configured to distribute optimization results to said user wherein said input/output processor comprises:
            a template controller, configured to provide first price optimization templates and second price optimization templates, wherein said first price optimization templates are presented to said user to allow for prescription of said optimization scenario, and for distribution of said optimization results, and wherein said first price optimization templates comprise:
                a plurality of new scenario templates, configured to enable said user to prescribe scenario parameters corresponding to said optimization scenario, wherein said plurality of new scenario templates comprises:
                    an at-large rules template, for specifying rules to govern determination of the optimum prices, said rules comprising:
                        maximum allowable price swing for each of the products for sale; and
                        maximum allowable swing for average price of each demand group within said plurality of demand groups; and
            a command interpreter; configured to extract commands from said first price optimization templates executed by said user, and configured to populate said second price optimization templates according to result data provided for presentation to said user; and
        a scenario controller, coupled to said input/output processor, configured to control acquisition of said data and distribution of said optimization results in accordance with a price optimization procedure, wherein said price optimization procedure is configured to relax constraints of lower priority conflicting rules to render said optimization scenario feasible.

2. The interface as recited in claim 1, wherein said data is acquired from said user over the Internet via a packet-switched protocol.

3. The interface as recited in claim 2 wherein said data is acquired from a source electronic file and said optimization results are distributed to a destination electronic file, said electronic files being designated by said user.

4. The interface as recited in claim 1, wherein said first and second price optimization templates are provided according to hypertext markup language (HTML).

5. The interface as recited in claim 1, wherein said first and second price optimization templates are provided according to extensible markup language (XML).

6. The interface as recited in claim 1, wherein said first and second price optimization templates are provided as Java applets.

7. The interface as recited in claim 1, wherein said plurality of new scenario templates further comprises:
 a category template, for specifying a product category for price optimization, said product category comprising:
  a plurality of demand group, each of said plurality of demand groups configured to categorize a set of highly correlated products;
 a products template, for specifying the products for sale, wherein the products for sale span more than one of said plurality of demand groups; and
 a locations template, for specifying a plurality of store groups for which the optimum prices are to be determined, wherein, when determining the optimum prices, the apparatus employs portions of said data that correspond to said plurality of store groups.

8. The interface as recited in claim 1, wherein said plurality of new scenario templates further comprises:
 a time horizon template, for specifying a time period for which the optimum prices are to be determined.

9. The interface as recited in claim 1, wherein said plurality of new scenario templates further comprises:
 a strategy template, for specifying a merchandising performance figure of merit, and for specifying limits for changes in sales volume.

10. The interface as recited in claim 9, wherein options for specification of said merchandising performance figure of merit comprise net profit, said sales volume, and revenue.

11. The interface as recited in claim 1, wherein said first price optimization templates further comprise:
 a configured rules template, configured to enable said user to prescribe a priority corresponding to each of a plurality of rules, said plurality of rules providing constraints for said optimization scenario.

12. The interface as recited in claim 1, wherein said first price optimization templates further comprise:
 a subset re-optimization template, configured to enable said user to prescribe a maximum number of price changes to be determined by execution of said optimization scenario.

13. The interface as recited in claim 1 wherein said second price optimization templates comprise:
 a price optimization results template, for providing said user with said result data corresponding to said optimization scenario.

14. The interface as recited in claim 13, wherein said result data comprises optimized values and percent change values for merchandising factors, wherein said merchandising factors comprise one or more of the following: sales volume, revenue, product cost, gross margin, and net profit.

15. A method for providing an interface to an apparatus for optimizing the prices of products for sale, comprising:
 utilizing a computer-based scenario/results processor within an optimization server to present a sequence of data entry templates to a user, whereby the user specifies an optimization scenario, the optimization server optimizing the prices according to market demand for the products and demand chain costs for the products; said utilizing comprising:
  first providing an at-large rules template, for specifying rules to govern determination of the optimum prices, wherein the rules specify maximum allowable price swing for each of the products for sale, and maximum allowable swing for the average price of each demand group within a plurality of demand groups;
  second providing a configured rules template, for prioritizing the rules, wherein, if particular rules conflict, the optimization server optimizes the prices by progressively relaxing constraints prescribed by lower priority rules; and
  selectively limiting the number of prices that are optimized; and
 within an optimization engine that is coupled to the computer-based scenario/results processor, estimating the market demand and calculating the demand chain costs for the products; and
 generating a plurality of optimization results templates and providing these templates to the user, wherein the optimum prices are presented.

16. The method as recited in claim 15, wherein said utilizing further comprises:
 acquiring data corresponding to the optimization scenario from the user; and
 formatting the data into a format suitable for performing a price optimization according to the optimization scenario.

17. The method as recited in claim 16, wherein said acquiring comprises:
 obtaining the data from the user over a data network that employs a packet-switched protocol.

18. The method as recited in claim 16, wherein the data is acquired from a source electronic file that is designated by the user.

19. The method as recited in claim 15, wherein the data entry templates and the optimization results templates are generated in hypertext markup language (HTML).

20. The method as recited in claim 15, wherein the data entry templates and the optimization results templates are generated in extensible markup language (XML).

21. The method as recited in claim 15, wherein the data entry templates and the optimization results templates are generated as Java applets.

22. The method as recited in claim 15, wherein said utilizing further comprises:
 third providing a category template, for specifying a product category for price optimization, wherein the product category comprises the plurality of demand groups;
 fourth providing a products template, for specifying the products for sale for which the optimum prices are to be determined, wherein the products for sale span more than one of the plurality of demand groups;
 fifth providing a time horizon template, for prescribing a time period for which the optimum prices are to be determined;
 sixth providing a locations template, for prescribing a plurality of store groups for which the optimum prices are to be determined, wherein said prescribing directs said optimizing to utilize data corresponding to the plurality of said store groups when determining the optimum prices; and
 seventh providing a strategy template, for specifying a merchandising performance figure of merit, and for prescribing limits for changes in sales volume.

23. The method as recited in claim 22, wherein options for specifying the merchandising performance figure of merit comprise net profit, sales volume, and revenue.

24. The method as recited in claim 16, wherein said generating comprises:
   providing a price optimization results template, for supplying the user with scenario results corresponding to the optimization scenario, wherein the scenario results include optimized values and percent change values for merchandising factors, the merchandising factors including one or more of the following: volume, revenue, product cost, gross margin, and net profit.

* * * * *